United States Patent
Turpin et al.

(10) Patent No.: US 7,509,048 B2
(45) Date of Patent: Mar. 24, 2009

(54) METHOD AND APPARATUS FOR OPTICAL SIGNAL PROCESSING USING AN OPTICAL TAPPED DELAY LINE

(75) Inventors: Terry M. Turpin, Columbia, MD (US); Craig H. Price, Ellicott City, MD (US); Fred F. Froelich, Baltimore, MD (US); Bruce D. Nichols, Columbia, MD (US); James L. Lafuse, Columbia, MD (US); Keith R. Frampton, Sykesville, MD (US)

(73) Assignee: Essex Corporation, Columbia, MD (US)

( * ) Notice: Subject to any disclaimer, the term of this patent is extended or adjusted under 35 U.S.C. 154(b) by 513 days.

(21) Appl. No.: 10/199,495

(22) Filed: Jul. 22, 2002

(65) Prior Publication Data

US 2003/0128917 A1   Jul. 10, 2003

Related U.S. Application Data

(60) Provisional application No. 60/306,418, filed on Jul. 20, 2001.

(51) Int. Cl.
 *H04J 14/02* (2006.01)
(52) U.S. Cl. .......................................... 398/83
(58) Field of Classification Search ............... 398/83, 398/201
 See application file for complete search history.

(56) References Cited

U.S. PATENT DOCUMENTS

| | | | |
|---|---|---|---|
| 4,279,464 A | 7/1981 | Colombini | |
| 4,636,718 A | 1/1987 | Labrum et al. | |

(Continued)

FOREIGN PATENT DOCUMENTS

EP   0 922 973 A2   6/1999

(Continued)

OTHER PUBLICATIONS

E. Yamada et al., "150 Channel Supercontinuum CW Optical Source with high SNR and Precise 25 GHz Spacing for 10 Gbit/s DWDM Systems", Electronics Letters, vol. 37, No. 5, Mar. 1, 2001.*

(Continued)

*Primary Examiner*—Shi K Li
(74) *Attorney, Agent, or Firm*—Morrison & Foerster LLP

(57) ABSTRACT

An Optical Tapped Delay Line (OTDL), which resolves multiple wavelength signals having extremely narrow wavelength spacing, is combined with other known optical devices to provide a wide variety of optical signal processing applications, including: multiplexing and de-multiplexing a multi-channel signal; adding a signal to, or dropping a signal from, a multi-channel optical signal; specialized coding processing such as generating code division multiple access signals; wavelength locking (stabilizing) a signal; filtering a signal; and analyzing and monitoring a signal spectrum. The OTDL spatially separates individual channels to allow separate processing on each channel. Fixed and tunable embodiments are identified in appropriate cases. Bulk, hybrid, and integrated optical embodiment and methods of fabrication are described, as are curved self-focusing and evanescent embodiments of OTDL devices. The devices and processes disclosed have particular application to dense wavelength division multiplexing (DWDM) and permit a significant improvement in the quantity of information that can be carried on DWDM signals while enhancing signal quality.

18 Claims, 23 Drawing Sheets

U.S. PATENT DOCUMENTS

| | | | |
|---|---|---|---|
| 4,715,027 A | 12/1987 | Mahapatra et al. | |
| 4,819,224 A | 4/1989 | Laude | |
| 4,871,232 A | 10/1989 | Grinberg et al. | |
| 4,995,724 A | 2/1991 | Sonobe et al. | |
| 5,002,350 A | 3/1991 | Dragone | |
| 5,136,671 A | 8/1992 | Dragone | |
| 5,233,405 A | 8/1993 | Wildnauer et al. | |
| 5,367,586 A | 11/1994 | Glance et al. | |
| 5,416,864 A | 5/1995 | Cassidy et al. | |
| 5,428,700 A | 6/1995 | Hall | |
| 5,488,680 A | 1/1996 | Dragone | |
| 5,629,992 A | 5/1997 | Amersfoort et al. | |
| 5,680,236 A | 10/1997 | Van Der Tol | |
| 5,692,076 A | 11/1997 | Delisle et al. | |
| 5,701,372 A | 12/1997 | Magel et al. | |
| 5,751,456 A | 5/1998 | Koonen | |
| 5,784,506 A | 7/1998 | Pfeiffer | |
| 5,786,915 A | 7/1998 | Scobey | |
| 5,798,859 A | 8/1998 | Colbourne et al. | |
| 5,799,118 A | 8/1998 | Ogusu et al. | |
| 5,825,792 A | 10/1998 | Villeneuve et al. | |
| 5,832,156 A | 11/1998 | Strasser et al. | |
| 5,926,587 A | 7/1999 | Chen et al. | |
| 5,973,838 A | 10/1999 | Shirasaki | |
| 5,999,320 A * | 12/1999 | Shirasaki | 359/577 |
| 6,049,644 A | 4/2000 | Dragone | |
| 6,052,496 A | 4/2000 | O'Donnell | |
| 6,075,647 A | 6/2000 | Braun et al. | |
| 6,111,674 A | 8/2000 | Bhagavatula | |
| 6,141,130 A | 10/2000 | Ip | |
| 6,141,152 A | 10/2000 | Trouchet | |
| 6,147,799 A | 11/2000 | MacDonald | |
| 6,163,393 A | 12/2000 | Wu et al. | |
| 6,208,444 B1 | 3/2001 | Wong et al. | |
| 6,212,313 B1 | 4/2001 | Li | |
| 6,215,573 B1 | 4/2001 | Pfeiffer | |
| 6,215,923 B1 | 4/2001 | Li | |
| 6,236,781 B1 | 5/2001 | Doerr et al. | |
| 6,263,123 B1 | 7/2001 | Bishop et al. | |
| 6,266,460 B1 | 7/2001 | Doerr | |
| 6,275,322 B1 | 8/2001 | Tai | |
| 6,285,478 B1 | 9/2001 | Liu et al. | |
| 6,289,028 B1 | 9/2001 | Munks et al. | |
| 6,292,299 B1 | 9/2001 | Liou | |
| 6,298,186 B1 | 10/2001 | He | |
| 6,301,399 B1 | 10/2001 | Mahapatra et al. | |
| 6,307,657 B1 * | 10/2001 | Ford | 398/9 |
| 6,313,771 B1 | 11/2001 | Munroe et al. | |
| 6,343,170 B1 | 1/2002 | Sela | |
| 6,345,059 B1 | 2/2002 | Flanders | |
| 6,362,879 B1 | 3/2002 | Ranalli | |
| 6,385,362 B1 | 5/2002 | Norwood | |
| 6,404,946 B1 | 6/2002 | Nakajima et al. | |
| 6,501,877 B1 * | 12/2002 | Weverka et al. | 385/31 |
| 6,708,003 B1 * | 3/2004 | Wickham et al. | 398/102 |
| 2002/0105705 A1 | 8/2002 | Turpin et al. | |

FOREIGN PATENT DOCUMENTS

| | | |
|---|---|---|
| EP | 0 947 861 A1 | 10/1999 |
| EP | 1016884 A2 | 7/2000 |
| EP | 1052868 A2 | 11/2000 |
| EP | 1 044 487 B1 | 4/2002 |
| GB | 2 245 790 A | 1/1992 |
| GB | 2245790 A | 1/1992 |
| JP | 2001-166261 A | 6/2001 |
| WO | WO 92/09150 | 5/1992 |
| WO | WO-98/35259 A1 | 8/1998 |
| WO | WO-99/38348 A1 | 7/1999 |
| WO | WO 00/62107 | 10/2000 |
| WO | WO-01/35505 A1 | 5/2001 |
| WO | WO 01/50100 | 7/2001 |
| WO | WO-01/50177 A1 | 7/2001 |

OTHER PUBLICATIONS

J. Lee et al., "Multi-Channel Frequency Stabilization Using Wavelength Crossover Properties of Arrayed Waveguide Grating", Lasers and Electro-Optics 10th Annual Meeting, LEOS '97, Nov. 10-13, 1997.*

C. X. Yu et al., "Dispersion-free (de)mux with very high figure-of-merit", OFC 2002, Wednesday Mar. 20, p. 318-319.

H. Okayama et al., "Wavelength demultiplexer using a multi-reflection-mirror waveguide", Opt. Eng. 41(6) 1446-1451 (Jun. 2002).

European Examination Report dated Oct. 24, 2007, directed to counterpart EP Application No. 02747065.7 (4 pages).

* cited by examiner

METHOD AND APPARATUS FOR OPTICAL SIGNAL PROCESSING USING AN OPTICAL TAPPED DELAY LINE

BACKGROUND OF THE INVENTION

1. Field of the Invention

The present invention relates to optical communications, and more particularly to devices and methods for manipulating a multi-frequency input signal, such as a WDM or DWDM signal, to perform a variety of optical signaling processes.

2. Background of the Invention

Fiber optic cable is widely used for data transmission and other telecommunication applications. The relatively high cost of installing new fiber optic cable presents a barrier to increased carrying capacity, however, so it is highly desirable to increase the data carrying capabilities of existing fiber. Wavelength division multiplexing (WDM) enables different wavelengths to be carried over a common fiber optic waveguide. WDM can separate the fiber bandwidth into multiple discrete channels through a technique referred to as dense wavelength division multiplexing (DWDM). This provides a relatively low cost and proven method of substantially increasing long-haul telecommunication capacity over existing fiber optic transmission lines. Techniques and devices are required, however, for performing a variety of processing procedures on the input signals, such procedures including: multiplexing and de-multiplexing the different discrete carrier wavelengths, adding new signals to and dropping existing signals from the multiplexed signal, specialized coding processing such as code division multiple access, precisely controlling the wavelength of laser sources throughout the WDM communications process, improving signal quality (filtering) by reducing crosstalk and signal power loss as channel frequency spacings decrease, and channel interleaving and de-interleaving, among others.

Multiplexing and De-multiplexing. As part of the mux/demux process, individual optical signals should be combined onto a common fiber optic waveguide and then later separated again into the individual signals or channels at the opposite end of the fiber optic cable. Thus, the ability to effectively combine and then separate individual wavelengths (or wavelength bands) from a broad spectral source is of growing importance to the fiber optic telecommunications field and other fields employing optical instruments.

Devices that assemble multiple tightly spaced carrier wavelengths within a single fiber are called multiplexers. Devices that separate the carrier wavelengths at the receiving end of a fiber are called de-multiplexers or channelizers. WDM channelizers known in the prior art include Fabry-Perot interferometers, Lummer-Gehrcke interferometers, Virtually Imaged Phased Array (VIPA) generators, Thin film interference filters, arrayed waveguide gratings, and optical fiber Bragg gratings.

The Fabry-Perot interferometer is a known device for resolving light into its component frequencies, or equivalently, its component wavelengths. FIG. 1 illustrates one example of a prior art Fabry-Perot interferometer. It includes two parallel partially reflective mirrors 70 and 71. The mirrors are separated by a cavity 72, which might be an air space or alternatively, a solid transparent material. Light from a spectrally broadband source, i.e., a laser, is input at plane 75. In particular, a multi-spectral light ray input from point $P_1$ entering through the partially reflective mirror 70 at an angle $\theta$ undergoes multiple reflections between mirrors 70 and 71. The emerging light rays 76, having a common wavelength $\lambda$, interfere constructively along a circular locus $P_2$ in the output plane 77 where an appropriate detector might be positioned. The condition for constructive interference that relates a particular angle $\theta$ and a particular wavelength $\lambda$ is given by the formula $$2d \cos \theta = m\lambda$$

where d is the separation of the reflecting surfaces and m is an integer known as the order parameter. The Fabry-Perot etalon thereby separates the component frequencies of the input light by using multiple beam reflections and interferences. It is apparent from the equation above that the output light pattern of the system, i.e., the interference fringes, in the case of a diverging input beam, is a set of concentric circular rings. One ring is present for each wavelength component of the input light for each integer m, with the diameter of each ring being proportional to the corresponding light frequency.

The Fabry-Perot interferometer is not well suited for use as a WDM channelizer due to the difficulty in obtaining high optical throughput efficiency. If the input beam is divergent, e.g., the direct output of an optical fiber, then the output pattern for a given wavelength is a set of rings. Multiple wavelengths produce nested sets of concentric rings. It is difficult to collect this light efficiently and concentrate it at multiple detector points, or couple it to multiple output fibers, especially while maintaining the separation of wavelength components that the interferometer has produced. If the input beam is collimated, e.g., the collimated output of an optical fiber, then the beam can be fanned over a narrow range of angles to produce only a single-order output (e.g., m=+1) for each wavelength of interest. This fanning makes it easy to concentrate the output light at multiple detector points or fibers, but there is inherently high loss. The throughput efficiency can be no greater than 1/N, where N is the number of wavelength components to be separated.

FIG. 2 illustrates an example of a prior art Lummer-Gehrcke interferometer. The illustrated interferometer comprises an uncoated glass plate P and a prism R for coupling a beam of light B into the plate. Internally, the plate is highly reflective at internal incidence angles that approach the critical angle. The internal incidence angle controls the reflectivity of the surfaces. The output of the illustrated Lummer-Gehrcke interferometer is a series of multiple reflected beams $b_1$, $b_2$, $b_3$ that have a frequency-dependent phase shift from beam to beam and that are focused at the output plane S by a lens L. The interference fringes that are formed at the output plane in the case of a diverging input beam and a particular wavelength $\lambda$ are a family of hyperbolae H near the center of the output plane. Each wavelength component of the input beam gives rise to a unique set of hyperbolic fringes.

The Lummer-Gehrcke interferometer relies upon a glass plate that is uncoated. However, the absence of a surface coating means that it is not possible to tailor the fringe intensity profile. This makes the Lummer-Gehrcke interferometer impractical for use in WDM applications in which the fringe profile controls the channel filter shape.

The Lummer-Gehrcke interferometer also is not well suited for use as a WDM channelizer due to the difficulty in obtaining high optical throughput efficiency. If the input beam is divergent, e.g., the direct output of an optical fiber, then the output pattern for a given wavelength is a family of hyperbolae. Multiple wavelengths produce nested sets of hyperbolae. It is difficult to collect this light efficiently and concentrate it at multiple detector points, or couple it to multiple output fibers, especially while maintaining the separation of wavelength components that the interferometer has produced. If the input beam is collimated, e.g., the collimated output of an optical fiber, then the output pattern for a given wavelength is a set of focused spots corresponding to multiple interference orders. Again, it is difficult to collect this light efficiently, and there is generally an inherent loss. The throughput efficiency can be no greater than 1/N, where N is the number of focused spots per wavelength.

FIG. 3 illustrates an example of a prior art virtually imaged phased array (commonly referred to as a VIPA). The VIPA illustrated in FIG. 3 includes a rectangular glass plate 100 that has a 100% reflective coating 101 on a first side and a partially reflective coating 102 on an opposing side. Light enters the plate 100 below the reflective coating 101 in the form of a focused line source 105 produced by a cylinder lens 106.

FIG. 4 illustrates an operational side view of the VIPA. Input light rays 107 and 110 represent the boundaries of the line-focused input beam. The lens 106 focuses the input rays at the point 111, after which the rays diverge as the beam propagates. The focused input rays 107 and 110 are partially reflected by the coating 102 and then totally reflected by the coating 101. This reflection produces a virtual image of point 111 at location 112. The reflective process is continued, producing additional receding virtual images at locations 115 and 116. This process produces virtual images of the line source that recede away from the input side of the glass plate (i.e., to the left of element 100 in FIG. 3) and that are distributed in the y direction.

FIG. 5 illustrates an example of the optical distribution of the diverging light beams at the exit surface of the glass plate. The numbered circles 117, 120 and 121 are intended to call the reader's attention to the areas of interest on the coated surface 102. The circles represent the size of the light beams exiting the plate. The line focused input is illustrated at point 111, the twice reflected light that has diverged due to propagation is illustrated at circle 117, the four-times reflected light that has diverged even more is illustrated at circle 120, and the six-times reflected light that has diverged even more is illustrated at circle 121. In the example illustrated in FIG. 5, after more than six reflections the diverging light beams overlap and blend into an interference pattern.

As shown in FIG. 5, each of the successive beams 117, 120 and 121 that exits the surface 102 of the VIPA plate 100 appears to originate from the line source images 112, 115 and 116, respectively, as shown in FIG. 4. The light from these images diverges as the light propagates inside the glass plate 100. Part of the light from each image exits the plate through the partially reflective coating 102. The exiting beams interfere with each other. The interference pattern is collected by a lens 122 and focused onto a 1-dimensional detector array 125 (FIG. 3).

In the illustrated VIPA the beams diverge and overlap at the partially reflective surface 102. This overlap effect makes weighting the individual virtual sources possible only in an area-average sense, thus limiting the degree to which the channel filter shape can be tailored.

The VIPA requires a line-focused input. The line-focused input means that the VIPA may provide a relatively compact device for coarse channelization (i.e., wide channel spacing on the order of one hundred GHz). However, the line-focused input makes the VIPA impractical for fine channelization (i.e., narrow channel spacing on the order of one GHz) due to the fact that a thicker plate is needed, which would result in excessive beam divergence and overlap at the exit surface.

Thin film interference filters require a different coating design to separate each wavelength component of an input beam. A stacked thin-film multiplexer is taught in U.S. Pat. No. 6,111,474. Since the interference filters produced by thin film coatings tend to have relatively wide passbands, they cannot achieve high resolution (twenty-five GHz or finer). In addition, stacking thin-film filters such as the device in U.S. Pat. No. 6,111,474 produces loss that effectively limits the number of channels.

In the classical diffraction grating, as used for WDM channelization applications, the dispersive element is a grating embedded in a monoblock of silica. The input optical fibers may be directly fixed to the block. The grating may comprise several tens of grooves to several thousands of grooves per millimeter. The grooves may be fabricated, for example, by etching with a diamond tool or by holographic photo-exposure. The grating diffracts incident light in a direction related to the wavelength of the light, the groove spacing, and the incidence angle. Consequently, an incident beam comprising several wavelength components will be angularly separated into different directions. Conversely, a reverse mode of operation is possible in which several beams of different wavelengths coming from different directions may be combined (multiplexed) into the same output direction.

Diffraction gratings of reasonable size do not have sufficient resolution for HWDM. For example, for a channel separation of 1 GHz, a grating would have to be significantly longer than twelve inches to achieve an adequate channel filter shape. They also have high optical insertion loss, making them inefficient for use in high-resolution WDM systems.

Diffraction gratings tend to produce undesirable polarization effects. The diffraction efficiency depends on the polarization of the incident beam. For a given wavelength, this effect increases when the groove spacing decreases. Typically this effect is small when the groove spacing is at least ten times larger than the wavelength, but the effect becomes important when the groove spacing is reduced to a few wavelengths in order to achieve higher angular dispersions.

The prior art arrayed waveguide grating (AWG) is an integrated-optic passive delay line device that performs channelization. The AWG is designed to increase the resolving power, i.e. the fine splitting of the wavelengths, over that obtainable with classical diffraction gratings. Around 1990, AWGs were first proposed both by Takahashi and others in Japan, and by Dragone and others in the United States. Arrayed waveguides gratings increase the optical path difference between the diffracting elements by using a waveguide structure that is equivalent to the well-known Michelson echelon gratings in classical optics. AWGs have the inherent disadvantage of a much smaller free spectral range that limits the total number of channels and increases the near-end crosstalk that affects bidirectionality. It is difficult to achieve resolution better than fifty GHz using an AWG. AWG devices capable of one GHz resolution would be physically large, expensive, and have very high loss.

A fiber grating is made by recording a Bragg grating inside the core of a single-mode fiber, which is made photosensitive by doping it with germanium, for example. This grating may be used as a narrowband filter. It is important to use one grating per wavelength channel, so there is an inherent limitation on the number of channels that can be de-multiplexed with such devices due to the shear bulk of the resulting system. A primary disadvantage of a fiber grating is that it can reflect only one wavelength. An N channel system therefore requires N fiber gratings.

Optical Add-Drop Multiplexers. Techniques and devices are known for multiplexing the discrete wavelengths in DWDM transmission systems, i.e., for combining individual optical signals onto a common fiber optic waveguide. Then, the optical signals are separated again into the individual signals or channels at the opposite end of the fiber optic cable.

The ability to effectively combine and then separate individual wavelengths (or wavelength bands) from a broad spectral source is of significant importance to the fiber optic telecommunications field. Similarly, this technique is important in many other fields employing optical networking devices.

As fiber optic transmissions enter and leave metropolitan and local area networks (LANs), each data-carrying wavelength is usually switched through various points along the fiber optic network. These points are known as "nodes." At node locations, optical signals can be forwarded to the next node or "dropped" towards their final destination via the best possible path. The best possible path may be determined by such factors as distance, cost, and the reliability of specific routes. In addition, specific data-carrying wavelengths may be recombined or "added" to the multiplexed optical signal at node sites. The devices that perform these functions in DWDM network systems are called add/drop multiplexers (ADMs).

A conventional way to drop a data signal from a DWDM fiber is to de-multiplex the signal into its constituent wavelengths. Next, the light is detected using a photodetector, thus converting the signals to an electronic form (OE conversion). The electronic signal is switched and/or routed, as appropriate. The remaining signals are converted back to an optical signal (EO conversion). The optical signal is then sent down the proper fiber. During this last step, a signal can be added to the remaining signals. Such OE and EO conversion operations are both protocol and data rate dependent. These operations also require inflexible devices that are costly and difficult to upgrade as system capacity demand is increased.

Optical add/drop multiplexers (OADMs) have several significant advantages. First, OADMs cost less because they eliminate the need for much of the expensive high-speed electronics in conventional devices. Second, OADMs require smaller packaging because removing the electrical conversion step results in a reduced component count within the switches. Finally, optical devices are relatively future-proof because the optics can accommodate any bit-rate, whereas electrical devices should always be customized for the bit-rate and protocol of the signals.

Optical add/drop systems are comprised of two major subsystems. The first subsystem is the de-multiplexing and multiplexing subsystem for selecting and recombining the appropriate wavelength. The second subsystem is the add/drop apparatus for routing the wavelength to the desired optical fiber output. Existing techniques for wavelength separation from a multiplexed signal using optical architectures include thin film bandpass filters, Fabry-Perot filters, fiber Bragg or diffraction grating filters, and polarization controllers. Each of these optical filtering methods may have different forms.

Thin film bandpass filters have traditionally been used in OADM devices to select single wavelengths from a multichannel optical signal. Although such filters have good channel isolation, they tend to exhibit a transmission light loss of approximately 10%. Such filters are also highly temperature-sensitive. Further, they often operate in only one direction. In addition, such filters are limited to a single, fixed wavelength. Thus, to construct a multi-channel OADM device, multiple filters must be combined. This results in increased complexity, optical loss, and cost.

In U.S. Pat. No. 5,751,456, Koonen disclosed an example of a solution to some of these issues wherein a narrow-bandpass Fabry-Perot filter was utilized in a bi-directional OADM. As Fabry-Perot filters can have a bandpass of 1-2 nm or less, they can provide better isolation and lower loss factors than other thin film interference filters. FIG. 6 illustrates an example of the Koonen prior art. The device illustrated in FIG. 6 is limited in that it can add/drop only a single wavelength. As illustrated in this example, a circulator 127 is used to pass four wavelengths $\lambda_1$-$\lambda_4$ to a Fabry-Perot filter 130. Filter 130 selects one wavelength $\lambda_1$ for continuation on to a receiver 131. The remaining wavelengths $\lambda_2$-$\lambda_4$ are reflected by the filter 130 back to circulator 127. A transmitter 132 sends a new wavelength $\lambda_1'$ to the filter 130. The new wavelength $\lambda_1'$ is multiplexed with the original wavelengths $\lambda_2$-$\lambda_4$. The resulting wavelength is returned to the circulator 127 for continuation The issue of such interference filter-based ADM devices being fixed in nature has been addressed in the prior art with the invention of "tunable" filters. Tunable filters can be selectively tuned to different wavelengths within a multi-channel optical signal. However, tuning thin-film optical filters requires that either the incident optical beam be repositioned with respect to the filter surface or that the filter itself be repositioned with respect to the input beam. Both scenarios require mechanical movement of components such as actuators or stepper motors. The mechanical movement of these components makes these OADM devices active in nature. This results in increased complexity and cost.

FIG. 7 illustrates an example of a prior art tunable filter as disclosed in U.S. Pat. No. 6,292,299. FIG. 7 illustrates the mechanical nature of selecting a single wavelength. FIG. 7 also illustrates the potential complexity of matching the add/drop wavelengths to output fibers. An electronic controller 135 controls an x-z filter positioner 138 to direct an optical filter 136 to move in the x and z directions to a specific location where a single wavelength from an incoming fiber 137 is intercepted. Once selected, the wavelength is passed or dropped to a fiber 140. The unselected wavelengths are reflected to continue on a fiber 141. A wavelength can be added from fiber 140 at the same time. As can be seen from the example illustrated in FIG. 7, the electronic controller should be mechanically manipulated to select a single wavelength.

Diffraction gratings and fiber Bragg grating filters (FBGs) offer alternative means of selecting and isolating single wavelengths from a multi-channel input beam in OADM devices. Diffraction gratings can be used in an OADM device to separate an input beam into its components in one direction, and recombine the wavelengths in the reverse direction. However, with diffraction grating systems, the component count can rise rapidly. Lenses, collimators, and focusing optics are required to refine, direct, and couple the light beams into fibers.

Because FBGs are constructed from optical fibers, rather than individual thin-film filter substrates, they allow for all-fiber systems to be constructed. Fiber Bragg grating systems offer high levels of selectivity. However, they are limited in that several fiber gratings must be combined, along with optical circulators, in order to handle a multiplexed optical signal with a high channel count. The result can be a very large device with a high component count, increased complexity, and a higher cost. In addition, the combination or cascading of multiple-fiber Bragg gratings can significantly reduce signal strength as the insertion loss of multiple devices is compounded throughout the system.

A recent development in the area of wavelength selectivity and separation of multiplexed optical signals has been the utilization of polarization controllers. As disclosed by U.S. Pat. No. 6,285,478, polarization-controlling elements can also be used within OADM devices to separate a multi-channel WDM input signal into odd and even channels. This is done, for example, by splitting the signal into its vertically and horizontally polarized components. When combined with birefringent beam displacing optics, the separated signals can then be directed to appropriate output paths. This method provides an add/drop device that can accommodate the high channel counts and narrow channel spacing of current DWDM networks, where channels are separated by 50 GHz or less. This channel-separation technique is expandable and can adapt to increasing channel counts. However, this technique is subject to very high optical component count. Included in the optical component count are multiple polarization controllers, birefringent elements and beam splitters. These components are required to manipulate dense multiplexed signals. Assembling and aligning these optical components within a device can be extremely expensive. This is particularly true when high levels of precision are required. FIG. 8 illustrates an example of the prior art requirement for a large number of components to separate eight channels.

With the continued development of WDM fiber optic systems, it is becoming increasingly important to control the direction of wavelengths to desired output ports (i.e., routers). It is likewise important to permit a new signal to replace an existing signal at a specific wavelength (i.e., add/drop) using optical systems. Furthermore, since the development of DWDM sends hundreds and even thousands of wavelengths through a fiber, the ability to selectively control a single or several wavelengths without affecting the other wavelengths is very important. This ability is important because the optical to electrical to optical conversion process is expensive and uses significant power as well as space. In particular, optical add/drops are important components in WDM regional-access ring or star networks to provide broadband access to users.

Prior art optical subsystems that perform add/drop functions include mirrors and micro-electro-mechanical systems (MEMS) using movable and fixed micro-mirrors and etalons. These micro-mirrors are a reconfigurable switching matrix capable of directing the output of wavelengths in multiple directions.

It is also known in the art to use a tunable optical add/drop that employs an optical filter device, such as a multi-layer dielectric wedge filter. This technique is successful using tunable Mach-Zehnder interferometers, acoustic tuning filters, tunable thin film interference filters, tunable Fabry-Perot etalons, and tunable Fabry-Perot interferometers. However, it is only possible to interact with a single wavelength at one time using this technique.

A wedged etalon with an actuator that moves the etalon to the position of the channel to be added or dropped may also be employed. However, this system can only accommodate adding or dropping a single channel simultaneously. Further, the added or dropped channel must be at the same frequency.

Accordingly, in light of the limitations of the prior art, it is desirable to have an optical add/drop system which is simpler then those known in the art, has low optical loss characteristics, operates on single or multiple channels, and is capable of adding or dropping finely-spaced channels with separations as close as 50 MHz.

Optical Code Division Multiple Access. Code-Division Multiple Access (CDMA) is a spread spectrum encoding method that enables many users to simultaneously transmit separate signals over the same spectral bandwidth. In CDMA, a data signal of bandwidth D is modulated by a higher rate coded waveform of bandwidth C. The resulting signal has a bandwidth of D+C, which, for large ratios of C to D is approximately equal to C. The ratio C/D is commonly referred to as the spreading ratio, the spreading gain, or the processing gain. The intended receiver modulates the received signal by an exact replica of the coded waveform to remove the code modulation and recover the data signal. The coded waveform may be any of many types but the primary one of interest here is a binary coded bi-phase modulation, also referred to as binary phase shift keying, or BPSK, modulation. The signaling rate of the coded spreading waveform is commonly called the chip rate.

The number of users that could occupy the same spreading bandwidth C is regulated by the processing gain of the high rate modulation, i.e., the ratio of the modulation rate to the data rate, C/D. In theory, this ratio is equal to the number of users. But in practice, due to the need to maintain low cross-correlation properties between the high rate sequences, the number of usable sequences, hence users, is somewhat less than the processing gain.

There has been considerable interest within the communications industry in recent years on the potential for Optical CDMA (OCDMA) to make more efficient use of the bandwidth available in fiber optic communications systems. The main problem with fiber optic systems is the inefficient nature of dedicated bandwidth allocation architectures. Many communications, particularly Internet Protocol communications, are extremely bursty. Therefore, as more users are added and depart, the bandwidth resource must be dynamically re-allocated. This may not be feasible.

The traditional method of signal processing used to address this problem in fiber optic systems is a frequency domain multiplexing protocol called wavelength division multiplexing (WDM). In WDM, the optical efficiency is increased by the creation of a plurality of wavelengths, each carrying a separate signal. Still, the number of wavelengths or channels that can be supported is constrained by the stability of each discrete wavelength and the tuning range of the diode laser. OCDMA is suggested as an alternative or in conjunction with WDM to increase the efficient use of fiber communications systems. The primary advantage of code division multiple access, as opposed to other optical multiple access or multiplexing techniques, is the reduced requirement on coordination of exact timing and frequency allocations to the multiple users. In OCDMA, all of the users occupy the same time and frequency space and are precisely separated using their specific chipping code, a much simpler task.

Earlier inventions have been described to implement OCDMA, which can be grouped in three categories: simple spectral domain methods, complex spectral domain methods, and time-domain based systems.

In a spectrally encoded OCDMA system, each user is identified by a particular pattern of spectral (frequency) components. These patterns can be encoded with a simple periodic optical filter, as disclosed by Pfeiffer in U.S. Pat No. 5,784,506 and U.S. Pat. No. 6,215,573. In U.S. Pat. No. 5,784,506, Pfeiffer discloses an electronic decoding of the spectral encoded signal. In U.S. Pat. No. 6,215,573, Pfeiffer discloses an optical receiver with filtering characteristics for decreasing cross talk. In U.S. Pat. No. 5,867,290, Dutt et al. disclose a system whereby the spectrally encoded signal is created by selectively attenuating certain wavelengths from a broadband light source.

Typical OCDMA proposed systems use unipolar codes that use plus ones (+1) and zeros (0), generally called on-off keying. Such codes are used because they are easily optically detected. This inherently reduces optical efficiency because a "0" code removes or discards available light. To increase optical efficiency, it is far better to use bi-polar codes, i.e. those consisting of plus one (+1) and minus one (−1). However, detection of bi-polar codes requires detection in the presence of an unmodulated reference beam, i.e., coherent detection. Coherent detection is difficult and expensive to achieve in a practical system.

The Dutt system is not very optically efficient due to the use of unipolar codes and it has a limited code set. The Pfeiffer systems are more efficient but also have a limited code set resulting in a limited number of users.

In U.S. Pat. No. 5,760,941, Young et al. disclose a method and system for transmitting bi-polar codes using pairs of unipolar codes. This method requires each of the pairs of unipolar codes to be separately transmitted on separate fibers or opposite polarization.

In U.S. Pat. No. 6,236,483, Dutt et al. disclose a system based upon Young U.S. Pat. No. 5,760,941 with the addition of the use of sub-band encoding to divide the spectra into sub-groups.

Both the Dutt and Young systems are based upon attenuating the optical carrier using unipolar codes. This scheme cannot achieve optimal optical efficiency.

In U.S. Pat. No. 6,313,771, Munroe et al. disclose an OCDMA system based upon use of fiber Bragg gratings to encode a short pulse into a sequence of plus one (+1) and minus one (−1) coded pulses, i.e., optically efficient bi-polar codes. In order to overcome inherent limitations of fiber Bragg gratings, this method specifically uses two stages of encoding to achieve a relatively long encoding pattern. This multi-stage system is complex to build and relies on two fiber Bragg gratings. This is less optically efficient than using a single grating.

In U.S. Pat. No. 6,292,282, Mossberg et al. disclose a time wavelength multiple access communication system whereby the optical signal of a user is separated into a small number of spectral bands. The resulting bands are transmitted in a specific time-sequence order. A decoder for a specific user removes the time sequencing of the spectral bands such that a signal from the intended user is time-aligned. The number of frequency bands, and hence, the number of available codes, and therefore users, is limited in a practical system.

In summary, the existing methods of OCDMA are not very efficient which yields a lower number of potential users. Furthermore, they rely upon grating technologies that have limited resolution. Lastly, some of the more efficient methods are complex and costly to manufacture.

Wavelength Stabilization and Locking. Wavelength division multiplexing (WDM) systems communicate multiple signals through a single optical fiber by utilizing a different optical wavelength for each carrier signal. In the multiplexing process, an information signal is combined with a carrier signal and multiple such combined signals, called channels, are multiplexed into a single optical fiber for simultaneous transmission. De-multiplexing involves the separation of channels into individual data-carrying signals. The International Telecommunications Union has developed standards for WDM with predefined frequencies at channel spacings of 100 GHz (or 0.8 nm). By reducing the channel spacing, increased numbers of data-carrying channels may be added. Because of ever-increasing bandwidth requirements, telecommunications carriers need more channels of information and narrow channel spacings of 25 GHz and below are being intensely studied.

For a number of reasons, practical systems utilizing 25 GHz and narrower spacing are developing slowly. In particular, maintaining increasingly narrower channel spacing demands extreme precision in the frequency stability from the source laser—a precision that is not reliably achievable. The wavelength of most lasers has a tendency to drift, and if the channel spacing is sufficiently close, crosstalk is introduced as the wavelength of one channel drifts closer to an adjacent channel. Factors such as equipment aging, device tolerances, power source fluctuations, and temperature changes all serve to complicate the problem.

It is well known that the frequency stability of WDM systems is highly temperature dependent. Temperature changes cause variations in the optical devices that have a direct impact on optical properties, for example, by expanding or contracting a material to alter its physical dimensions or by changing the index of refraction of a material. The likely result is that the frequency of interest "drifts" relative to the target or detector with a corresponding degradation of the signal. Active compensation systems employ heater/coolers to maintain the components at a constant temperature. These devices effectively solve the problem of frequency drift, but at relatively high cost and with a loss of overall efficiency due to the power requirements.

As a result of this problem, prior art solutions have been found that attempt to eliminate or minimize temperature-induced frequency drift. The various alternative devices to which this type of solution is applied are commonly referred to as wavelength references, wavelength lockers, or wavelength monitors. These devices vary in size, complexity and cost. Among the best performing wavelength lockers, from the standpoint of size, accuracy and cost, are those utilizing etalons.

A well-known etalon-based optical device for performing wavelength locking is a Fabry-Perot etalon, an example of which was previously illustrated and described with respect to FIG. 1. When used in a wavelength locker, a portion of the modulated laser output beam is commonly split. One segment of the beam is routed directly to an output while a second segment first passes through the etalon before reaching a detector. Only the single wavelength $\lambda$ exits the etalon and the device is designed to ensure that $\lambda$ is the "lock" wavelength. Tuning is commonly achieved by physically rotating the etalon slightly during device fabrication. This position, and hence the lock wavelength of the device, is permanent once construction of the device is completed. Once the device is initially designed and calibrated, it defines a precise fixed relationship between the two signals provided to the detector. Variation of the relationship resulting from laser wavelength changes is monitored and the laser driver input is altered via a feedback loop to minimize detected differences. A more complete description of such a system may be found in the technical article entitled "Wavelength Lockers Make Fixed and Tunable Lasers Precise," *WDM Solutions*, January 2002, p. 23.

The Fabry Perot etalon does not serve well as a WDM channelizer due to the difficulty in obtaining high optical throughput efficiency. If the input beam is divergent, e.g., the direct output of an optical fiber, then the output pattern for a given wavelength is a set of rings. Multiple wavelengths produce nested sets of concentric rings. It is difficult to collect this light efficiently and concentrate it at multiple detector points, or couple it to multiple output fibers, especially while maintaining the separation of wavelength components that the etalon has produced. If the input beam is collimated, e.g., the collimated output of an optical fiber, then the beam can be fanned over a narrow range of angles to produce only a single-order output (e.g., m=+1) for each wavelength of interest. This fanning makes it easy to concentrate the output light at multiple detector points or fibers, but there is inherently high loss.

U.S. Pat. Nos. 5,428,700, 5,798,859 and 5,825,792 to Hall, Colbourne et al, and Villeneuve et al. respectively all reveal laser stabilization systems employing Fabry-Perot etalons of the type described above.

U.S. Pat. No. 6,345,059 to Flanders describes a highly complex laser wavelength compensation system in which the tuned wavelength is maintained by controlling the optical length of the laser cavity. This disclosure states that the wavelength precision of this system is 0.1 nm accuracy, which equals 12.5 GHz channel spacing.

U.S. Pat. No. 6,289,028 B1 to Munks, et al. discloses the simultaneous monitoring, stabilizing, tuning, and control of laser source wavelengths with the aid of an error feedback loop. A rotatable optical filter provides wavelength tuning by tilting the filter in accordance with feedback signals.

An alternative type of wavelength locking is taught in PCT application IPO Number WO 01/35505 A1 to Sappey. A one or two-dimensional array of lasers at different spatial positions within an external resonating cavity illuminates a diffraction grating. Opposing the diffraction grating is either a mirror (in the one-dimensional case) or a second grating (in the two-dimensional case). Light fed back to the lasers causes the laser to lock to the wavelength of the feedback, resulting in each laser lasing as a discrete, well-controlled wavelength. Each channel of a WDM system requires its own stabilized laser.

Significant channel spacing reductions in WDM systems will require substantial improvements in wavelength stability, with the corresponding precision ability to monitor, tune and lock those wavelengths as needed.

Flat-Top Filter Shape. A common identifier of signal filtering capability for a WDM device is called the passband. The shape of the passband determines the ability of the filter to efficiently separate channels. The most desirable passband shape, a horizontal top and vertical sides, would discriminate all of the light energy corresponding to a desired channel and would pass no other light energy from, for example, an adjacent channel. It is currently impossible to obtain such a filter in practice, but the more closely a device approximates this ideal the better its signal processing capability becomes. Prior art references are replete with references to "top hat" filters in reference to efforts to approximate the ideal filter shape.

Grating-based technologies are effectively limited to 50 GHz resolution. They commonly obtain a flat-top response by first widening and then flattening the Gaussian filter shape, as is described in U.S. Pat. No. 6,298,186 to He. An adverse effect of this technique is an approximate 3 dB loss in signal strength because of the abnormal shape of the resulting passband.

Polarization based devices are known to provide better peak flatness and isolation for narrow channel spacings than can be obtained with interferometric devices as is taught in U.S. Pat. No. 6,208,444 to Wong.

The present invention resolves many of the disadvantages in the prior art by providing more nearly ideal flat-top passbands at resolutions less than 50 GHz.

Interleaving and De-interleaving. An interleaver is an optical device in a wavelength division multiplexing fiber optic network that separates (de-interleaves) and combines (interleaves) alternating channels, i.e., even and odd channels. U.S. Pat. No. 6,275,322 describes a well-known architecture based upon a Michelson interferometer combined with a Fabry-Perot etalon. FIG. 10, when considered as having the input at Port A, illustrates an example of the functional operation of a typical de-interleaver. Multiplexed signals $\lambda 1, \lambda 2, \lambda 3, \ldots$ enter interleaver 169 with a channel spacing of 100 GHz. Port B receives odd signals $\lambda 1, \lambda 3, \lambda 5, \ldots$ with a channel spacing of 200 GHz. Port C receives even signals $\lambda 2, \lambda 4, \lambda 6, \ldots$, also with a channel spacing of 200 GHz. FIG. 10, when considered as having the inputs at Ports B and C, illustrates an example of the functional operation of a typical interleaver. Odd signals as described above enter at Port B synchronously with even signals entering at Port C. Interleaver 169 combines the signals to produce an output signal containing channels $\lambda 1, \lambda 2, \lambda 3, \ldots$ with 100 GHz channel spacing. The channel spacing is always tied to the commercial telecommunications standard such as 100 GHz, 50 GHz, 25 GHz, etc., associated with DWDM signals. Interleavers work in this situation because even and odd channels have a frequency spacing that is double the frequency spacing for the combined set of channels. For example, in a 100 GHz spaced network, the odd channels are spaced by 200 GHz and the even channels are spaced at 200 GHz. By separating the even and odd channels, devices that are designed to work with 200 GHz spaced channels can interface with 100 GHz network devices.

By stacking interleavers, telecommunication carriers are able to improve bandwidth utilization and increase channel counts. Normally a fiber with channels spaced at 100 GHz carries 40 channels. Prior art FIG. 9 illustrates an example of how a carrier can increase this channel count by a factor of eight using seven interleavers. It is apparent from FIG. 9 that the prior art interleaver architecture is relatively complex and requires multiple devices, which introduces undesirable power losses into the system and increases device size and costs.

U.S. Pat. No. 6,275,322 B1 to Tai describes a prior art interleaver having a Michelson interferometer combined with a Fabry-Perot etalon. U.S. Pat. Nos. 6,212,313 B1 and 6,208,444 B1 describe optical interleavers that use the polarization property of light to separate odd and even channels. Their functional outputs are limited to two ports having one polarity or another.

There is a need for an optical interleaver suitable for the high data rate requirements of DWDM signal processing, that has the structural simplicity of a single device, and that does not have other disadvantages found within the prior art.

Optical Spectrum Analyzer. High-resolution spectrometers, or optical spectrum analyzers (OSAs), are used in a wide variety of optical applications. In particular, they are very important in fiber optic communication systems such as WDM where transmission power and laser performance is important to transmit information-carrying wavelengths. The higher the resolution of the OSA, the greater is the ability to monitor the fiber optic carrier.

Most all OSAs are based upon diffraction gratings. The gratings are many closely spaced grooves that scatter the incident light. The light scattered from each of the grooves creates an interference pattern some distance away from the grating that is used to obtain power estimates. In order to increase the ability to resolve the far-field pattern, the number of grooves must be increased as well as the spacing between the grooves must become more closely spaced. Although this can be accomplished, the size of the diffraction gratings and the expense of making such a large device creates a practical limit on the resolution of diffraction-grating based OSAs at 30 to 50 picometers. For example, U.S. Pat. No. 66,262,879 B1 claims a resolution of 4 GHz, which is equivalent to 32 picometers.

In a WDM system, the wavelengths of light being measured are on the order of 1.5 microns and they are spaced 50 to 100 GHz apart. Because of the high cost of laying optical fibers, achieving greater efficiency using existing fiber resources has become increasingly important. One trend in this direction is decreasing the spacing between wavelengths to 25 GHz, 12.5 GHz and less However, as channel spacing decreases common WDM network problems such as transmitter wavelength drift, filter concatenation, and signal distortion can more easily cause cross-talk between these closely-spaced channels. This makes it very important to continuously monitor all the channels in a functioning WDM system spaced at 25 GHz or less.

Integrated Optics. As with many technologies today, a principal goal of fiber optic telecommunication component manufacturing is to create WDM devices that are smaller, easier to fabricate, more reliable, and significantly cheaper than conventional products. To this end, multiplexer/demultiplexers, modulators, optical add/drop multiplexers (OADM), wavelength switches, and channel-monitoring equipment with integrated optical (IO) packaging and planar structures are increasingly populating the WDM component industry, including arrayed waveguide gratings (AWG) devices and planar lightwave circuits (PLC).

Several companies commercially produce integrated optic WDM devices, including Nortel, Lucent Technologies, JDS Uniphase, Corning, Bookham, and others, which are based on AWG and planar technologies. These devices perform a variety of functions within fiber optic networks and are becoming increasingly important as fiber optic systems and networks are required to handle larger volumes of data and voice traffic at faster rates. However, current WDM integrated optic technologies suffer from the same channel spacing and resolution limitations as their bulk optic counterparts. Wavelength separation closer than 50 GHz, within the ITU DWDM grid, has remained illusive to current planar and hybrid device technologies.

As is the case with their bulk counterparts, integrated optic (IO) WDM multiplexer and demultiplexer devices require optical elements to combine and separate the multiple wavelengths of the input signal. Many of the methods of wavelength separation used in bulk WDM demultiplexing equipment have also been incorporated into IO devices including diffraction gratings, AWGs, thin film filters, and Fabry-Perot interferometers. The operation, advantages, and disadvantages of these, and other dispersive methods, are addressed elsewhere in this patent application, and can be applied to integrated optical devices, as well.

A standard method of fabricating IO WDM demultiplexers/multiplexers devices is to place an AWG between a diffraction grating and a focusing lens. In such a configuration, the diffraction grating disperses the wavelengths, and lenses are used to couple discrete wavelengths into individual optical fiber. Examples of a planar 10 wavelength demultiplexers/multiplexer based upon this fundamental AWG structure are described in U.S. Pat. No. 5,799,118, in EP 0 984 304, and in U.S. Pat. No. 6,404,946. Although integrated optical diffraction grating-based devices, such as the aforementioned examples, are being used in WDM systems, their resolution is limited. An IO WDM device with a diffraction grating and an AWG would need to be very large and expensive to have sub-50 GHz channel resolution, and would suffer from very high loss.

An IO multi/demultiplexer that uses an echelon grating is described in U.S. Pat. No. 4,715,027, wherein the grating is formed on a dielectric substrate by photolithographic and etching techniques. In this case, the echelon grating could be made either wavelength-transmissive or reflective, depending on fabrication methods. This type of grating overcomes the size-dependency limitations and fabrication difficulties of other diffraction grating-based WDM devices. However, this device cannot produce the narrow channel spacing and high channel counts of an OTDL-based integrated optical demultiplexer.

In U.S. Pat. No. 4,279,464 Colombini describes and integrated optical wavelength demultiplexer that improves upon diffraction grating-based IO WDM demuxes by replacing the grating with a dispersive thin film prism within a multi-layer stack deposited onto a silicon wafer. By using a thin-film prismatic layer to angularly disperse and separate the wavelengths, the proposed device would have lower insertion losses and higher channel capacity. However, the fabrication of this IO demultiplexer could be extremely difficult and expensive due the precision required in the thin film deposition process to lay down the prism and lens layers, as well as the nature of the stack materials.

FIG. 57 shows a prior art a planar waveguide integrated optical multiplexer and demultiplexer device, as disclosed by Bhagavatula in U.S. Pat. No. 6,111,674. In this device, a multiple-wavelength input signal is demultiplexed using a Fabry-Perot thin film stack consisting of alternating partially reflective and transmissive layers. The angularly dispersed wavelengths emerge from the "optical path length difference generator" and are individually coupled to a fan-shaped output array of waveguides by means of a focusing lens. This device could be fabricated as either a planar or a Hybrid IO structure. The drawback to this type of integrated optical WDM demultiplexer/multiplexer is the inherently high loss associated with the thin film wavelength-separation elements, which limits the number of channels that can be effectively demultiplexed, as well as the level of channel spacing within a DWDM system.

The OTDL technology and devices described herein allow for fabrication of WDM products with much finer wavelength channel spacing than currently possible with optical communications equipment, by operating in very narrow bands within each 100 GHz ITU DWDM channel. One can achieve data-carrying channels that are as narrow as 2.5 Hz per bit without pulse shaping, and can reach 0.8 Hz per bit with pulse shaping using OTDL technology. In practical application, this means that an OTDL device can carry sixteen OC-48 (2.5 Gbits/sec) data channels over each 100 GHz DWDM channel.

One approach for fabrication of OTDL devices is a bulk optical approach composed of discrete components with free-space optical connections, as disclosed herein and in co-pending U.S. patent application Ser. No. 09/687,029. Such a method of construction could be very labor intensive and expensive as each optical component and sub-system must be aligned and fixed in place. Maintaining important fabrication and functional tolerances can be difficult. In addition, as functionality of the bulk OTDL device is increased, so are the part count and device size. In today's WDM networks, this can be a disadvantage as component dimensions are crucial to system construction and cost.

The fundamental operation of the OTDL is similar to that of AWG technology, based on performing a Fourier Transformation of a set of time-offset signal samples. However, AWG technology relies on a set of individual waveguides, each of a different length, to create the time-offset samples, while the OTDL technology uses an optical cavity with a partially transmissive surface as an optical delay line. This method allows the creation of a larger array (more elements) of time-offset samples, and greater time delay between samples, leading to higher resolution and an increased channel count. Furthermore, the optical cavity technique affords a smaller package footprint than that of an AWG device performing an equivalent function.

SUMMARY OF THE INVENTION

The present invention provides solutions to all of the above-identified deficiencies in the prior art, all of which solutions derive from a novel optical tapped delay line (OTDL). The OTDL is the subject of co-pending U.S. patent application Ser. No. 09/687,029, filed Oct. 13, 2000, which provides a method and device for independently operating on each of one or more optical inputs and producing two-dimensional spatially separated independent optical beams at the output. The spatial separation among the output beams is a function of the frequency components of the corresponding optical input beams. That invention enables the simultaneous channelization of hundreds of discrete input beams into their constituent frequency components with at least twice the resolution of existing technology. The embodiments described below utilize that device in novel combinations to perform many desirable signal processing functions.

Multiplexing and Demultiplexing An embodiment of the present invention can combine tens and hundreds of individual optical signals onto one or more common fiber optic waveguides and the same device can separate tens and hundreds of individual optical signals from one or more fiber optic waveguides.

These embodiments of the invention are capable of separating or combining channels even when the spacing between wavelengths are as narrow as 50 MHz (i.e., 0.4 pm at 1550 nm). More specifically, the spacing between wavelengths can be between 25 GHz and 50 MHz, for example.

Optical Add/Drop Multiplexer. An embodiment of the present invention provides an optical add/drop system for a wavelength division multiplexing fiber optic transmission system. More specifically, an embodiment of the present invention combines an Optical Tapped Delay line (OTDL) with a subsystem to perform the adding or dropping of single or multiple wavelengths from an optical fiber.

The OTDL component of an add/drop system in accordance with one aspect of the present invention enables the simultaneous channelization of hundreds of discrete input beams into their constituent frequency components at independent spatial locations. Each of the output beams is a function of the frequency components of responding input beams. The spatial separation of each wavelength enables the present invention, in this embodiment, to simultaneously add or drop one or more wavelengths from one or more input beams. Accordingly, this embodiment does not rely on grating and filters, which can only select single wavelengths and are not capable of dynamically selecting one or more wavelengths.

An evolutionary path of WDM is to pack more wavelengths into the same fiber using narrower channel spacings and bit rates such as 2.5 and 10 gigabits per second. Adding or dropping these narrowband channels using filters or grating technologies becomes very difficult or impossible. However, embodiments of the present invention do not rely on grating or filters. Therefore, these embodiments of the invention are capable of separating channels for adding or dropping even when the spacing between wavelengths is as narrow as 50 MHz (i.e., 0.4 pm at 1550 nm). More specifically, the spacing between wavelengths can be between 25 GHz and 50 MHz, for example.

According to one embodiment of the invention, once the wavelengths have been separated, a separate subsystem performs the adding and/or dropping of the wavelengths. This add/drop subsystem may include a mirror with a hole or a micro-electro-mechanical system. Other known methods of adding and/or dropping wavelengths may be used.

According to another embodiment of the invention, a mirror with a hole may be used to add/drop the wavelengths. The location of the hole is at the same spatial location as the spatial location of the target wavelength. The target wavelength preferably passes through the hole, is coupled to a fiber and then is passed to an optical device, such as a circulator, for continuation on another fiber optic path. The target wavelength may also be passed on to a detector for conversion to an electronic form.

According to still another embodiment of the invention, to select multiple wavelengths, there can be multiple holes in the mirror at pre-determined locations. To dynamically select a wavelength, for example, the mirror can move up or down to position the hole or holes at the target wavelengths.

According to another embodiment of the invention, a Micro-Electro-Mechanical System (MEMS) with micro-mirrors may be utilized for the add/drop subsystem. The micro-mirrors are preferably positioned at the spatial location of every output light beam. To select one or more channels, one of the micro-mirrors is preferably canted at an angle to reflect the target wavelength to a fiber/circulator or detector for adding and dropping the information carrier to another destination.

Optical Code Division Multiple Access. The proposed Optical CDMA system is analogous to well-known radio frequency (RF) CDMA techniques, widely used in cellular telephones and many other places, and is enabled by the existence of the Optical Tapped Delay Line (OTDL) technology. The OTDL acts as a shift-register to provide parallel time-shifted outputs that can be operated on by conventional optical elements such as spatial light modulators, lenses and detectors. With the proper arrangement of elements, the required phase and/or amplitude encoding and decoding operations can be performed to implement an optical CDMA system.

The enabling characteristic of the OTDL is the capability to present a very long optical path within a small space and to permit a controlled tapping off of energy from the optical beam at uniform intervals. This capability is applied principally to achieve high resolution spectral separation. According to an embodiment of the present application, the capability enables a single short optical pulse to be passively converted into a large number of identical spatially distinct pulses at uniform time delays. Thus, each pulse replica may be independently modulated (coded) using simple spatial means, rather than using more complicated temporal means, prior to recombining into a time sequence of coded pulses. The long total time delay capability also means that rather low data rate signals, as low as 50 MHz, can be efficiently utilized.

The simple spatial modulation capability of the OCDMA application of OTDL enables the device of this embodiment to be low power since the OTDL is inherently a passive device and no active component needs to operate at the chip-rate. Further, the device of this embodiment is simple and requires fewer components than the prior art. As a result, the device has a lower cost to fabricate.

A single OTDL device can generate tens to hundreds of pulse replicas and, thus, support OCDMA systems with tens to hundreds of users. This is more users than the prior art systems. Further, since according to an embodiment of the invention, the OTDL device can be used in two dimensions, a cascade of a simple N tap one-dimensional devices, each with an N input by N tap two-dimensional device, produces $N^2$ pulse replicas, and, hence, can generate codes of length $N^2$ and support $N^2$ users. A forty tap one-dimensional device, for example, combined with a forty input two-dimensional forty tap device would support up to 1600 users on a single wavelength according to this embodiment. This is far higher than any previous technology.

An OTDL also has lower optical insertion loss compared to the spectral de-modulation techniques discussed in the prior art. In addition to the application of data transmission over fiber optic networks, OTDL-based systems have several other potential applications such as:

Switching and routing in fiber networks: The OCDMA sequence could be used to superimpose routing information such that OCDMA encoded data packets will be detected only by the intended receiver.

Clock distribution and time epoch synchronization: Optical CDMA may be useful to transmit common clock and timing information in a TDMA system without using TDMA time-slots or the need for phase-locked clock recovery systems.

Wideband RADAR Signal Generation: Used within a coherently detected system with a frequency shifted reference beam, the transmitter can directly generate wideband spread-spectrum RF signals with effective chip rates in the 10's of GHz, useful in advanced radar systems.

Optical Equalizer: The OTDL is an optical transversal filter which can be implemented with electrically or optically programmable tap weights. This makes it possible to change the characteristics of the filter dynamically, for example to compensate for changes in transmission path. This allows all of the conventional electronic adaptive signal processing algorithms to be applied to optical networks. Many of these algorithms are outlined in "Theory and Design of Adaptive Filters" by Treichler, Johnson, and Larimore, Published by John Wiley & Sons. These algorithms enable dynamic equalization, interference rejection, echo cancellation and dynamic dispersion compensation (both chromatic and polarization). Also, dynamically adaptive transversal filters can be used to remove some nonlinear effects on optical fibers. Several of the prior art references note that such an optical analog of conventional electronic signal processing componentry would be desirable, but is not available.

In addition, the present invention has several technical advantages over other OCDMA methods. The present invention can provide increased efficiency by performing bi-phase shifting of light, or even higher order quadrature amplitude modulation (QAM) where multiple phase and amplitudes states are possible for each code pulse, as opposed to simple on-off keying. Also, according to this embodiment, the device is self-coherent, not requiring separate coherent reference and coherent detection for decoding. Further, high-rate code modulation can be produced without the need for high speed clocks.

According to an embodiment of the invention, a OTDL device is used as an encoder to produce a space integrating signal generator in which a time sequence of spatially separated optical pulses are derived from a short optical pulse. It is then possible, according to this embodiment, to produce controlled phase modulation on each pulse of the time sequence and then to combine the time series of pulses as a continuous stream for transmission on the optical fiber.

The process of this embodiment is then duplicated with the inverse of the code in reverse order to create a space-integrating receiver. In this embodiment, the encoded output from an optic fiber enters the OTDL. The encoded output is preferably the time sequence of modulated pulses produced by a number of space integrating signal encoders. The phase modulation is preferably programmed with the inverse reverse pattern of the phase pattern that produced the time sequence such that, as the time series of pulses progress through the OTDL, the phase modulator may undo the transmitted phase modulation.

When the phase pattern of the pulses matches the pattern of the decoder, the exiting pulses are preferably all aligned in phase. When the phases are aligned, the integrated light beam preferably focuses to a point on the detector producing a peak output. At all other times, the light is defocused, i.e. spread out in space.

According to embodiments of the present invention, both fixed and programmable coding/decoding devices are easily implemented, as are a spectral domain signal encoder and decoder. A CDMA signal is produced by modulating the constituent frequency components of the signal by placing an amplitude and phase modulator at the Fourier transform plane formed from the output of an OTDL device, fed with a constant broad spectrum light source.

According to another embodiment of the present invention, it is also possible to build a spectral domain signal encoder and decoder. In this embodiment, the CDMA signal is produced by modulating the constituent frequency components of the signal by placing an amplitude and phase modulator at the Fourier transform plane formed from the output of an OTDL device, fed with a constant broad spectrum light source.

The chip rate of the code is preferably determined by the construction of the OTDL device. The chip rate may be the inverse of the delay between the individual taps on the OTDL. The code length may be determined by the total number of taps in the OTDL device.

Wavelength Stabilization and Locking. The present invention, in a preferred embodiment, utilizes unique properties of an optical time delay line (OTDL) to, with high precision, monitor, tune and lock optical wavelengths. It permits passive mechanical compensation of output variations in the wavelength of a laser, due to thermal effects, equipment aging, power fluctuations or other causes. The unique OTDL construction permits a collimated multi-spectral beam to be separated into its constituent wavelengths and detected with high precision. Wavelength drift may be measured by comparison circuitry at the output and feedback signals are generated to retune the laser to correct for the unwanted drift. Advantages of the present invention, in a preferred embodiment, include the ability to tune the lock frequency at much better precision than currently known and the freedom from the necessity to introduce a radio frequency modulation to determine the error signal direction. An apparatus in accordance with the preferred embodiments will permit measurement of laser lines of 1 pm (picometer) or narrower. It will also stabilize multiple laser sources with a single OTDL device having little sensitivity to temperature change.

A wavelength stabilizer in accordance with a preferred embodiment of the invention would include a laser; an optical tapped delay line having an input for receiving a collimated beam of light from the laser and an output to which is provided multiple time-delayed output beams, the collimated beam comprising a plurality of predetermined wavelengths, the multiple time-delayed output beams being mutually phase-shifted as a function of the wavelengths of the collimated beam and being spatially distributed, whereby the collimated beam is channelized into constituent predetermined wavelengths; and, means connected to the output for detecting variations in the constituent wavelengths over time, and means for controlling the laser in accordance with the detected variations to return the collimated beams to their pre-determined wavelengths Flat-Top Filter Shape. A primary goal of WDM systems is to maximize the number of multiplexed channels carried by the optical fiber while maintaining the quality of every independent signal within each channel. Improving the data rate of a device is dependent upon creating a spectral response with a flatter, wider portion throughout the passband. Other advantages are improving tolerance to wavelength drift of an input signal or drift resulting from temperature variation, higher channel resolution, reduction crosstalk, improved signal power conservation, and reduction of polarization dispersion. The capacity of a passband filter is typically measured by the width of the frequency response of the filter at −1 dB signal loss point. Generally, the width of the channel should be twice the data rate. For example, to carry a 2.5 Gbps signal, a bandwidth of 5 GHz is needed. FIG. 35 illustrates an example of a typical DWDM frequency spectrum with 50 GHz channel spacing. Curve 582 illustrates an example of a typical Gaussian curve with a passband at −1 dB of $\Delta_1$, while curve 585 illustrates an example of an improved response curve with a passband at −1 dB of $\Delta_2$. The cross-hatched areas 586 and 587 in FIG. 35 indicate the capability of a flat-top passband, curve 585, to increase the useable signal area compared to the typical Gaussian channel represented by curve 582.

As channel spacings narrow, DWDM components should have higher peak transmission of the specified wavelengths and should provide improved isolation between separated wavelengths.

The significantly enhanced passband filter characteristics of the OTDL as described above permit construction of DWDM devices having vastly greater data carrying capacity than was previously possible.

The present invention significantly improves the data-carrying capability of an OTDL by enhancing the device to produce a near-optimal flat-top passband filter shape. It permits multiple beams of light to enter or exit the device.

Interleaving and De-interleaving. The multi-port OTDL facilitates construction of devices for interleaving and de-interleaving the channels of a WDM or similar multi-channel signals having exceptionally close channel spacing. The necessity for cascading multiple devices is eliminated, greatly simplifying the construction of a multi-channel interleaver and reducing the insertion losses associated with a greater number of components. The bi-directional nature of an OTDL permits the same device to be used either as an interleaver or as a de-interleaver depending on the direction of signal travel through the OTDL.

Optical Spectrum Analyzer. An OTDL can perform the fine spectral separation important for testing and monitoring DWDM signals. Combined with a diffraction grating, another OTDL, or any other device that spatially disperses light according to its wavelength, to perform the course separation, the present invention provides for several practical and useful embodiments of optical spectrum analyzers. In combination with a signal processor and a monitor, the optical spectrum analyzer of the present invention provides real-time monitoring of tens and hundreds of wavelengths at very high resolution. Since it is generally prudent to have resolution 20 times or more finer than the channel spacing, monitoring a fiber carrying 25 GHz channels requires a resolution of less than ten picometers. Likewise monitoring a fiber carrying 12.5 GHz channels requires two picometers of resolution. The theoretical resolution limitation of the OTDL is 0.4 picometers. This is the only known technology that can practically achieve resolution of less than twenty-five picometers.

Integrated Optics. To address the issues associated with fabricating bulk optical OTDL devices, the present invention implements the use of integrated optical packaging to manufacture the component elements of an OTDL communications device as either monolithic or hybrid planar waveguide structures. Use of well known prior art methods of producing integrated optic devices, also known as Planar Lightwave Circuits (PLC's), creates significant economic advantages in the manufacture of OTDL devices and components, as well as reducing the size of these devices and components. By reducing both the unit cost and the spatial requirements of OTDL devices and components, the cost of implementing this technology in communications networks is commensurately reduced, and the optical efficiency of the network is commensurately increased.

As described within this patent application and that of co-pending U.S. patent application Ser. No. 09/687,029, the Optical Tapped Delay Line (OTDL) technology is based upon the use of bulk optics to achieve extremely narrow channel spacing for various fiber optic telecommunication WDM functions. However, at its basic level, OTDL is a one-dimensional technology. Only one of the two lateral dimensions, x and y, is used for performing the optical signal processing function, in addition to the third dimension, z, which is the nominal direction of light propagation through the device. As such, fabrication of 1-D OTDL devices in monolithic or hybrid planar waveguide structures is feasible.

The fundamental methodologies for fabricating these devices exist and are currently used to fabricate several useful fiber optic telecommunications products, including arrayed waveguide (AWG) multiplexers and demultiplexers. The invention presented herein describes methods and apparatus for fabricating OTDL devices using high-resolution planar integrated optics. The fabrication of integrated optic OTDL multiplexer/demultiplexer and modulator devices affords extremely compact WDM system components with high channel counts, narrow channel spacing, and minimal part counts thereby offering substantial economic advantages over alternative technologies.

The present invention provides a high resolution integrated optical OTDL WDM device, which can be used to demultiplex an optical signal carrying multiple wavelengths of modulated data. By operating the integrated optical OTDL demultiplexer in the reverse direction, the device can function as a multiplexer to combine discrete wavelength signals into a single optical fiber output. In a third embodiment, an integrated optical OTDL demultiplexer and multiplexer are individually coupled to a data-modulator array to function as a WDM multi-channel modulator device. And in an additional embodiment, the integrated optical device features a curved, self-focusing OTDL cavity, which eliminates the need for a separate lens system to manipulate the individual beamlets emanating from the OTDL cavity output, thereby rendering a lower part count ant a smaller device footprint. Additional embodiments of the monolithic integrated optic OTDL demultiplexer/multiplexer devices are also described, in which evanescent coupling is used as an alternative means of wavelength separation of a multi-channel optical signal.

DETAILED DESCRIPTION OF THE PREFERRED EMBODIMENTS

The following detailed description is of the best presently contemplated mode of carrying out the invention. This description is not to be taken in a limiting sense, but is made merely for the purpose of illustrating the general principles of the invention. The scope of the invention is best defined by the appended claims.

Figure 11:
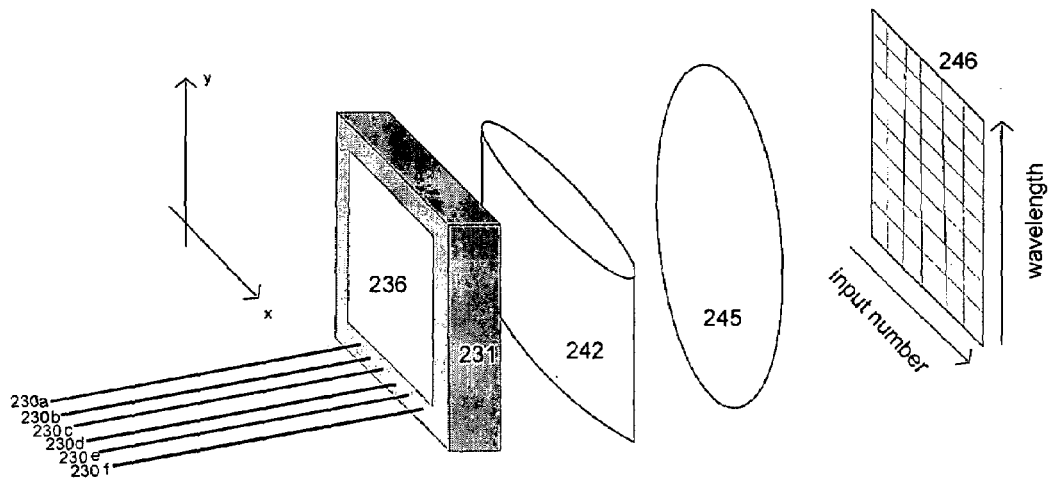
FIG. 11 illustrates an example of a preferred embodiment of an OTDL device in accordance with the present invention
Figure 12:
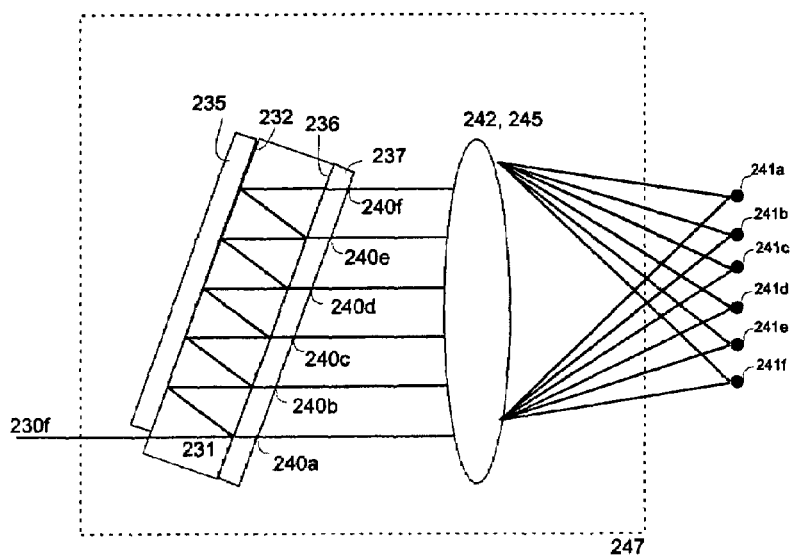
FIG. 12 illustrates an example of an operational side view of the OTDL device.

Optical Tapped Delay Line. FIGS. 11 and 12 illustrate a preferred embodiment of an OTDL device in accordance with the present invention. In the illustrated example, six collimated input beams 230a-230f enter a transparent plate 231. The origin of the beams may be, for example, the collimated outputs of six optical fibers (not shown) where each fiber typically carries multiple wavelength channels. The plate 231 has a first surface 232 that is provided with a coating 235 that is substantially 100% reflective. The plate 231 has a second surface 236 that is spaced from and opposed to the first surface 232. The second surface 236 is provided with a coating 237 that is partially reflective.

In the illustrated embodiment, the partial reflectivity of the second surface coating 237 is spatially varying. In an alternative embodiment (not illustrated), the partial reflectivity of the second surface coating 237 may be substantially uniform.

In the illustrated embodiment, the reflective surface coatings 235 and 237 are separated by a glass plate 231. In alternative embodiments (not illustrated), the reflective surfaces may be separated by other transparent materials, including empty space. The element 231 may also be referred to as an optical cavity.

FIG. 12 illustrates an example of an operational side view of the device shown in FIG. 11. The single input beam 230f illustrated in FIG. 12 corresponds to the input beam 230f illustrated as one of the multiple input beams 230a-f in FIG. 11. Due to the perspective of FIG. 12 the other input beams 230a-e are not illustrated. However, it will be understood that the other multiple input beams 230a-e reside behind the input beam 230f in the view shown in FIG. 12, and that the device is capable of processing and channelizing all of the multiple input beams simultaneously.

Referring to FIG. 12, the input beam 230f enters the cavity 231 as a collimated beam of light. Focusing of the input beam is not required. After entering the cavity 231, a portion of the collimated input beam exits the cavity at a first location or "tap" 240a as collimated output beam 241a. Another portion of the collimated input beam is partially reflected by the coating 237 and then totally reflected by the coating 235. In other words, a portion of the beam "bounces" from the coating 237 to the coating 235 and then back. This reflection or "bounce" produces a collimated output beam that exits at a second location or tap 240b that is slightly displaced spatially from the first tap 240a. As a result of the bounce, the distance traveled by the output beam 241b is slightly greater than the distance traveled by output beam 241a. The width of the optical cavity 231 between reflective surfaces 235 and 237 thereby introduces a slight time delay between adjacent taps. The reflective process is continued, producing multiple additional collimated output beams 241a-i exiting the cavity 231 at multiple tap locations 240a-i. The result is a series of output beams that are distributed in the y direction with a progressive time delay from beam to beam.

Although not illustrated in FIG. 12, it will be recognized that a similar series of output beams distributed in the y direction may be simultaneously produced for each one of the input beams 230a-f. In other words, the device is capable of operating on each one of the multiple collimated input beams independently of the other input beams. The device therefore may be referred to as a "two dimensional" device, in the sense that the device uses two different spatial dimensions to perform signal-processing functions. A first dimension x accommodates multiple independent collimated input beams that are all independently channelized along a second dimension y.

The various beams remain substantially collimated throughout the reflective process. Divergence of the beams and interference among the beams is minimized. Numerous internal reflections within the cavity 231 may be achieved without substantial divergence or interference.

In the embodiment shown in FIG. 11, the various output beams are then directed to an anamorphic optical system 242, 245 that is spaced from the optical cavity 231. In the illustrated embodiment the anamorphic optical system comprises a cylinder lens 242 and a spherical lens 245. The anamorphic optical system 242, 245 performs the functions of: 1) Fourier transformation of the output of the cavity 231 in the vertical dimension y, and 2) imaging of the output of the cavity 231 in the horizontal dimension x onto an output surface 246. Although not illustrated in FIG. 11, it will be recognized that the optical system 242, 245 may have some form other than anamorphic as described above, depending on the particular application of the OTDL device. The functions performed may be, for example, Fourier transformation in both dimensions, partial or fractional Fourier transformation in one or both dimensions, imaging, or any combination of these functions.

The output surface 246 illustrated in FIG. 11 is two-dimensional. The horizontal dimension x of the output surface 246 corresponds to the input beam index. The vertical dimension y corresponds to the wavelength of the light in the input beam. There are a wide variety of devices that might be positioned at the output surface 246. For example, a detector array, a lenslet array, a light pipe array, a fiber optic bundle, an array of GRIN lenses or any combination of the above may be positioned at the output surface 246.

Figure 13:
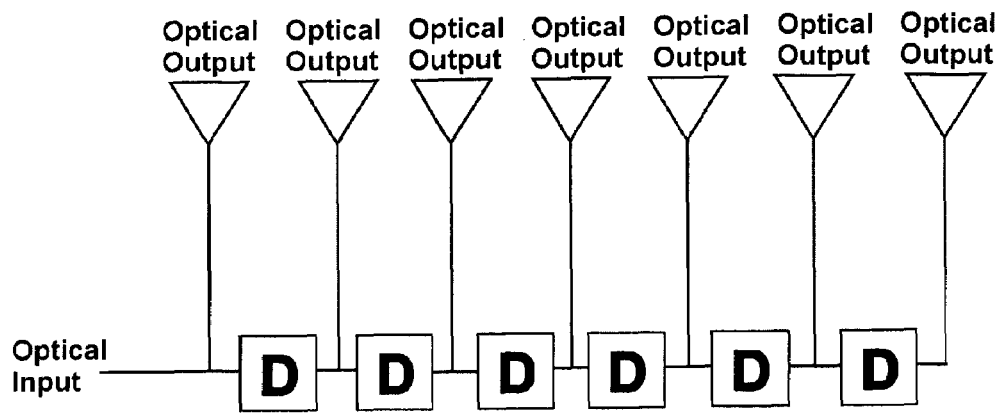
FIG. 13 is a schematic block diagram illustrating an example of the functional operation of an OTDL device such as that shown in FIG. 11.

The operation of the embodiment of the OTDL device shown in FIG. 11 may be better understood by reference to FIG. 13. FIG. 13 is a schematic block diagram illustrating an example of the functional operation of a device such as that shown in FIG. 11. The multiple delay elements that are schematically illustrated by the boxes labeled "D" in FIG. 13 correspond to the plurality of bounces between reflective surfaces 235 and 237 that occur in the cavity 231 shown in FIG. 11. Each of the delay elements D imposes a small, additional time delay upon the optical input. At each element D the delayed optical input is tapped to produce a corresponding optical output.

Referring to FIG. 13, if the frequency of the optical input is such that there is a $2n\pi$ radian phase shift (where n is an integer) between adjacent optical outputs, then all of the optical outputs will be in phase. If all of the optical outputs are in phase, then the coherent sum of the optical outputs results in a plane wave that propagates in a direction that is perpendicular to the line containing the optical outputs and is lying in the plane of the page of FIG. 13. We define this direction to be the optical axis of the system.

If the frequency of the optical input is then slightly increased (or decreased), there will be a corresponding change in phase shift from optical output to optical output. This change in phase shift will cause the plane wave to propagate at an angle relative to the optical axis.

If the frequency of the optical input is increased (or decreased) even further, then the angle will also increase (or decrease) until the phase shift from optical output to optical output reaches $2(n+1)\pi$ radians. At that point the plane wave will again propagate in the direction of the optical axis.

Figure 14:
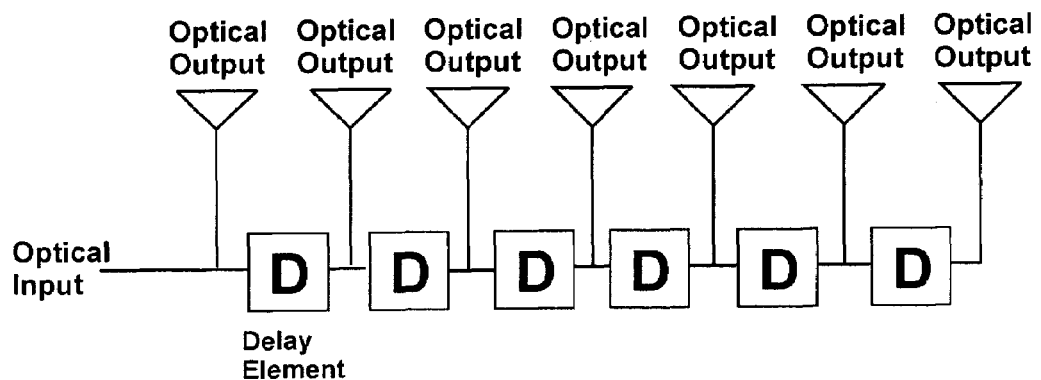
FIG. 14 is a schematic block diagram illustrating an example of the functional operation of an OTDL device such as that shown in FIG. 11.

FIG. 14 is a schematic block diagram illustrating an example of the functional operation of a device corresponding to the device illustrated in FIG. 11, including the anamorphic optical system 242, 245 and output surface 246. The optical system performs a Fourier transformation that converts a plane wave propagating at a given angle with respect to the optical axis into a focused optical spot on one of the output elements at the output surface. The output elements may be photodetectors, optical fibers, or any other optical element.

Figure 15:
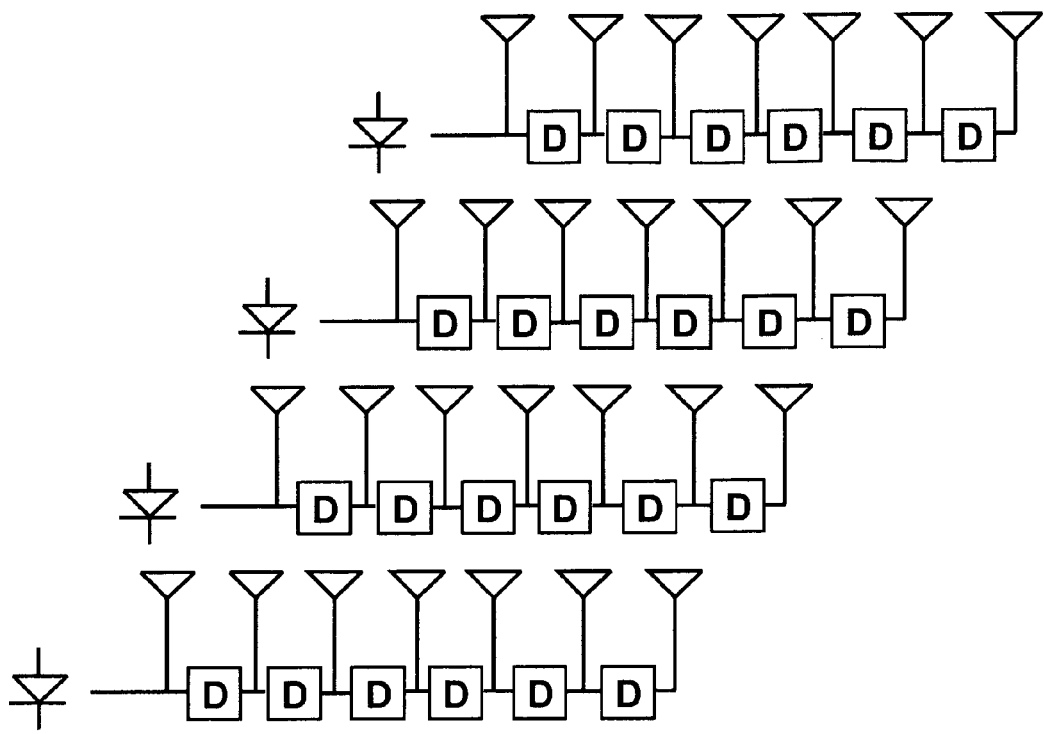
FIG. 15 is a schematic block diagram illustrating an example of the functional operation of an OTDL device such as that shown in FIG. 11 in a multiple-input arrangement.

FIG. 15 is a schematic block diagram illustrating an example of the functional operation of a device such as that shown in FIG. 11 in a multiple-input arrangement. The schematic is a multiple-input version of the functional block diagram shown in FIG. 13. Here the optical input sources are shown as diodes. All other functional blocks are the same as in FIG. 13. FIG. 15 illustrates an example of the ability to process multiple optical inputs simultaneously.

Mathematical Theory of Operation

The following paragraphs are directed to a discussion regarding the mathematical theory of operation of the OTDL. This discussion is not to be taken in a limiting sense, but is made for the purpose of describing the inventors' present understanding of the mathematical theory underlying the operation of the invention.

Assumptions: The mathematical theory of operation of the OTDL is more easily understood if certain simplifying (but realistic) assumptions are made with reference to the embodiment shown in FIGS. 11 and 12. These assumptions include the following.

The diameter of the input beam is sufficiently large such that the beam profiles of the output beams 241a-i are approximately the same.

There is no phase shift associated with the transmission or reflection from either of the reflective surface coatings 235 and 237.

There is no loss in the reflective surface coatings 235 and 237.

The first reflective coating 235 is totally reflective.

The transmittance and reflectance of the surface coatings 235 and 237 are constant over the input beam profile.

None of these assumptions are required for the invention to work. However, they greatly simplify the mathematical theory of operation. As these assumptions are relaxed, the mathematical theory becomes more complex, but the basic principles of operation remain the same.

Definitions: The quantities, variables, and functions used in the mathematical theory are defined below.

Let a be the peak input signal amplitude.

Let x and y be continuous spatial coordinates in the horizontal and vertical directions, respectively. x is normalized to the input beam spacing, and y is normalized to the output tap spacing. Therefore, the values of x and y are whole numbers at the tap centers, and at these points x and y are interpreted as the input beam number and tap number, respectively.

The distance x in meters is the normalized x times the input beam spacing in meters.

The distance y in meters is the normalized y times the output tap spacing in meters.

Let $b(x,y)$ be the input beam complex amplitude profile.

Assume that $b(x,y)$ is separable, i.e., $b(x,y)=b_x(x)b_y(y)$.

(This assumption is not required but it simplifies the mathematics.)

Let $\tau$ be the time delay between adjacent output beams, e.g., 141a and 141b.

Let d be the spacing between adjacent output beams, e.g., 141a and 141b, in units of length.

Let m be the total number of taps in the y direction.

Let $f(x)$ be the optical frequency components in the input position x.

Let $p(x,y)$ be the envelope of the optical distribution of the sum of all the output beams 241a-i at the output of plate 231 be the Dirac delta function.

Let * represent the convolution operation.

Let $F_y$ be the Fourier Transform operator in the y direction.

Let $t(x,y)$ be the amplitude transmission coefficient of the partially reflective coating 237.

Let $T(x,y)$ be the corresponding power transmittance: $T(x,y)=|t(x,y)|^2$.

Let $r(x,y)$ be the amplitude reflection coefficient of the partially reflective coating 237.

Let $R(x,y)$ be the corresponding power reflectance: $R(x,y)=|r(x,y)|^2$.

(Note that for a lossless coating 237 conservation of energy that $T(x,y)+R(x,y)=1$.)

Let $c(x,y)$ be the complex amplitude of the output beam at location $(x,y)$. The "c's" represent the tap weights in the optically tapped delay line.

Theoretical Development: Expressions for the output beams at the tap centers where y is equal to a whole number can be written as follows.

output beam 241a:

$$c(x,0)=a\,b(x,0)t(x,0),$$

(by assumption 5)

output beam 241b:

$$c(x,1)=a\,b(x,0)r(x,0)t(x,1)e^{j2\pi f(x)\tau}$$

output beam 241c:

$$c(x,2)=a\,b(x,0)r(x,0)r(x,1)t(x,2)e^{j2\pi f(x)2\tau},$$

and so on.

In general, the output beam at the center of the $n^{th}$ tap, $c(x,n)$, can be written as $$c(x,n)=ab(x,0)t(x,n)e^{j2\pi f(x)n\tau}\prod_{j=0}^{n-1}r(x,j)$$

In general, the magnitude of $c(x,n)$ is some function of n, $|c(x,n)|=w(n)$. The values $w(n)$ are the tap weights, and generally the weights are selected to control the channel filter shape of the system. One example of the calculation of the tap weights is a uniform set of weights, $w(n)=1$. For a uniform set of tap weights $|c(x,0)|=|c(x,1)|=|c(x,n)|=1$.

For high efficiency it is desirable to have no optical loss. This implies that all remaining light will be transmitted out of the plate 231 at the last tap. Let m be the index of the last tap. This gives the condition t(x,m)=1.

The case for which the tap weights are uniform gives the condition |c(x,n)|=|c(x,n−1)|, for all n. In terms of the amplitude transmission and reflection coefficients this condition implies that $$t(x, n)\prod_{j=0}^{n-1} r(j) = t(x, n-1)\prod_{j=0}^{n-2} r(j)$$

This equation can be rewritten in terms of the power transmittance as $$T(n) = \frac{T(n-1)}{1 - T(n-1)}$$

The transmittance at the second tap T(1) in terms of that at the first tap T(0) is $$T(1) = \frac{T(0)}{1 - T(0)}$$

The transmittance at the third tap is $$T(2) = \frac{T(1)}{1 - T(1)} = \frac{T(0)}{1 - 2T(0)}$$

By induction, the transmittance at the $n^{th}$ tap T(n) can be shown to be $$T(n) = \frac{T(0)}{1 - nT(0)}$$

This equation gives the power transmittance of the coating 220 at the tap locations n in terms of T(0) at the first tap.

We know that for a lossless system T(m)=1. Setting T(m)=1 in the equation above and solving for T(0) we have $$T(0) = \frac{1}{1 + m}$$

This equation sets T(0) based on the number of delay line taps desired. The previous equation gives all of the other T values based on T(0). The transmittance of the coating is now fully defined for the case of uniform tap weights, i.e., w(n)=1.

Each output tap is now weighted uniformly, and the output of the plate 231 can be written as an array of point sources where each source is shaped by the beam profile b(x,y). The complex amplitude distribution at the output of plate 231 in the plane just to the right of coating 237 is $$g(x, y) = a\frac{b(x, y)}{1+m} * \sum_{l}\sum_{p=0}^{m-1} e^{j2\pi f(x)p\tau}\delta(l-x, p-y)$$

The complex amplitude distribution at the output of the system (plane 246 in FIG. 11) after Fourier transformation in y and imaging in x is given by $$G(x, f_y) = F_y\left\{a\frac{b(x, y)}{1+m} * \sum_{l}\sum_{p=0}^{m-1} e^{j2\pi f(x)p\tau}\delta(l-x, p-y)\right\}$$

where x is the beam index for an input beam, y is the tap index, and $f_y$ is the spatial frequency coordinate that corresponds to the wavelength direction in plane 246 (FIG. 11), or equivalently, the frequency axis (FIG. 13). For each frequency component contained in f(x) there is a different phase shift from tap to tap. If all of the taps at a given x for a given frequency component are in phase, then the output beam propagates along the optical axis. If the frequency is increased such that from the first tap to the $m^{th}$ tap the phase shift has progressed by one cycle (2π radians) over the aperture, then the focused output spot at plane 246 has moved by one resolution element, i.e., by one spot width. This means the limiting frequency resolution is the reciprocal of the total delay time mτ of the device, $$\Delta f = \frac{1}{m\tau}$$

The time delay between adjacent taps is τ, therefore, the focused output spot pattern is repeated at a frequency interval of $$f_R = \frac{1}{\tau}$$

This means that a device with m taps will have a limiting frequency resolution equal to the reciprocal of the total time aperture of the device, and an unambiguous frequency range equal to the reciprocal of the tap to tap time delay. Therefore, the device will produce m distinct outputs, i.e., m distinct wavelength channels.

Figure 16:
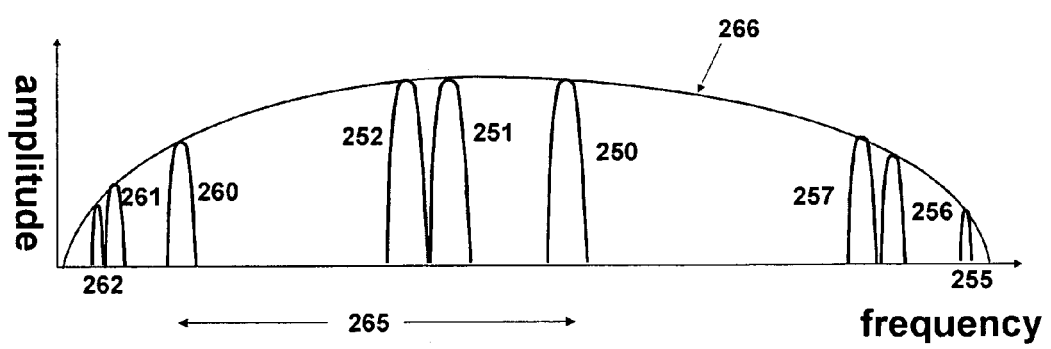
FIG. 16 is an example of the optical distribution in the frequency axis for an OTDL device.

An example of the optical distribution at plane 246 (FIG. 11) in the frequency axis at a given position x is illustrated in FIG. 16. The spectral lines at positions 250, 251 and 252 represent three distinct wavelength channels, and these lines are repeated at positions 255, 256 and 257 and at positions 260, 261 and 262. The spacing of the replications 265 in terms of temporal frequency is equal to the reciprocal of the time delay between taps 1/τ, as defined above, and the spacing in terms of spatial frequency is equal to the reciprocal of the distance between taps 1/d.

The shape of a spectral line for a perfect single frequency input (i.e., a pure single wavelength) is the Fourier transform of the envelope of the output beams $F_y\{p(x,y)\}$. For example, in the case of a uniform envelope the shape is a sin (x)/x function. Conversely, the envelope of the optical distribution at the output of the channelizer (plane 246) at a given beam position x is the Fourier transform of the y component of the beam profile b(x,y) in the y-axis, an example of which is curve 266 in FIG. 16, and the image of the x component of b(x,y) in the x-axis, or $b(x)F_{y\{by\}}(y)\}$.

Figure 17:
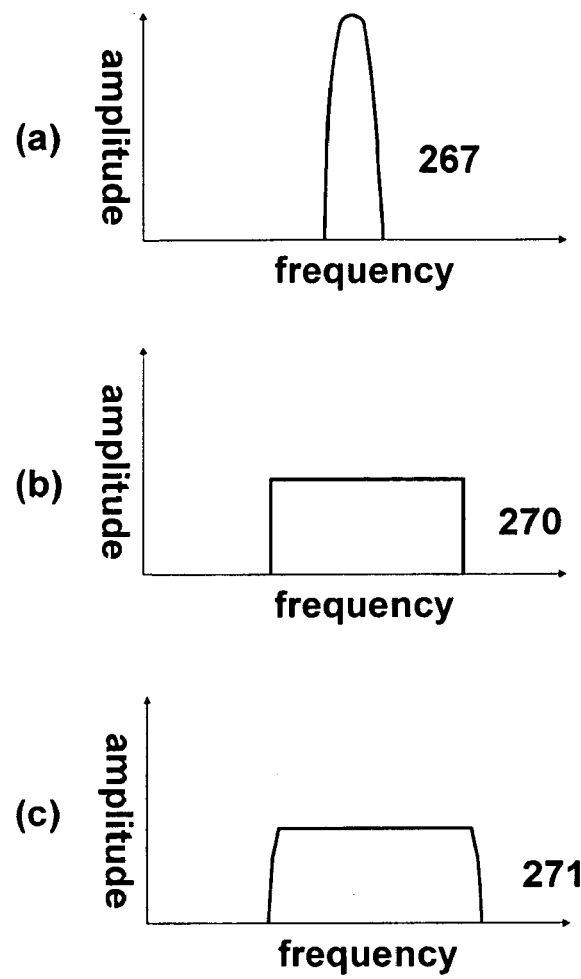
FIG. 17 is the frequency response of a single detector element or an optical fiber positioned at given plane.

The frequency response of a single detector element or an optical fiber positioned at plane 246 is illustrated in FIG. 17. FIG. 17(*a*) is the amplitude profile of a focused spot 267 at the detector plane in the $f_y$ direction corresponding to a single frequency input. The spatial response 270 of a detector element or fiber pickup is illustrated in FIG. 17(*b*). The resulting frequency response 271 is the convolution of 267 and 270 and is shown in FIG. 17(*c*). The effect of the optical spot shape 267 is to smooth the edges of the detector response 270 and produce the channel filter shape 271 with width approximately equal to the sum of the widths of 267 and 270.

Application of the OTDL Device to WDM Communication Systems

An OTDL device in accordance with the present invention is applicable to telecommunications data transmission using WDM. An OTDL device in accordance with the present invention enables HWDM by sub-channelizing each channel of conventional DWDM into many sub-channels.

Frequency Resolution: As used herein, the term "resolution" has the same meaning as the phrase "channel spacing." The modulated signal bandwidth of an optical carrier in a given channel cannot exceed the channel spacing. Therefore, the maximum modulated signal bandwidth is roughly equal to the channel spacing. For example, if a larger modulated bandwidth is desired, then greater channel spacing is required. An OTDL device can be designed for virtually any channel spacing that is required by a particular communication system design.

The term "resolution" refers to the channel spacing between adjacent carrier wavelengths, such as carrier wavelengths 251 and 252 in FIG. 16. The channel spacing may be expressed either in units of wavelength (i.e. meters) or, alternatively, in units of temporal frequency (i.e. cycles per second or Hz).

The practical lower limit on channel spacing for prior art DWDM equipment is approximately 50 GHz. In contrast, an OTDL device in accordance with the present invention provides sub-channel spacing on the order of 1 GHz or less. Therefore, an OTDL device in accordance with the present invention provides on the order of 50 times more channels per fiber, and the additional channels equate to at least a ten-fold increase in the bandwidth utilization of the fiber and thus increased data transmission capacity. The limiting resolution of an OTDL device may be calculated as $1/m\tau$ where m represents the number of optical tap outputs and r represents the tap to tap delay time. An OTDL device in accordance with the present invention is able to provide a resolution that is at least two orders of magnitude finer than the resolution currently achievable with competing technologies that are applicable to WDM.

For example, an OTDL device with an optical cavity thickness of one cm and that is designed for one hundred "bounces" between reflective surfaces will provide a total delay length of one meter. The time required for light to propagate a distance of one meter in glass is about five nanoseconds. Such a time delay corresponds to a frequency resolution of about two hundred MHz. Similarly, an OTDL device that is designed for five hundred "bounces" would provide a resolution of about forty MHz.

An OTDL device in accordance with the present invention may be used in combination with a conventional DWDM channelizer to sub-channelize each DWDM channel into many HWDM channels. This sub-channelization would enable fiber telecommunications service providers to sell bandwidth in smaller units, thereby increasing total revenue for an installed fiber. Customers might lease a wavelength in this optical layer, instead of leasing the right to transmit at a specific data rate. A television station, for instance, could reserve one wavelength from its studio to its transmitter and another to the local cable company, and transmit both signals in digital video formats not used on the telephone network.

An OTDL device in accordance with the present invention provides relatively higher frequency resolution. This in turn enables the spectral region between existing optical carrier frequencies in DWDM systems to be used more effectively, thereby significantly improving the fiber bandwidth utilization and thus the data throughput capacity on a single fiber.

The higher resolution provided by an OTDL device enables a high bandwidth channel to be subdivided into many lower bandwidth channels (on the order of one GHz or lower). This permits lower cost signal demodulation terminals using low-bandwidth optical detectors and electronics.

The higher resolution provided by an OTDL device also increases the number of independent optical wavelength carriers that can be used in a fiber communication system. Instead of 40 or 80 channels there can be 4000 to 40,000 channels (wavelengths) allowing each user to have their own independent wavelength. An OTDL device thereby enables large "one wavelength per user" passive optical networks.

The higher resolution also permits the possibility of transmitting a wideband signal as many narrowband signals in parallel. Many parallel channels permit the network management system to provide "bandwidth on demand" by allocating various HWDM channels to users as needed. With more optical carriers available the network manager can allocate more parallel channels to users that have a momentary need for higher capacity.

In conventional WDM systems, a single wavelength channel carries diverse traffic format types (e.g., Ethernet, ATM, POS) all in their native format. An OTDL device enables the dedication of channels to certain types of formats, something that is impractical with current fiber communication system architectures.

An OTDL device in accordance with the present invention is capable of generating relatively large time delays, on the order of several nanoseconds or more. Such an OTDL device therefore tends to be very sensitive to relatively small changes in frequency. Consequently, a device in accordance with the present invention may be used to produce very high resolutions—on the order of 10 GHz and finer.

Channel Filter Shape: The channel filter shape of an OTDL device is relatively easy to control, but very important because proper shaping enables a higher percentage of the available bandwidth of a fiber to be used. This ease of control is a result of the use of a collimated light beam input to plate 231 (FIG. 12). The beam at each tap on coating 237 is thus confined to a small area on the coating. This area is different for each of the taps. Therefore, each output beam can be individually weighted in amplitude and phase. This weighting of each tap creates an apodization of the output aperture of the OTDL and thus permits precise control of the shape of the optical spot at the output of the device. This in turn permits accurate filter sidelobe control as illustrated in FIG. 17 and the ability to pack channels closer together, increasing transmission capacity.

By controlling the apodization of the output aperture the OTDL has the capability to produce different types of channel filter shapes. Control of the filter characteristics for data communications is very important to produce passbands with: (1) maximally flat amplitude response; (2) maximally flat phase response; (3) mainlobe width commensurate with expected data rates and signaling formats; (4) minimum sidelobes; and (5) minimum crosstalk with adjacent channels.

As discussed in the mathematical theory, the OTDL controls apodization of the output aperture to produce the desired channel filter shape by amplitude and phase weighting of the OTDL output beamlets. The output aperture is defined by the intersection of the output beams and a plane orthogonal to the direction of propagation of the beamlets. This apodization may be accomplished using means including, but not limited to: (1) a spatially varying reflective coating on the second reflective surface of a cavity-type OTDL; (2) an amplitude mask placed at or near the output aperture of an OTDL; (3) a phase mask placed at or near the output aperture of an OTDL; (4) a combined amplitude/phase mask placed at or near the output aperture of an OTDL; (5) a diffracting element with spatially-varying optical diffraction efficiency, or multiple diffracting elements, each with a unique optical diffraction efficiency and arranged to provide a spatially-varying optical diffraction efficiency, or (6) a coupling element with spatially varying optical coupling efficiency, or multiple coupling elements each with a unique optical coupling efficiency and arranged to provide a spatially varying optical coupling efficiency.

The mathematical theory of operation above includes one example for the case of uniform tap weights to produce a rectangular apodization function, but the OTDL can produce other forms such as, but not limited to: (1) a truncated Gaussian function; (2) an exponentially decaying function; (3) a raised cosine function; or (4) some other desired form.

Optical Throughput Efficiency: The efficiency of an optical system like the OTDL may be defined as the fraction of light power that is input to the system in a single wavelength channel in a single input beam that is ultimately focused at a single, detectable location in the output plane. Using this definition, an efficiency of 40%, for example, means that 40% of the original input light power is focused in one spot, and that the remaining 60% is lost or wasted because it either appears in the higher-order replicated spots or is scattered by imperfections in the optical components. Efficiency may be measured simply by measuring the input and output light powers at a given wavelength and computing their ratio. In the present invention efficiencies on the order of 40% and greater, and in some cases efficiencies on the order of as much as 70% and greater, may be achieved with a frequency resolution of 10 GHz or finer.

In order to maximize the optical throughput efficiency, it is very important to control the spectral envelope weighting, curve 266 in FIG. 16, over the output plane of the OTDL cavity. The OTDL does this proficiently by controlling the profile of the input beam. The shape of the spectral envelope is also important to: (1) maximize the optical power in a single interference order; (2) minimize the optical power in adjacent interference orders; and (3) maximize the flatness of the spectral response over the operating frequency bandwidth.

An example of the role of the spectral envelope is illustrated by curve 266 in FIG. 16, where the envelope suppresses the replicated interference orders (optical spots) 262, 261, 260, 257, 256, and 255, that are adjacent to the central order spots 252, 251, 250. This increases the optical throughput efficiency of the central order. This curve also illustrates the role of the spectral envelope to control the frequency response (i.e., flatness) over the operating frequency bandwidth at the output of the OTDL.

Control of the input beam profile may be accomplished with the OTDL, for example, by a spatially varying transmissive coating on the input region at the bottom of plate 231 in FIG. 12. Additionally, the input beam profile can be controlled by placing different elements in the path of the input beam 230*f* in FIG. 12, including but not limited to: (1) an amplitude mask for modifying the amplitude profile of the input beam; (2) a phase mask for modifying the phase profile of the input beam; (3) a combined amplitude/phase mask for modifying the amplitude and phase profiles of the input beam; (4) a diffracting element for modifying the phase and amplitude profiles of the input beam; or (5) a coupling element for modifying the amplitude and phase profiles of the input beam. Alternatively, the simplest approach is to create a Gaussian input beam profile via appropriate selection of the optical fiber collimating lens (not shown in FIG. 12) that produces collimated input beam 230*f* in FIG. 12.

Comparison with the VIPA Device: An OTDL device in accordance with the present invention provides a number of advantages when compared with other devices that are known in the art. For example, an OTDL device in accordance with the present invention does not require the use of a focused input beam, as is required in a VIPA device. Such a focused beam in a VIPA device tends to rapidly diverge after focus when propagating in a thick optical cavity (i.e., a thickness on the order of several millimeters or greater) and is quickly truncated by the edges of the device. The rapid divergence of the focused input beam in a VIPA device also makes control of the amplitude, i.e., the weighting, of the individual virtual images difficult. The use of relatively large diameter, collimated input beams in the present invention enables the use of a relatively thick cavity. A thick cavity is needed to produce a relatively long total delay time inside the plate 231 in order to achieve high frequency resolution.

Two-dimensionality: An OTDL device in accordance with the present invention is two dimensional. One of the two spatial dimensions allows for multiple parallel inputs. Consequently, a single OTDL device in accordance with the present invention is capable of simultaneously operating on hundreds of independent inputs.

In an alternative embodiment of the invention that exploits this two dimensionality, a first OTDL device and a second OTDL device may be cascaded in the z axis direction, i.e., along the optical axis, with the output of the first OTDL device serving as the input of the second OTDL device. In addition, the second OTDL device may be rotated about the z axis by ninety degrees relative to the first OTDL device, thereby providing what may be called a "crossed" embodiment.

In such a crossed embodiment the first OTDL device may perform a coarse, low-resolution channelization. The second OTDL device may perform a fine, high-resolution channelization. The crossed embodiment may be used, for example, in a communication system where there is a single fiber carrying hundreds or even several thousand carrier wavelengths or channels, as opposed to tens of fibers carrying fifty to one hundred channels each. The crossed OTDL devices could channelize all the wavelengths emitted from this single fiber, and the wavelengths would be spatially separated at the output plane. A pair of crossed OTDL devices can channelize the entire bandwidth of a fiber to high resolution (i.e., one GHz or less).

Reversibility: The OTDL device in accordance with the present invention is reversible. In other words, an OTDL device in accordance with the present invention may be used to multiplex many inputs at different frequencies (carrier wavelengths) into a single output. Referring to FIG. 11, the reverse mode of operation may be achieved by inputting appropriate multiple frequencies of light at appropriate multiple locations in the output plane (246 in FIG. 11) of the device. The light emitted from these input sources will propagate backward through the system shown in FIG. 11 and combine in plate 231 and ultimately appear at a common input port (230a-f of FIG. 11) of the device.

Figure 58:
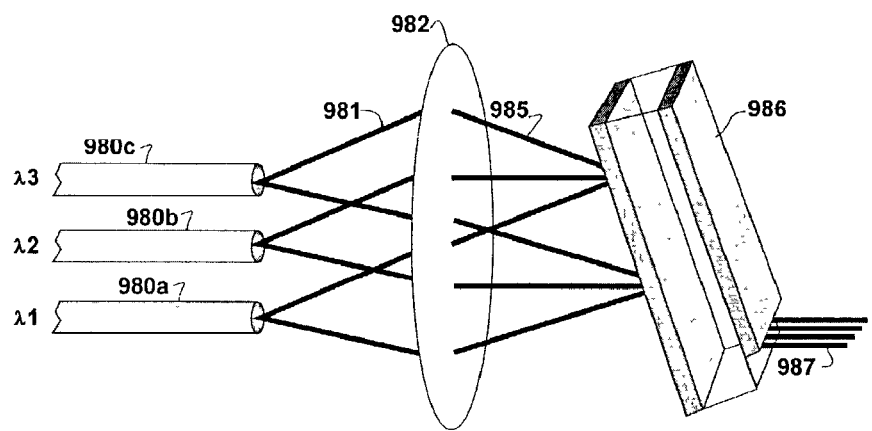
FIG. 58 illustrates an example of the OTDL as a multiplexer in accordance with the invention.

Referring to the OTDL device illustrated in FIGS. 11 and 12, for example, a diverging light source that is of the appropriate frequency and that is input at the proper location in plane 246 may be efficiently coupled into the appropriate port 230a-f. The reverse mode of operation is more clearly illustrated in FIG. 58. FIG. 58 shows an apparatus for multiplexing a plurality of individual optical signals into a single multichannel output in accordance with the present invention. It will be readily apparent that FIG. 58 is substantially a reverse image of FIG. 12. With reference to FIG. 58, a plurality of inputs 980a-c, for example, a set of optical fibers, provide a plurality of divergent light beams 981. Each input beam consists of a unique and independent wavelength channel with center wavelengths $\lambda_1$, $\lambda_2$ and $\lambda_3$, for example. Each input 980a-c should be located at the proper position in the focal plane of lens system 982 according to the specific wavelength it carries. The proper position is the location where the specific wavelength would be focused in the forward (demultiplexer) mode of operation. The divergent input beams 981 are collimated by lens system 982 to create a plurality of collimated beams 985. Each collimated beam 985 propagates at a unique angle determined by the position of the corresponding input 980a-c, and thus there is a correspondence between the angle of propagation and the wavelength of each beam. The collimated beams 985 are incident on surface 236 (FIG. 12) of OTDL 986. Each beam is incident at a unique angle in accordance with its wavelength, but all the beams are substantially overlapping on surface 236 and are incident on substantially the same area of surface 236. This area is substantially the same as that spanned by the tap locations 240a-f shown in FIG. 12 in connection with the forward mode of operation. Therefore, as each beam is transmitted through surface 236, the partially-reflecting spatially-varying coating 237 (FIG. 12) imparts a spatial weighting on the beam. This weighting is analogous to the tap weights of the OTDL output beamlets described previously in connection with the forward mode of operation. In the reverse of the process described with respect to FIGS. 11 and 12, the spatially-weighted collimated beams that have entered OTDL 986 reflect back and forth between the reflective coatings (e.g., 235 and 237 of FIG. 12) until they are integrated into a single multi-channel optical beam at output port 987.

Recall that the OTDL may be configured to demultiplex multiple independent inputs in the forward mode, as illustrated in FIG. 11. Similarly, the OTDL can multiplex multiple sets of inputs into multiple independent outputs in the reverse mode. With reference to both FIGS. 11 and 58, a two-dimensional matrix of inputs 980 may be arranged in accordance with the grid on output surface 246. This arrangement provides the capability to simultaneously multiplex several columns of individual input signals 980 into a plurality of outputs 987, with each column of input signals being separately integrated into a unique multiplexed multi-channel output beam.

An OTDL device in accordance with the present invention may therefore function as a multiplexer or as a de-multiplexer, for combining or separating multiple wavelength channels, respectively. The use of collimated light beams in the device and the control of the weight at each optical tap on the delay line make the device relatively efficient in both forward and reverse modes of operation, i.e., the de-multiplexer and multiplexer modes, respectively.

This reversibility characteristic of the OTDL can be used to create an optical add-drop multiplexer or a flat-top filter using one OTDL device as illustrated in FIGS. 37-41. In each of the embodiments illustrated in FIGS. 37-41 light propagates both in the forward and reverse directions to perform a multiplexing or filtering function. These embodiments are described in detail below.

Similarly, as the forward direction of the OTDL can be used as s multi-port de-interleaver (FIG. 48), this reversibility characteristic can be used to create a multi-port interleaver.

Application of the OTDL Device to Optical Signal Processing

An OTDL device in accordance with the present invention may be used as a replacement for a Bragg cell in optical signal processing applications.

A Bragg cell (also known as an acousto-optic cell or AO cell) is a device used to convert an electrical signal into an optical format in many optical processors. For example, the "channelizer" aboard the SWAS (Short Wavelength Astronomical Spectrometer) spacecraft utilizes a Bragg cell. A Bragg cell comprises an electrical-to-acoustic Transducer bonded to a block of transparent material. An electrical signal is applied to the transducer causing the transducer to vibrate. The vibrations are coupled into the transparent block as a traveling sound wave. The sound wave comprises a series of compressions and rarefactions in the block, which spatially modulate the index of refraction of the block. If the block is illuminated with light, then the index modulations scatter the light. For example, if the sound wave is sinusoidal, then the index modulations are sinusoidal and act as a diffraction grating. The higher the frequency of the electrical signal, the higher the spatial frequency of the diffraction grating and the greater the angle at which the light is scattered (diffracted). This diffraction process permits the electrical signal to be decomposed into an angular spectrum of optical plane waves. The angular spectrum can be focused to a plane to perform a spectrum analysis of the electrical signal.

The Bragg cell is limited in frequency bandwidth to about two GHz by acoustic attenuation and transducer fabrication technology. There is also a nonlinear effect that limits the useful diffraction efficiency to less than ten percent for many applications. This effect was quantified by David Hecht and is called the Hecht limit. The Hecht limit is a result of the generation of intermodulation products within the Bragg cell.

In contrast, an OTDL device in accordance with the present invention does not suffer from acoustic attenuation. Therefore an OTDL device in accordance with the present invention can be much wider in frequency bandwidth. For example, the bandwidth for an OTDL device in accordance with the present invention can be greater than two hundred GHz, in contrast to the two GHz that is typical for a Bragg cell.

An OTDL device in accordance with the present invention provides relatively smaller aperture times, i.e., the total delay time $m\tau$, by a factor of about one hundred as compared to a Bragg cell. This enables more rapid random angular beam positioning in beam steering applications.

An OTDL device in accordance with the present invention does not suffer from the Hecht limit that describes nonlinear interactions in Bragg cells. An OTDL device in accordance with the present invention does not use volumetric index of refraction modulation, and therefore is not limited in optical throughput efficiency by the Hecht limit. High optical efficiency is possible without generating intermodulation products. An OTDL device in accordance with the present invention can theoretically achieve 100% efficiency.

Multiple input Bragg cells are extremely difficult to fabricate reliably due to electromagnetic and acoustic interactions between the inputs. In contrast, each input of a multiple input OTDL basically needs only an additional optical input with a properly collimated and oriented beam. Homogeneity and clarity of the optical material of plate 231 is also desirable to minimize crosstalk.

An OTDL device in accordance with the present invention may be advantageously used for wideband spectrum analysis of signals, correlation of signals, and optical beam scanning. An OTDL device is particularly applicable to interferometric cross power spectrum analyzers, radiometer banks and electronic warfare receivers.

Optical Add/Drop Multiplexer. The device as previously described with respect to FIGS. 11 and 12 below may be easily adapted for service as an optical add-drop multiplexer (OADM). In FIG. 12, the OTDL subsystem of the present invention is represented as element 247. Future references to 247 are intended to represent all of the functions illustrated within the area labeled 247 in FIG. 12.

The output surface 246 shown in the example illustrated in FIG. 11 is two-dimensional. The horizontal dimension x of the output surface 246 may correspond to the input beam index. The vertical dimension y may correspond to the wavelength of the light in the input beam. There are a wide variety of devices that might be positioned at the output surface 246 to enable adding and dropping of a specific wavelength.

Figure 18:
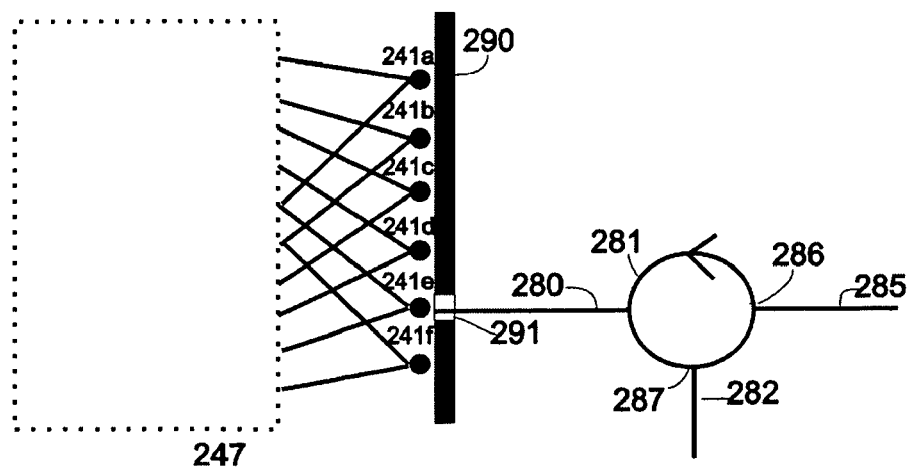
FIG. 18 illustrates an example of a single channel add-drop system for the OTDL device.

Referring to FIG. 18, a mirror 290 is preferably provided with a hole 291. It should be understood that the location of the hole 291 may be at any of the output beam locations in any of the two dimensions. The separated wavelengths 241a-f may strike the mirror 290, except at the location of the hole 291. Those wavelengths not striking the area where the hole is located are preferably reflected back into the OTDL device 247. The wavelength striking the hole; i.e., 241e in this example, passes through and is preferably collected by a properly coupled fiber (e.g., with lenslet, waveguide, or other technique). This wavelength then preferably passes through a circulator 281, for example. Then, the wavelength may be passed to a drop fiber 282. The optical signal to be inserted at the same wavelength; i.e., the added channel 285, is preferably coupled to the input port 286 of the circulator 281 and passed back to the hole 291 in the mirror 290. It should be noted that the piece of fiber 280 between the hole 291 and the circulator 281 may carry both the dropped channel propagating left to right and the added channel propagating right to left. The added wavelength is then passed back through the OTDL 247 coupled to the output fiber 282. The output fiber 282 now carries all of the original wavelengths. However, the information on the added/dropped wavelength is now different.

In alternative embodiments of the invention, a wavelength may be dropped without being re-added. Further, an unused wavelength may be added without being dropped. Similarly, a wavelength may be dropped and the same information added back at the same wavelength if desired; i.e., a broadcast mode.

This above-described embodiment of the invention relates to a single fixed wavelength add/drop. If two or more holes are present in the mirror 290, then multiple fixed wavelengths may be added or dropped. If the mirror is movable such that the hole can be moved to any wavelength position, then the device is a tunable single-channel add/drop de-multiplexer. If the movable mirror has multiple holes, then it is a ganged wavelength-tunable add/drop de-multiplexer. The mirror movement/tuning may be manual (e.g., field settable) or automated.

Figure 19:
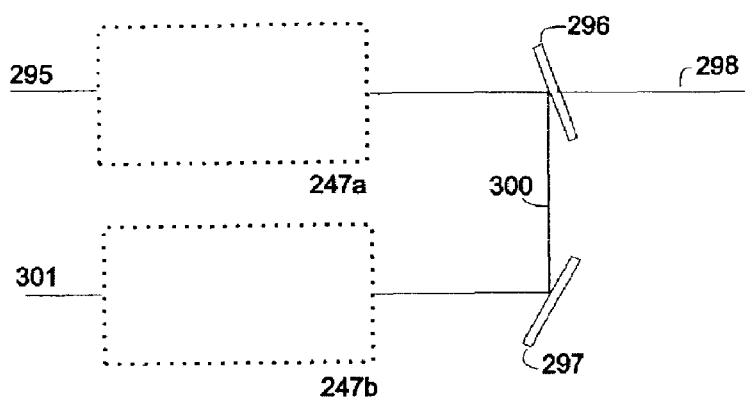
FIG. 19 is a top view of an example of a double mirror according to an embodiment of the invention.

FIG. 19 is a top view of an example of a double mirror according to an embodiment of the invention. The embodiment illustrated in FIG. 19 utilizes two mirrors instead of one, as shown in the example illustrated in FIG. 18, and two OTDL channels (which may or may not be on the same device) instead of one.

Referring to FIG. 19, an input beam preferably enters an OTDL 247a at input fiber 295 for de-multiplexing. After being separated into their respective wavelengths by the OTDL 247a, the wavelengths preferably arrive at mirror 296. The mirror 296 has at least one hole (not shown) at the appropriate spatial location of the respective wavelength to be dropped. The wavelength, such as 241e, preferably passes through the hole as beam 298 for coupling to another fiber or to a detector 299b. All wavelengths not passing through the hole or holes in mirror 296 are reflected to mirror 297 along path 300. The mirror at 297 can also include a hole or a plurality of holes for adding new wavelengths. The optical signal carrying the frequency to be added preferably arrives at mirror 297 on a beam(s) at the proper wavelength(s) and passes through one or more holes in mirror 297. Next, the beam(s) preferably continue on to the OTDL 247b for multiplexing, i.e., recombining with the other wavelengths for output to a fiber 301. According to this embodiment, the adding/dropping is performed without the use of a circulator.

Figure 20:
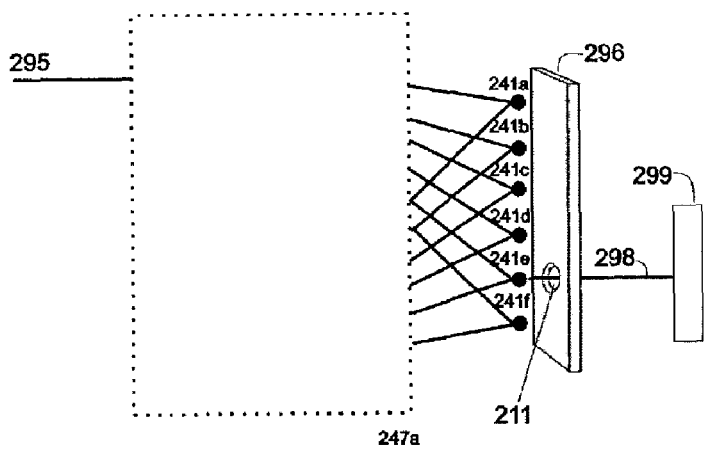
FIG. 20 is a side perspective view of an example of the de-multiplexer side of a double mirror according to an embodiment of the invention.

FIG. 20 is a side perspective view of an example of the de-multiplexer side of a double mirror according to an embodiment of the invention. More specifically, FIG. 20 illustrates an example of the de-multiplexing side of the OTDL 247a discussed above in connection with FIG. 19. FIG. 20 illustrates wavelengths 241a-f arriving at a mirror 296 from the OTDL 247a. Wavelength 241e preferably passes through the hole in mirror 296 for coupling to another fiber or to a detector. All the other wavelengths, 241a-d and f, are preferably reflected to a mirror 297 (FIG. 19).

While FIG. 18 showed an embodiment with one OTDL channel and one mirror and FIG. 19 showed an embodiment with two OTDL channels and two mirrors, an intermediate embodiment exists which utilizes two OTDL channels and only one mirror.

Figure 21:
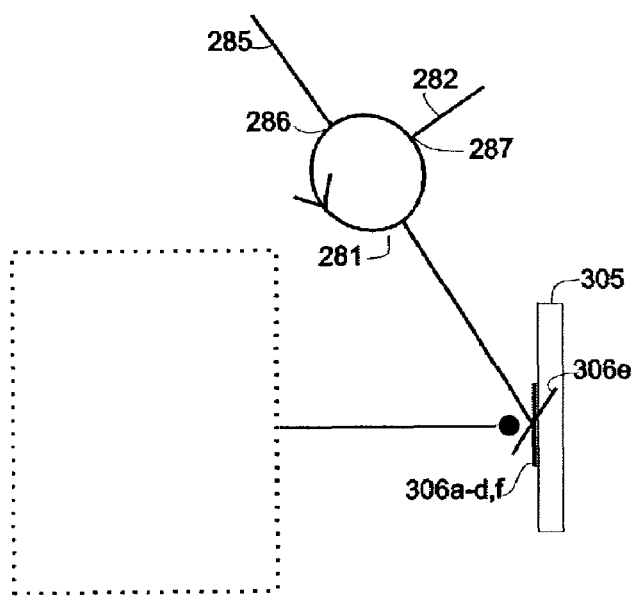
FIG. 21 is a top view of a moveable mirror MEMS according to an embodiment of the invention.

FIG. 21 is a top view of a moveable mirror MEMS according to an embodiment of the invention. According to the embodiment shown in FIG. 21, mirror 290, discussed in connection with FIG. 18, may be replaced with a linear array of micro-mirrors using, for example, MEMS technology. All of the output wavelengths from the OTDL 247 preferably arrive at the MEMS device 305. A micro-mirror preferably may exist at each spatial location of each output beam, i.e., there are six mirrors, one for each wavelength 241a-f, in this example. One of the micro-mirrors, shown as 306e, for example, is rotated to reflect one of the wavelengths to a fiber/circulator 281 and then to a drop fiber 282. The optical signal to be inserted at the same wavelength (the added channel 285) is preferably coupled to the input port 286 of the circulator 281 and passed back to the micro-mirror 306e, where the added wavelength is then reflected to the proper location of the OTDL 247.

It should be understood that while the above-description of the preferred embodiments of the invention as explained utilize a circulator. However, the present invention is not limited to using a circulator as described. Rather, any device which performs a function of separating/combining a bi-directionally propagating light beam into separate uni-directionally propagating beams may be used.

It should also be understood that while the embodiments described above use a mirror with a hole or holes for passing rather than light, any arrangement which performs a similar function, such as an optically, electrically or mechanically controlled port of any kind can be used so that light is selectively passed or reflected.

Figure 22:
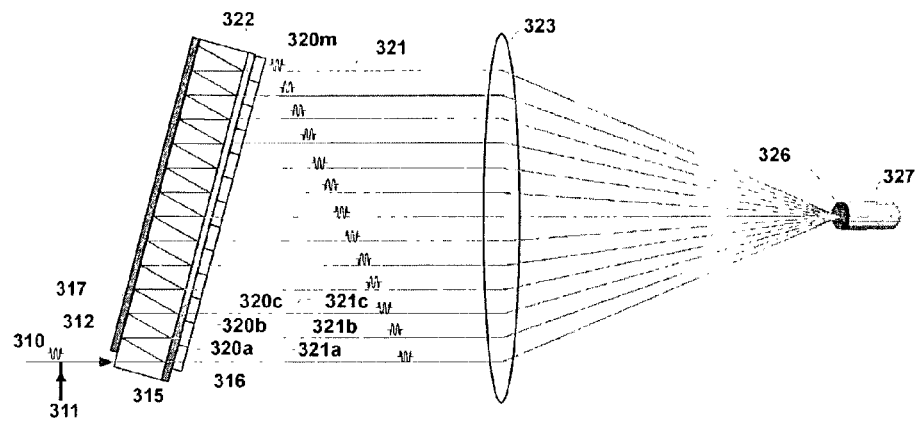
FIG. 22 illustrates an example modulation-on-exit space-intergrating encoder according to an embodiment of the invention.

Optical Code Division Multiple Access. FIG. 22 is an embodiment of the present invention that illustrates an example of a OCDMA encoder where each pulse of light exiting an OTDL device may be independently phase modulated by a spatial light modulator (SLM). FIG. 22 illustrates an example modulation-on-exit space-intergrating encoder according to an embodiment of the invention. In FIG. 22, a coherent light pulse 310 may be modulated with a data signal 311 to produce an input beam 312. The input beam may enter an OTDL cavity 315. The OTDL cavity 315 may be as it is described above in conjunction with the description of FIGS. 11 and 12. The input beam may be partially reflected by a surface 316 of the cavity 315. The surface 316 is analogous to the second surface 236, as shown in FIG. 12. The surface 316 is partially reflective. A portion of the light may exit the cavity 315 at a tap 320a as beam 321a. The reflected portion of the input beam preferably continues to a 100% reflectively coated surface 317. Surface 317 is analogous to surface 232 shown in the example illustrated in FIG. 12. Next, the input beam is preferably reflected back to the surface 316 at a next tap point 320b. At this tap point, another portion of the beam preferably exits the cavity as beam 321b. The input beam may continue to bounce between surfaces 316 and 317, with portions of the beam exiting the cavity 315 as beams 321c-m. The reflective coating of surface 316 preferably varies in reflectivity along its length, with high reflectivity at the start and decreasing along its length, so as to ensure equal intensity of the exiting beams. The reflectivity may also vary such as to impart any other desired amplitude profile onto the beams.

Upon exiting surface 316, the beams may enter a phase modulator 322, where a unique phase shift is applied to each beam. The phase modulator may be loaded with the phase shifts that determine the OCDMA sequence. The phase modulator illustrated by way of example in FIG. 22 is programmable. The total number of delay taps preferably determines the length of the applied code sequence. After the beams have been phase modulated, they pass through an integration lens 323. At the integration lens 323, the beams may be reintegrated into a single beam. This is illustrated, for example, as the point labeled 326 in FIG. 22. The integrated beams may then enter an optical fiber 327 as an encoded beam with a time series chip sequence. Then, the encoded beam may be transmitted via an optical fiber 327.

Figure 23:
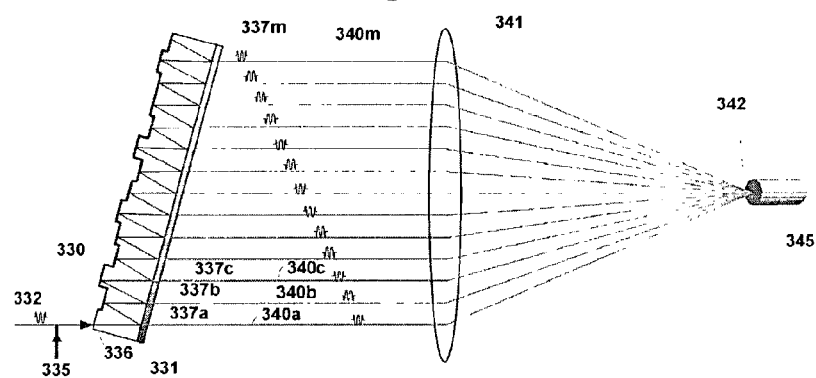
FIG. 23 illustrates an example of a modulation-on-reflection space-integrating encoder.

The phase modulation may also be fixed by using an etched plate instead of the programmable modulator, as illustrated, for example, in FIG. 23. This may be accomplished by using an etched plate 330 where the etch depth produces a desired phase shift through time delay of the exiting light pulse. For bi-phase modulation, this depth is preferably either 0 or ¼ the wavelength of the light. Note that the front exiting surface 331 may be etched to produce the phase shifts. Note also that the phase pattern should be a differential pattern since tap N+1 already has the phase steps applied from taps 1 through N.

FIG. 23 illustrates an example of a modulation-on-reflection space-integrating encoder. FIG. 23 also depicts an example of an OCDMA encoder where the pulse of light traveling through an OTDL device is phase adjusted on a back surface 330 of the device.

Referring to FIG. 23, a coherent light pulse 332 is preferably modulated with a data signal 335 to create an input beam. The input beam preferably enters an OTDL cavity 336 and is partially reflected by surface 331. Cavity 336 and surface 331 are analogous to cavity 315 and surface 316, which are discussed above in conjunction with FIG. 23. A portion of the light may exit the cavity 336 at a first delay tap 337a as a beam 340a. The reflected portion of the input beam preferably continues to a 100% reflective etched surface 330. The input beam reflected by the etched surface 330 is preferably adjusted based on the depth of the etched surface. Then, the beam may be reflected back to the partially reflective surface 331 at a next tap point 337b. At tap point 337b, another portion of the beam, which is now phase encoded, preferably exits the cavity 336 as a beam 340b. The input beam may continue to bounce between surfaces 331 and 330. Portions of the beam may also exit the cavity 336 as beams 340c-m.

The phase of the light exiting the device at each respective tap point 337a-m, for example, is preferably equal to the accumulation of all phase adjustments up to that point. The programmed phase pattern may be the differential phase required to produce the desired phase at each tap point.

The reflective coating of surface 331 varies in reflectivity along its length, with high reflectivity at the start and decreasing along its length, so as to ensure equal intensity of the exiting beams. The reflectivity may also vary such as to impart any other desired amplitude profile onto the beams.

The total number of delay taps preferably determines the length of the applied code sequence. After the beams have been phase modulated, they may pass through an integration lens 341. There, the beams may be reintegrated into a single beam at 342. Thereafter, they may enter an optical fiber 345 as an encoded beam with a time series chip sequence. At this point, the encoded beam is transmitted via an optical fiber 345.

FIG. 23 illustrates an example of a fixed pattern modulator with the phase shifts etched into the reflective surface 330. The phase modulation may also be produced on the reflective surface 330 with a reflective spatial light modulator. This allows the phase pattern to be programmed. Alternatively, a micro-mechanical device, such as a piston, pressing on the surface 330 produces a local deformity. The local deformity at 330 may cause sufficient phase shift of the reflected light to also produce the phase modulation.

It should be understood that the transmitters described in Figures CA and CB can be implemented to produce identical output waveforms.

Figure 24:
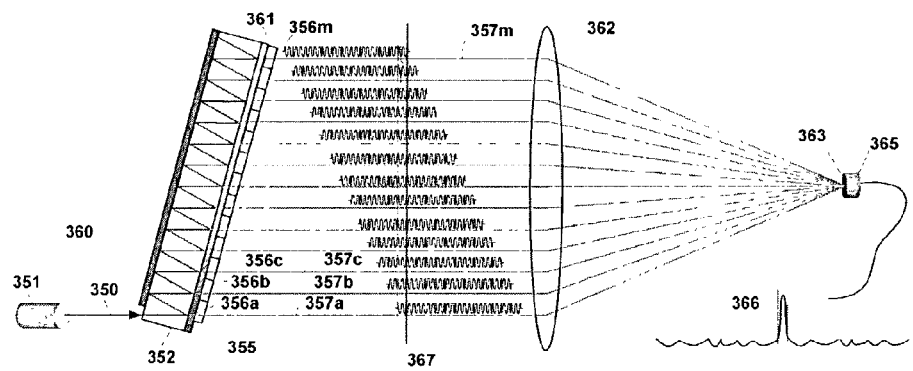
FIG. 24 illustrates an example of a modulation-on-exit receiver.

A set of receivers can be constructed from the OTDL device. This set of receivers matches the set of transmitters described above. However, the transmitter and receiver linked together need not be of the same type provided they are set to a same code sequence. The code sequence is the ordered set of phase states applied by the spatial light modulator (322 for the programmable encoder) or etched plate (330 for the fixed on-reflection encoder). The code sequence, also known as a chipping code, is used in CDMA techniques to uniquely differentiate each user's signal. A data signal is modulated (encoded) with the code sequence at the point of transmission, and the modulation code is removed at the point of receipt (decoded). FIG. 24 illustrates an example of a modulation-on-exit receiver. In this example, each output point is phase modulated by a spatial light modulator as in the transmitter of the example illustrated in FIG. 22. In FIG. 24, a coherent encoded light beam 350 exits from an optical fiber 351. The input beam preferably enters an OTDL cavity 352. The input beam may be partially reflected by a surface 355. OTDL cavity 352 and surface 355 are analogous to the cavity 315 and the surface 316 as illustrated in FIG. 22. A portion of the light preferably exits the cavity 352 at the first delay tap 356a as a beam 357a. The reflected portion of the input beam may continue to a 100% reflective surface 360, where it may be reflected back to the partially reflective surface 355 at a next tap point 356b. At this tap point, another portion of the beam may exit the cavity as a beam 357b. The input beam may continue to bounce between the surfaces 355 and 360, with portions of the beam exiting the cavity as beams 357c-m. The reflective coating of the surface 355 may vary in reflectivity along its length, with high reflectivity at the start and decreasing along its length, so as to ensure equal intensity of the exiting beams. The reflectivity may also vary such as to impart any other desired amplitude profile onto the beams. Upon exiting the surface 355, the beams may enter a phase modulator 361, where a unique phase shift is applied to each beam. The phase modulator 361 may be loaded with a phase pattern that is the inverse phase in reverse order from the phase pattern used to generate the transmitted signal. After the beams have been phase modulated with the reverse phase pattern, the beams may be decoded. The beams may pass through an integration lens 362, where the beams may be reintegrated into a single beam at point 363. Thereafter, the beams may enter a photo detector 365 as a decoded beam. The exiting pulses may be aligned in phase as illustrated in 366 and 367. When the phases are aligned, the integrated light beam focuses to a point on the photo detector 365 producing a peak output. At all other times, the light is defocused, i.e., spread out in space. It should be noted that the receiver illustrated in FIG. 24 is analogous to the transmitter of FIG. 22 with the exception that the input is from communications fiber instead of a laser and the output goes to a photo detector instead of a communications fiber.

Figure 25:
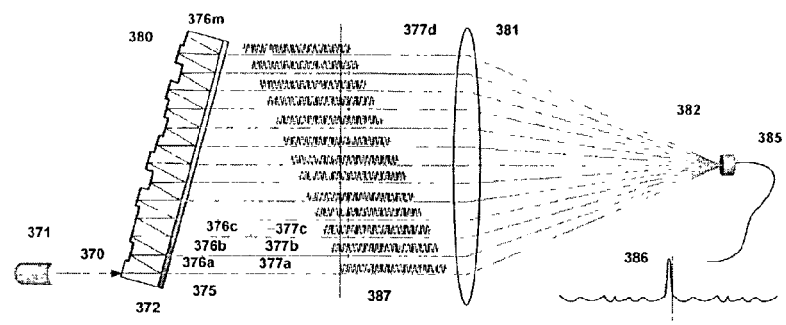
FIG. 25 illustrates an example of the modulation-on-reflection receiver corresponding to the transmitter illustrated in FIG. 23.

FIG. 25 illustrates an example of the modulation-on-reflection receiver corresponding to the transmitter illustrated in FIG. 23. FIG. 25 illustrates an example of a OCDMA decoder where the pulse of light traveling through the OTDL device is phase adjusted on a back surface of the device using an etched pattern. The etched pattern may be in the inverse reverse accumulated order of the pattern etched on the transmitter illustrated in FIG. 23.

Referring to FIG. 25, a coherent encoded light beam 370 may exit from an optical fiber 371. The input beam 371 preferably enters an OTDL cavity 372 and is partially reflected by a surface 375. The cavity 372 and the surface 375 are analogous to cavity 315 and surface 316, as illustrated in FIG. 22. A portion of the light may exit the cavity at a first delay tap 376a as beam 377a. The reflected portion of the input beam may continue to a 100% etched reflective surface 380 where it may be phase adjusted based on the depth of the etched surface. Then, the beam may be reflected back to the partially reflective surface 375 at a next tap point 376b. At this tap point, another portion of the beam, now phase encoded, may exit the cavity 372 as beam 377b. The input beam may continue to bounce between surfaces 375 and 380, with portions of the beam exiting the cavity as beams 377c-m. The light exiting the device at each tap point may have a phase that is the accumulation of all phase adjustments up to that point. The programmed phase pattern is the differential phase required to produce the desired phase at each tap point. The reflective coating of the surface 375 preferably varies in reflectivity along its length, with high reflectivity at the start and decreasing along its length, so as to ensure equal intensity of the exiting beams. The reflectivity may also vary such as to impart any other desired amplitude profile onto the beams. The total number of delay taps determines the length of the applied code sequence.

After the beams have been phase modulated, they may pass through an integration lens 381. At the integration lens 381, the beams may be reintegrated into a single beam at 382. Thereafter, the beams may enter a photo detector 385 as a decoded beam in which the exiting pulses are aligned in phase as illustrated in 386 and 387. When the phases are aligned, the integrated light beam focuses to a point on the photo detector 385 producing a peak output. At all other times, the light is defocused, i.e., spread out in space. As in the transmitter, illustrated by way of example in FIG. 23, the reflective phase modulation can also be produced by a programmable device such as a spatial light modulator or micro-mechanical device at 380. It should be noted that the construction of the receiver of FIG. 25 is analogous to the transmitter of FIG. 23 with the exception that the input is from a communications fiber instead of a laser, and the output goes to a photo detector instead of a communications fiber.

Figure 26:
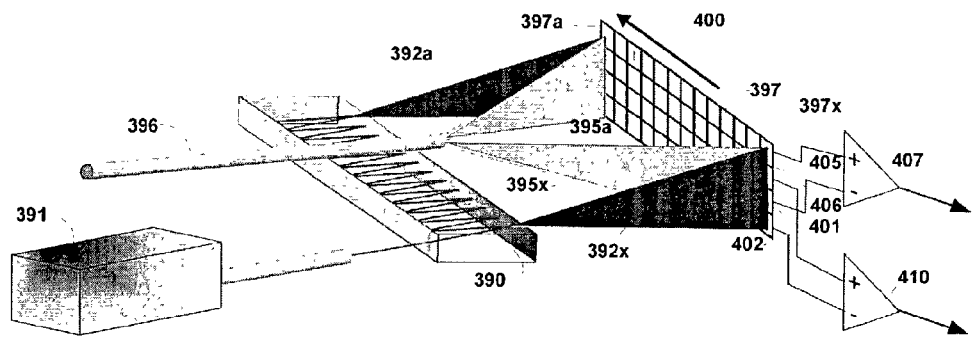
FIG. 26 illustrates an example of an embodiment of the invention in which a time integrating OCDMA correlating receiver is constructed.

FIG. 26 illustrates an example of an embodiment of the invention in which a time integrating OCDM correlating receiver is constructed. In this embodiment, an OTDL device 390 is used to produce many simultaneous time-delayed outputs of an input signal from a reference signal generator 391. Each output from the OTDL device 390 illuminates one column of a four-row time integrating photo detector array, as illustrated at 392a and 392x. The detector array is also preferably illuminated with a plane wave as illustrated by 395a and 395x, formed from an output of a second source, shown in FIG. 26 as the data input fiber 396. The sum of the two beams, which are mutually coherent, may be square-law detected on the photo sensors in array 397. This results in multiplication of the amplitude of the two beams as well as the bias terms from the square of each amplitude. Integration in time of the detected output results in a correlation between the amplitudes of the two beams, with each column of the photo sensor array 397a through 397 being a different time offset 400 of the two beams.

The two illuminations on the photo detector are tilted in phase as a result of the separation of the two illumination sources, 396 and 391, such that the interference between them produces a single cycle of a spatial carrier across the four detector rows. This spatial carrier allows the detection of the complex correlation value. Subtraction of the $3^{rd}$ and $4^{th}$ quadrants of the cycle (401 and 402) from the $1^{st}$ and $2^{nd}$ quadrant (405 and 406) respectively can produce the real (407) and imaginary (410) parts of the desired correlation while removing bias terms resulting from the square-law detection of the sum of the two illuminations.

In the example shown in FIG. 26, a locally generated reference signal 391 is shown as the OTDL input. Further, the received data illuminating the entire array 397 from a point source is represented by the fiber input 396. The receiver may work equally well with the data being input into the OTDL device and the reference signal illuminating the entire device.

The reference signal generator 391 could be an electronically generated reference employing high-speed digital and analog hardware and an optical modulator. It could also be one of the space integrating encoders described above, thus avoiding the need for high-speed electronics.

The point source illuminating the entire array need not be a point source. It could also be a second OTDL device generating a second set of time-delayed outputs, each illuminating one column of the photo detector. In this case, correlations are performed against each of the two sets of time delays. The direction of the time delays may be the same (co-propagating). In this case, the system is a correlator. Otherwise, direction of the time delays may be in opposite directions (counterpropagating). This makes the system a convolver. Either implementation may be used as a time-integrating OCDMA receiver. The choice of which is dependent on the particular application and problem to be solved.

It is also possible to produce a spectral domain signal encoder by modulating the constituent frequency components of the signal by placing an amplitude and phase modulator at the Fourier transform plane formed from the output of an OTDL device fed with a constant broad spectrum light source. In this implementation, the OTDL device acts basically as a channelizer, or Fourier Transform processor, to illuminate a high-speed spatial light modulator. The spatial light modulator is driven with the desired modulation to be applied to each of the many frequency components of the input signal. The modulated frequency components are transformed into the time-domain and the resultant time-domain signal is transmitted.

As with the phase-modulated encoders described above, a spectral domain matched filter receiver can be constructed as the inverse of the spectral domain signal encoder. The receiver works in exactly the same manner as the spectral domain signal encoder except that the spatial light modulator is driven with the inverse of the data imparted by the signal encoder in order to remove the signal encoding modulation. The inverse transformed data is then the original data signal.

Figure 27:
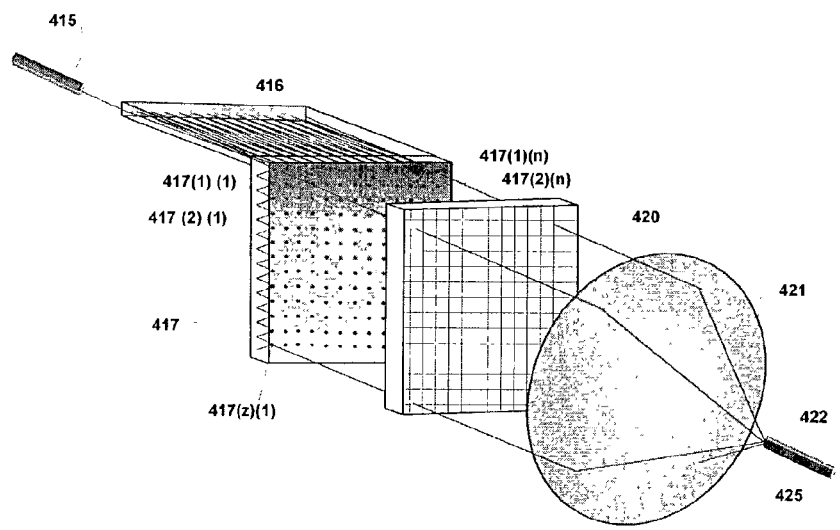
FIG. 27 illustrates an example of a two-dimensional variation of the space integrating encoders and decoders described in FIGS. 22 through 26.

FIG. 27 illustrates an example of a two-dimensional variation of the space integrating encoders and decoders described above. This implementation uses two OTDL devices to produce a higher number of time offsets. The first (coarse) OTDL produces a long time delay between output taps equal to the total time length of a second two-dimensional OTDL (fine) configured as a bank of one dimensional OTDLs. Each output of the first OTDL feeds one OTDL of the second OTDL.

The two-dimensional concept for the device illustrated in FIG. 27 uses a modulation-on-exit configuration as an example. Any of the aforementioned implementations may be used in the two-dimensional configuration of the device to extend the range of time delays for improved resolution. This implementation will be particularly useful for providing very long code lengths.

In FIG. 27, the light from a fiber (for a receiver/decoder) or laser (for an encoder) 415 may be input to the first, coarse OTDL device 416. As described above, this may produce a series of output taps with a relatively long delay time between each tap. Each output beam of device 416 may then be input to one of several input ports contained in an OTDL device 417, device 417(1)(1) through 417(z)(1), 417(1)(2) through 417(z)(2), continuing as necessary to 417(1)(N) through 417(z)(N). The total time delay of each OTDL in 417 may be equal to the time delay between output taps of OTDL 416. This configuration produces a continuum of time delays at the outputs of OTDL 417, configured in a raster format with the first delay at 417(1)(1) in the upper left corner, and the longest time delay at the diagonally opposite corner. The time delays progress vertically through each column with the first output of a column being contiguous with the last output of the previous column. As with the one-dimensional OTDL devices described above, each beam output of the OTDL array then preferably passes through a phase modulator 420, where encoding or decoding occurs. The beams may then be reintegrated at lens 421 to converge at point 422 where there is either an optical fiber (encoder) 425 or a photo detector (receiver/decoder).

The net effect of the two-dimensional architecture is to produce an array of time delays that is longer in time than a one-dimensional OTDL by a multiplicative factor equal to the number of outputs from the OTDL 416. In practice for an OCDMA transmitter or receiver, this allows the use of much longer bit sequence encoding, thereby increasing the number of possible unique codes, and hence the number of users. Note also that for a one-dimensional OTDL, generating N taps requires N bounces of the light for the longest tap delay. For this two-dimensional architecture, however, only $2\sqrt{N}$ bounces of light are required for the longest delayed tap, thus relaxing some optical quality constraints on the device.

Note that, although BPSK modulation has been addressed in the above descriptions, other spreading modulations such as on-off keyed (OOK), quadrature phase shift keyed (QPSK), quadrature amplitude modulation (QAM), etc. may also be used.

The present invention, as illustrated by way of example above, has several technical advantages over prior art OCDMA methods. The present invention may provide increased efficiency by performing bi-phase (or multi-phase multi-amplitude such as QAM) shifting of light, as opposed to simple on-off keying. Typical OCDMA proposed systems use unipolar codes that use plus ones (+1) and zeros (0), generally called on-off keying. This inherently reduces optical efficiency because a "0" code transmits no power in an optical system. To increase efficiency, it is far better to use bi-polar codes, i.e. those consisting of plus one (+1) and minus one (−1) and even better to use higher order QAM modulations. Further, the present invention may be self-coherent in its spreading code. In other words, the present invention does not require separate coherent reference and coherent detection to de-spread the signal. Typical proposed OCDMA systems require separate coherent reference and coherent detection, thereby requiring two separate channels. This is highly inefficient from a perspective of optical efficiency. A further advantage of the present invention is that high-rate code modulation may be produced without the need for high-speed clocks as would be required in a traditional RF CDMA implementation employing high-rate code modulation. Still further, the OTDL of the present invention is a passive device. Thus, the present invention is capable of operating on less power than prior art optical CDMA methods.

Figure 28:
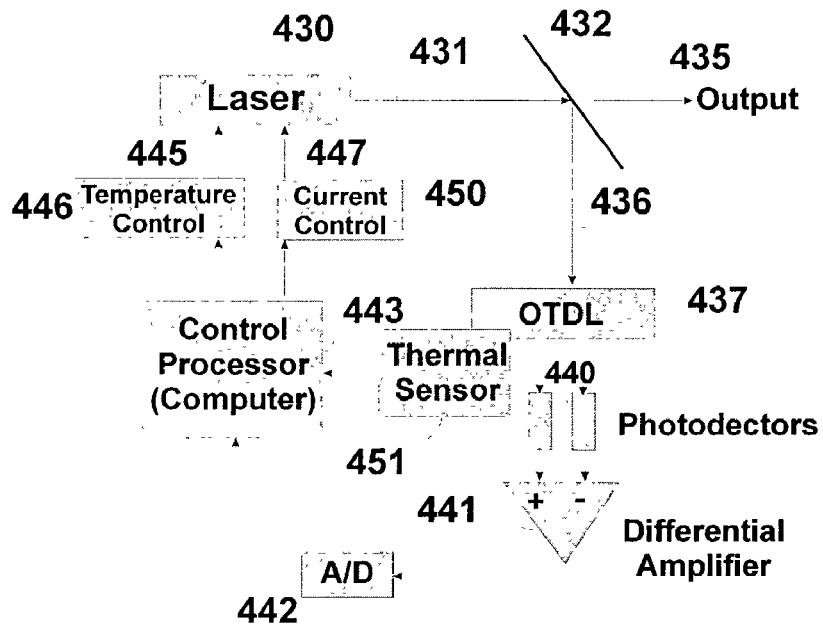
FIG. 28 illustrates an example of a laser wavelength locker system in accordance with the teaching of the invention, in a preferred embodiment.

Wavelength Locker. FIG. 28 illustrates an example of a laser wavelength locker system in accordance with the teaching of the invention, in a preferred embodiment. A laser 430 provides a coherent beam 431 to a beam splitter 432. Beam splitter 432 is designed to permit the majority of energy to pass directly through to output 435, with a smaller quantity of the energy, perhaps 5%, being reflected as beam 436 to an OTDL device 437. The output of OTDL 437 illuminates a suitable optical detector array 440, such as a grid of photodetectors, which convert the received optical energy into electrical signals. The electrical signals are fed into a differential amplifier 441, which provides control signals through A/D converter 442 to a processor 443, such as a computer. The output of laser 430 is determined and continuously adjusted according to temperature control signal 445 from temperature control 446 and signal 447 from current control 450. A thermal sensor 451 continuously monitors the temperature of OTDL 437 and provides the temperature information to processor 443.

During stable operation, laser 430 provides coherent light having a constant wavelength to output 435 and OTDL 437. OTDL 437 similarly emits an unchanging light pattern onto the optical detector array 440. The constant signals from both differential amplifier 441 and thermal sensor 451 received by processor 443 invoke no changes by temperature control 446 or current control 450 to alter the output of laser 430.

Any change in the wavelength of laser 430, however, will alter the energy pattern incident on detector array 440, and thereby the electrical inputs to differential amplifier 441, due to the properties of the OTDL as explained above with respect to FIGS. 11 and 12. Processor 443 combines the new information from differential amplifier 441 and thermal sensor 451, and provides information to temperature control 446 and current control 450 as appropriate, to return the output of laser 430 to the correct wavelength.

Figure 1:
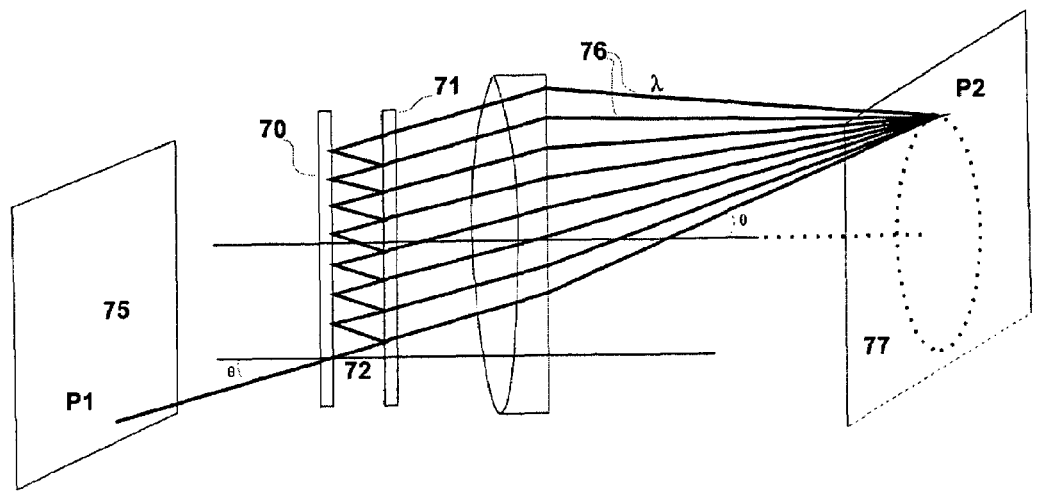
FIG. 1 illustrates one example of a prior art Fabry-Perot interferometer.
Figure 2:
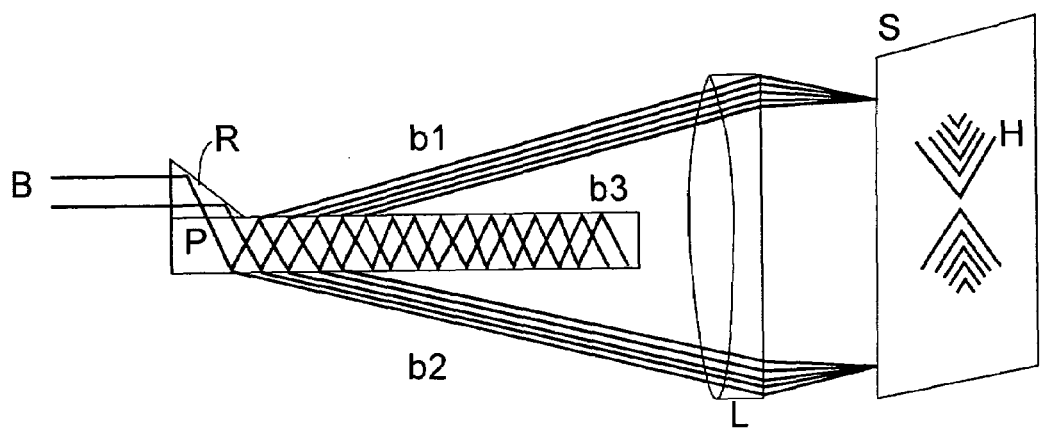
FIG. 2 illustrates an example of a prior art Lummer-Gehrcke interferometer.
Figure 3:
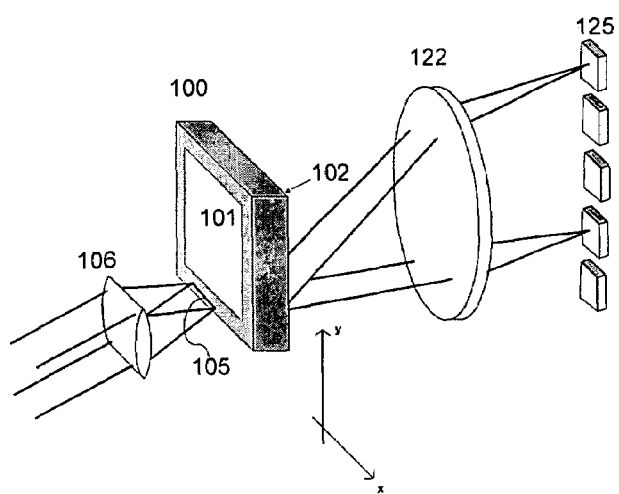
FIG. 3 illustrates an example of a prior art virtually imaged phased array (commonly referred to as a VIPA).
Figure 4:
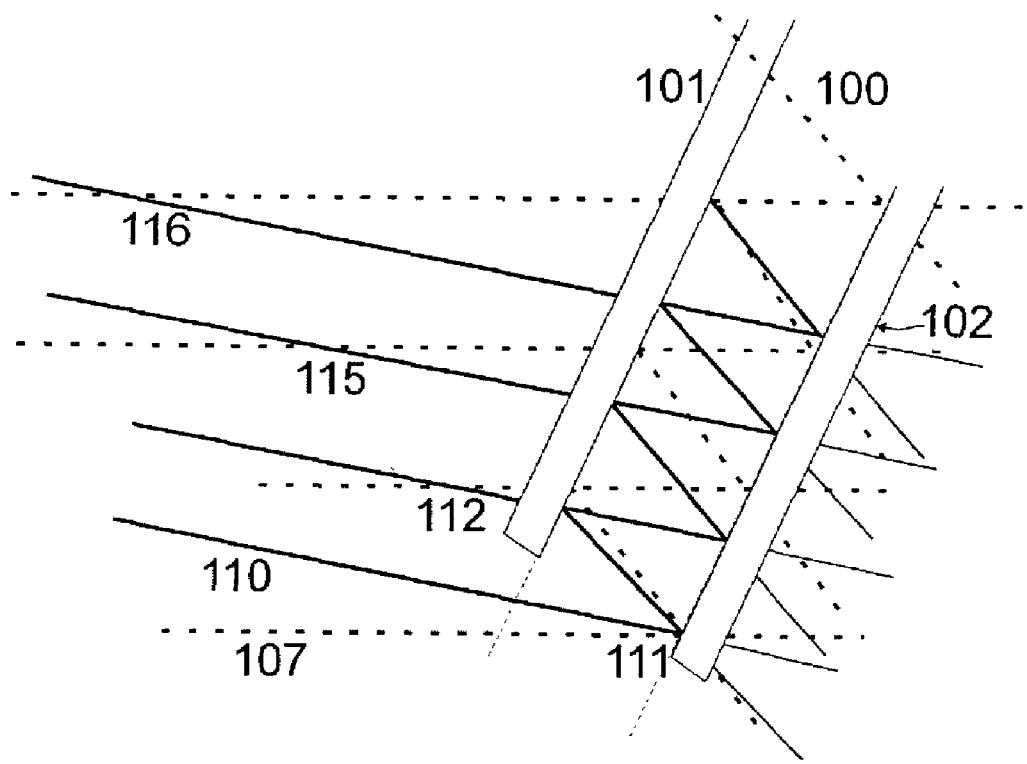
FIG. 4 illustrates an operational side view of the VIPA.
Figure 5:
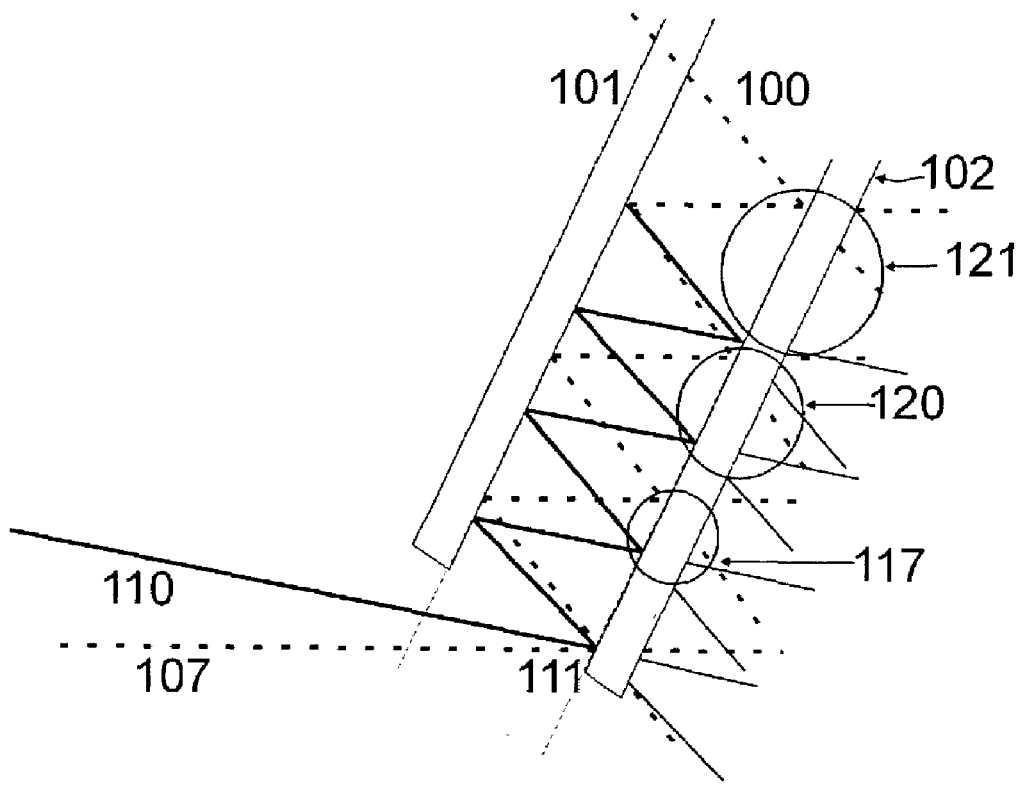
FIG. 5 illustrates an example of the optical distribution of the diverging light beams at the exit surface of the glass plate of the VIPA.
Figure 6:
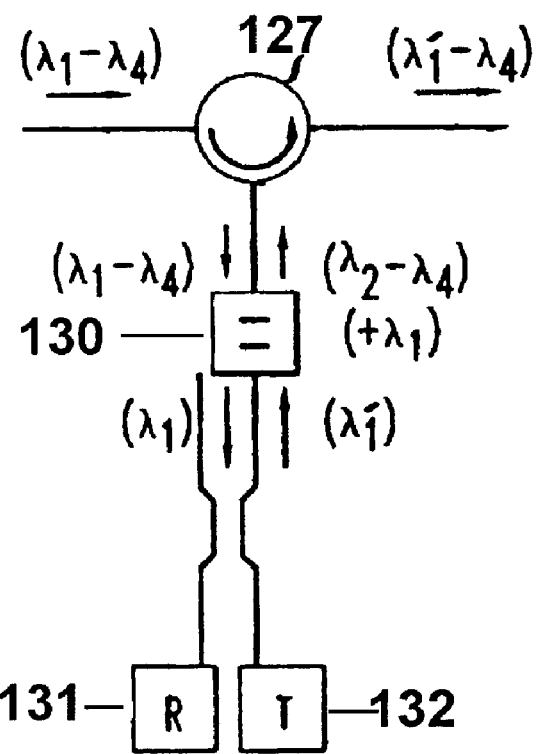
FIG. 6 illustrates an example of a prior art add/drop multiplexer.
Figure 7:
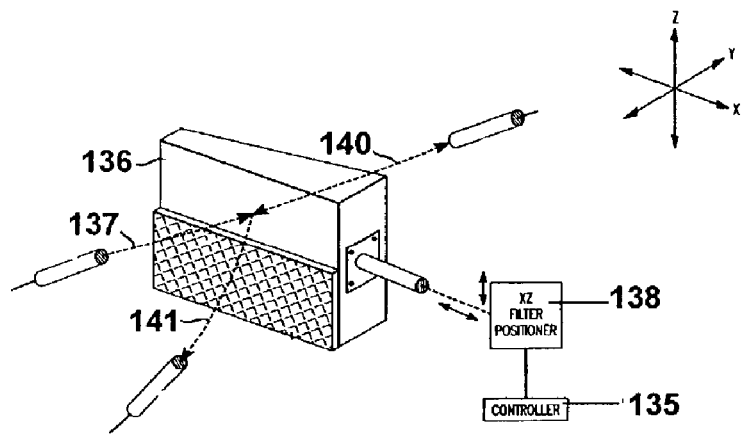
FIG. 7 illustrates an example of a prior art tunable filter
Figure 8:
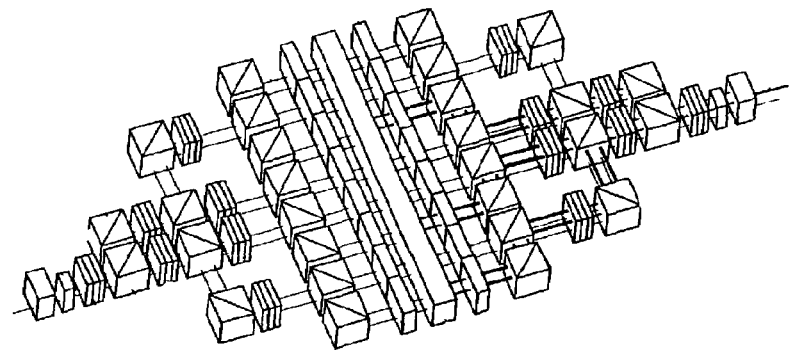
FIG. 8 illustrates an example of a prior art interleaver
Figure 9:
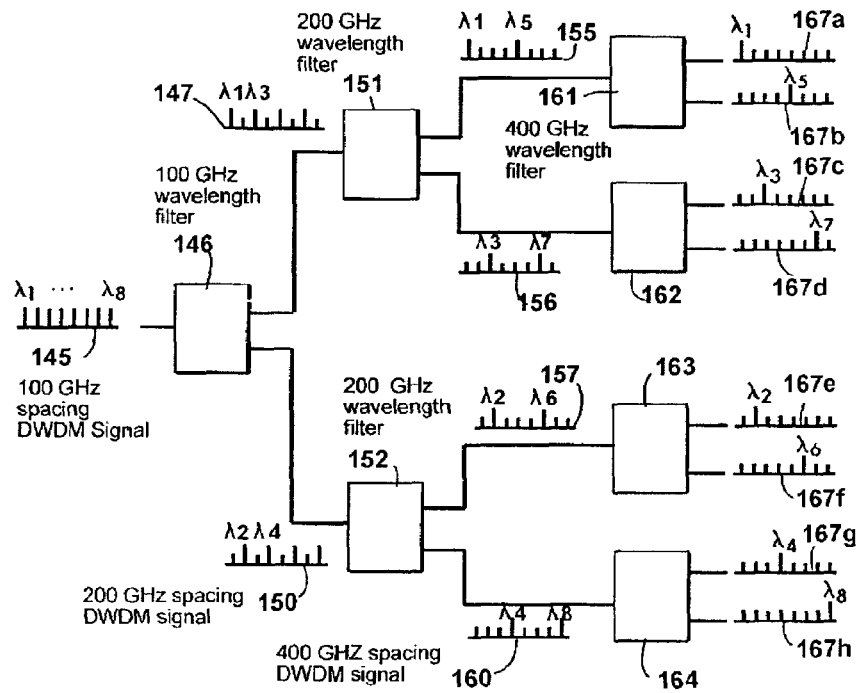
FIG. 9 illustrates an example of a prior art interleaver cascade system.
Figure 10:
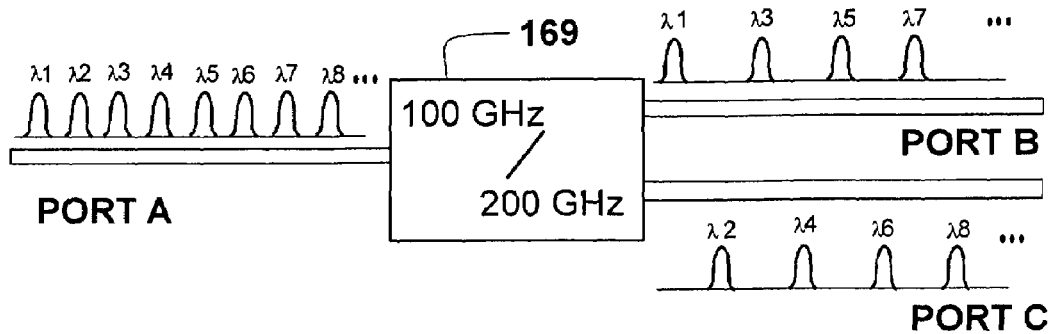
FIG. 10 illustrates an example of the function of a de-interleaver

In contrast to the prior art etalons such as that shown in FIG. 1 of the previously discussed Hall '700 patent, the OTDL 437 in FIG. 28 provides the ability to resolve wavelength channel spacings as narrow as 1 picometer and less. It is the unique features of OTDL 437 that permit the device of FIG. 28 to achieve significantly higher wavelength resolution through its dramatically greater sensitivity, ambiguity, separation and stability.

Figure 29:
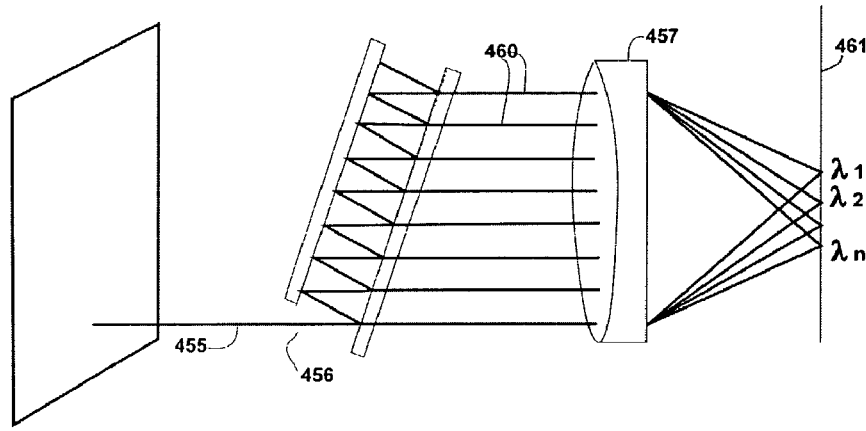
FIG. 29 illustrates an example of an OTDL configured for spatially resolving the optical wavelength spectrum of an incoming optical signal.

FIG. 29 illustrates an example of an OTDL configured for spatially resolving the optical wavelength spectrum of an incoming optical signal. An incoming multi-frequency light beam 455 is directed into OTDL 456. Lens 457 performs a Fourier transform on the multiple beamlets 460 emerging from OTDL 456, which spatially separates the beam into its component wavelengths $\lambda_1, \lambda_2, \ldots \lambda_n$ at output plane 461. In this configuration, the device functions as a spectrum analyzer.

Figure 30:
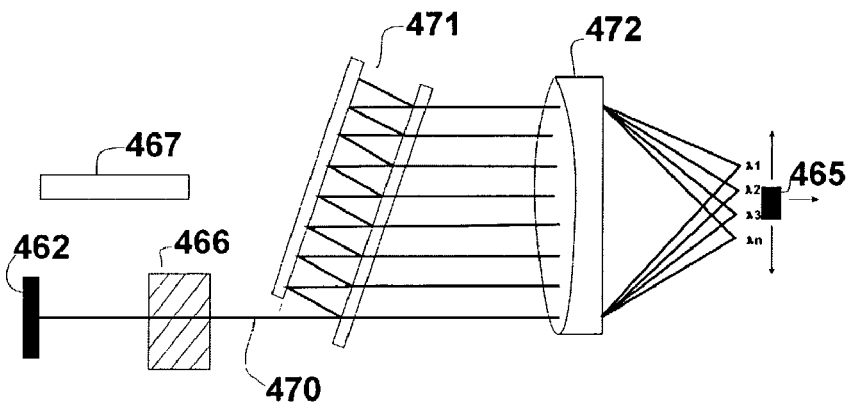
FIG. 30 illustrates an example of the invention configured as a fixed or tunable wavelength stabilizer residing effectively within the laser cavity.

While FIG. 28 illustrates an example of an embodiment of the invention with the OTDL residing in a feedback loop external to the laser cavity, FIG. 30 illustrates an example of the invention configured as a fixed or tunable wavelength stabilizer residing effectively within the laser cavity. Partially reflective mirrors 462 and 465 define a laser cavity. A suitable lasing medium 466 such as a semiconductor is pumped by a suitable energy source 467 to generate an optical output beam 470. Output beam 470 is processed by OTDL 471 and Fourier lens system 472 as previously described to illuminate mirror 465 at the focal plane of lens system 472. Because mirror 465 is partially reflective, a portion of the light energy incident on the mirror will be reflected back through Fourier lens 472 and OTDL 471, through lasing medium 466, and reflected by mirror 462. Because the OTDL spatially resolves different wavelengths of light, the vertical position of mirror 465 selects the wavelength that is allowed to resonate and lase within the cavity. As illustrated, the selected resonating wavelength is identified as $\lambda_2$. Other wavelengths such as $\lambda_1$ and $\lambda_3$ are not reflected and therefore cannot resonate and lase. In a fixed wavelength stabilizer, the position of mirror 465 will be fixed. A tunable device results if mirror 465 is permitted to move vertically to enable selection of any one of the wavelengths $\lambda_1, \lambda_2, \lambda_3, \ldots \lambda_n$.

Figure 31:
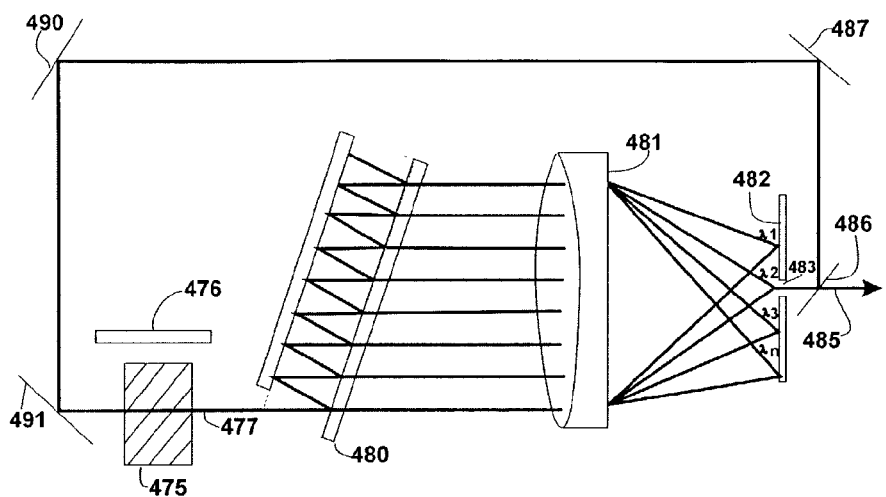
FIG. 31 illustrates an example of an alternative embodiment of the invention configured as a fixed or tunable wavelength stabilizer residing effectively within the laser cavity.

FIG. 31 illustrates an example of an alternative embodiment of the invention configured as a fixed or tunable wavelength stabilizer residing effectively within the laser cavity. A suitable lasing medium 475 such as a semiconductor is pumped by a flash tube or light emitting diode 476 to generate an optical output beam 477. Output beam 477 is processed by OTDL 480 and Fourier lens system 481 as previously described to focus a plurality of discrete wavelengths $\lambda_1, \lambda_2, \ldots, \lambda_n$ on an opaque stop 482 at the focal plane of lens 481. An aperture 483 in stop 482 is vertically positioned to permit a selected beam 485 having a selected wavelength, in this illustration $\lambda_2$, to pass through stop 482 to beam splitting mirror 486. Mirrors 487, 490 and 491 reflect beam 485 back into lasing medium 475. Because the OTDL spatially resolves different wavelengths of light, the vertical position of stop 482 selects the wavelength that is allowed to resonate and lase within the cavity. Other wavelengths such as $\lambda_1$ and $\lambda_3$ are not passed back through the lasing medium and therefore cannot resonate and lase. In a fixed wavelength stabilizer, the position of stop 481 will be fixed. A tunable device results if stop 482 is permitted to move vertically to enable selection of any one of the wavelengths $\lambda_1, \lambda_2, \lambda_3, \ldots \lambda_n$.

Wavelength Locker Operation.

Figure 32:
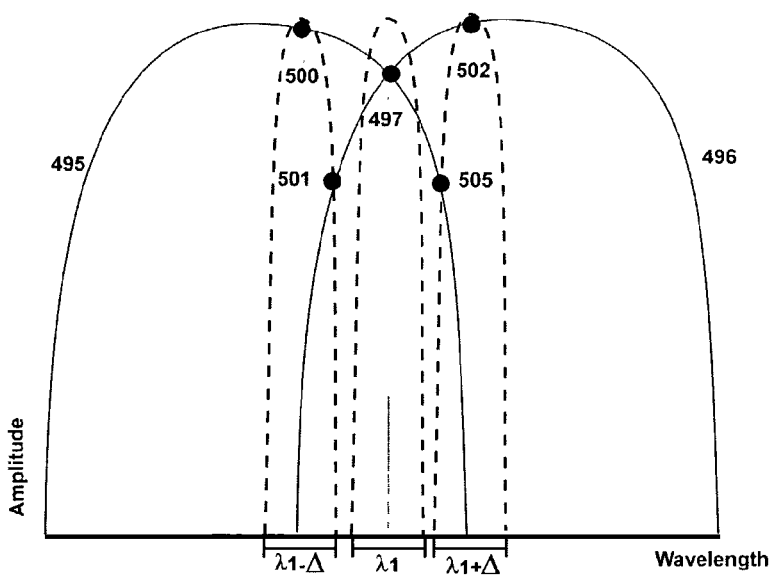
FIG. 32 is a graph illustrating the amplitude response of two detector channels set to center a wavelength at $\lambda_1$.

The operation of the instant invention, in a preferred embodiment, can be best understood with reference to FIG. 32, which is a graph illustrating the amplitude response of two detector channels (495, 496) set to center a wavelength at $\lambda_1$. The response of one detector as a function of the laser wavelength is shown as curve 495. The response of the adjacent detector is shown as 496. When the laser is lasing at the desired wavelength, $\lambda_1$, the response of both detectors is equal 497. If the laser drifts down in wavelength then the response of one detector increases 500 and the other decreases 501. Conversely, if the laser drifts upwards in wavelength, the detectors respond in an opposite sense 502, 505. The control electronics can use this response difference, and its directional information, to control, i.e., "drive", the laser back to its proper wavelength $\lambda_1$.

Figure 33:
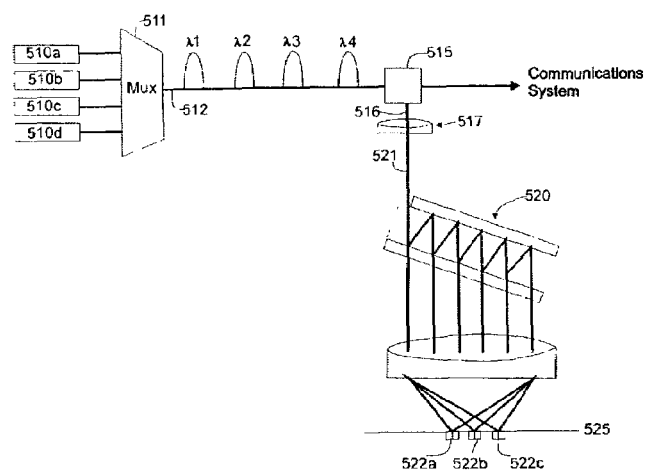
FIG. 33 illustrates an example of a preferred embodiment of the invention with one OTDL device simultaneously measuring wavelengths generated by four different lasers.

FIG. 33 illustrates an example of a preferred embodiment of the invention with one OTDL device simultaneously measuring wavelengths generated by four different lasers. Laser/modulators 510a-d each provide a collimated output comprising a WDM information-carrying channel. A multiplexer 511 combines the four signals $\lambda_1, \lambda_2, \lambda_3$, and $\lambda_4$ into a single WDM optical beam carried on an optical fiber 512. A 95/5 beam splitter 515 divides the beam, with 95% of the energy passing on to the communication system and 5% directed, as collimated beam 516, through collimating lens 517. An OTDL 520 receives the collimated beam 521 and spatially separates the four channels as previously described. Detectors 522a-c at focal plane 525 measure variations in the channel wavelengths as previously described with respect to FIG. 32. Suitable detectors include a photodetector array for electrical processing. Alternatively, detectors 522a-c could be pairs of micro-mirrors or lenslets for coupling to a fiber for sending the information to another optical subsystem.

Figure 34:
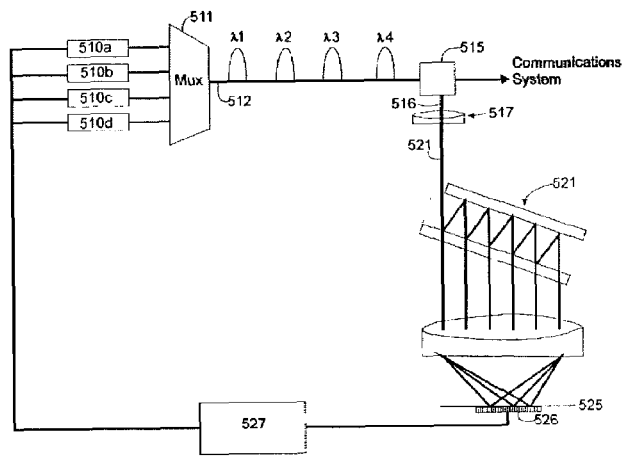
FIG. 34 is another preferred embodiment of this invention illustrating a laser feedback system in which the detector is an array of very closely spaced detectors.

FIG. 34 is another preferred embodiment of this invention, illustrating a laser feedback system in which the detector 526 is an array of very closely spaced detectors. The precision measurements across multiple locations permitted by this device allows for precise measurement of laser drift. These measurements may be sent to a processor 527, which would provide feedback to the original lasers 510a-d in accordance with well-known procedures.

Figure 35:
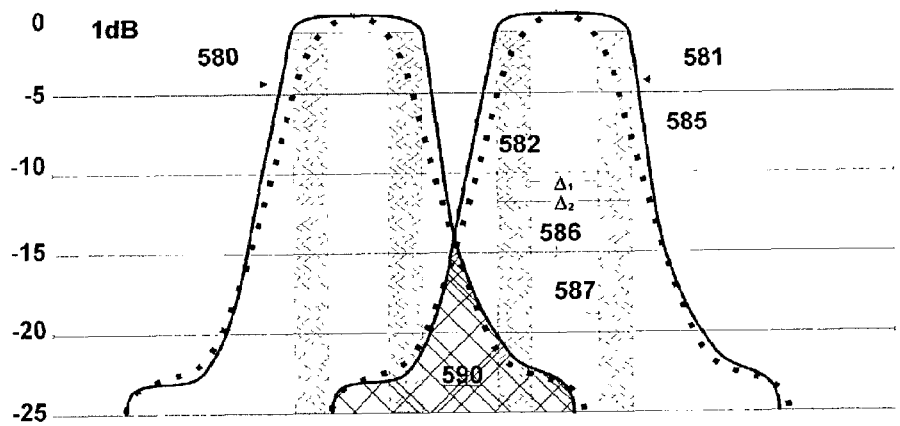
FIG. 35 illustrates an example of a typical DWDM frequency spectrum showing two adjacent channels with 50 GHz channel spacing.

Filter. Improving the data rate of a DWDM device is dependent upon creating a spectral response with a flatter, wider passband. The capacity of a passband filter is commonly measured by the width of the frequency response of the filter at −1 dB signal loss. Generally, the width of the channel should be twice the data rate. For example, to carry a 2.5 Gbps signal, a bandwidth of 5 GHz is needed. FIG. 35 illustrates an example of a typical DWDM frequency spectrum showing two adjacent channels 580, 581 with 50 GHz channel spacing. Curve 582 illustrates an example of a typical Gaussian passband with a −1 dB width $\Delta_1$, while curve 585 illustrates an example of an improved response passband with a −1 dB width $\Delta_2$. The cross-hatched areas 586, 587 in FIG. 35 indicate the capability of a flat-top passband, curve 585, to increase the useable channel signal area compared to the typical Gaussian passband represented by curve 582. Three particular properties of the OTDL permit it to produce a more nearly perfect −1 dB flat-top passband filter:

An OTDL is reversible, i.e., light reflected by a mirror located at the focal plane back into the OTDL has spectral characteristics substantially identical to those of the light initially entering the OTDL;

An OTDL is two-dimensional, permitting multiple beams of light to enter or exit the device in parallel; and The OTDL previously described with respect to FIG. 12 has the ability to process, i.e., resolve, WDM signals that are very close together with 50 GHz to 50 MHz resolution.

The significantly enhanced passband filter characteristics of the OTDL as described above permit construction of DWDM devices having vastly greater data carrying capacity than was previously possible. The exceptional filtering properties of the OTDL result from its ability to resolve the spectral components of an incoming beam of light at a selected frequency onto the focal plane with resolution as fine as 50 MHz. A gradient coating on the OTDL surface permits control of the output spot shape at the focal plane, and particularly permits production of spots with very well controlled sidelobes.

As is readily apparent in FIG. 35, as channels 580 and 581 move closer together their passbands increasingly overlap, as indicated by the crosshatched area 590. While some overlap is acceptable at lower passband levels (−25 dB and lower), crosstalk increases and signal quality diminishes rapidly as the overlap at higher passband levels increases. Narrowing channel spacings demands that DWDM components provide improved isolation between separated wavelengths.

Figure 36:
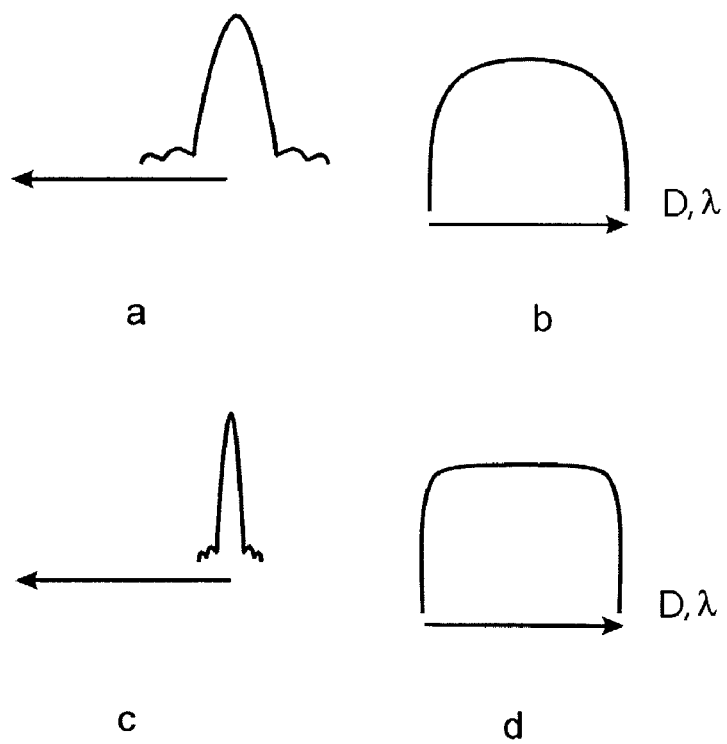
FIG. 36 illustrates an example of the filter functions of two Gaussian shaped spots convolved with a rectangular mirror.

FIG. 36 illustrates an example of the filter functions obtained from two Gaussian shaped spots convolved with the response of a rectangular mirror. FIG. 36a illustrates an example of the Gaussian shape produced by a lower-resolution device such as a diffraction grating, with the resulting filter shape shown in FIG. 36b. FIG. 36c shows the shape produced by the high resolution of an OTDL. As shown in FIG. 36d, the convolution of a high resolution OTDL spot with the rectangular mirror response produces a flat-top filter with less corner roll-off and sharper sides than the lower resolution device.

Figure 37:
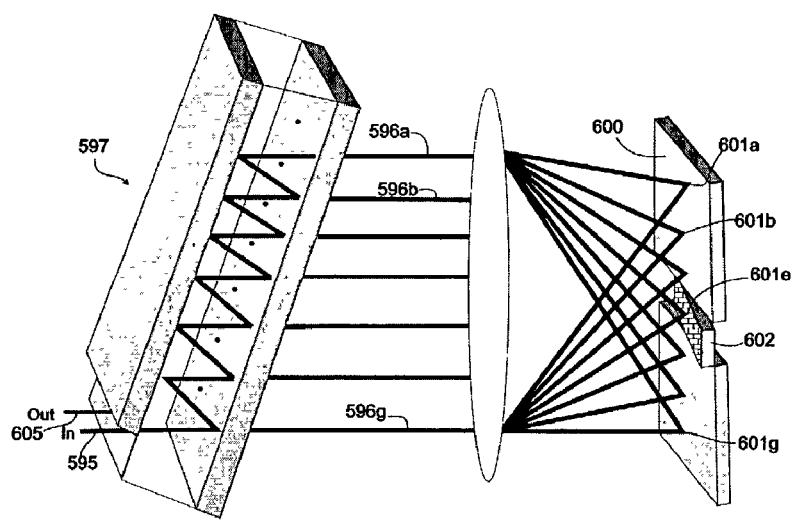
FIG. 37 illustrates an example of an embodiment of the invention as a flat-top filter.

FIG. 37 illustrates an example of an embodiment of the invention as a flat-top filter. An input light beam 595 is separated into time-delayed beamlets 596a-g by OTDL 597. The beamlets interfere at focal plane 600 with points 601a-g representing individually resolved wavelengths of the DWDM signal. A mirror 602 at point 601e directs the specific resolved wavelengths incident on the focal plane at that point back through OTDL 597 to an output 605. The vertical extent of mirror 602 defines the range of resolvable wavelengths (i.e., the channel) that will be reflected back into output 605. By moving mirror 602 vertically up or down to points 601a-g, any set range of resolvable wavelengths can be selected and directed to output 605. Because OTDL 597 is two-dimensional, it is not necessary that output 605 be collocated with input 595. Instead, by rotating output plane 600 slightly, as illustrated in FIG. 37, output 605 can be offset from input 595 by a predetermined amount.

Figure 38:
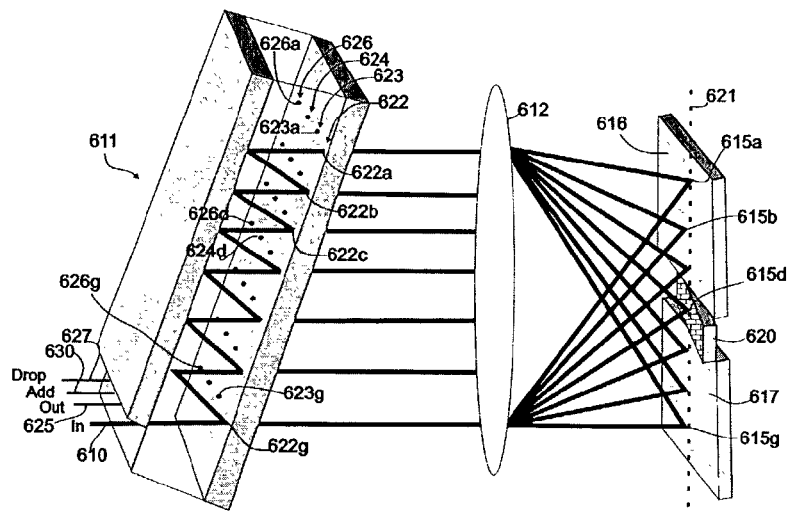
FIG. 38 illustrates an example of an embodiment of the present invention configured as an add-drop multiplexer.

FIG. 38 illustrates an example of an embodiment of the invention configured as an add-drop multiplexer. A multi-channel input signal 610 passes through OTDL 611 and emerges as spatially resolved wavelengths incident on mirror sections 616, 617 and 620 at points 615a-g. Note that OTDL 611 contains a matrix of optical taps. Column 622 is associated with multi-channel input 610 and includes taps 622a-g. Column 623 is associated with multi-channel output 625 and includes taps 623a-g. Column 624 is associated with ADD input 630 and includes taps 624a-g. Column 626 is associated with DROP output 627 and includes taps 626a-g. A complex mirror contains sections 616 and 617 in the focal plane of lens system 612 and section 620 slightly rotated about vertical axis 621. Mirror section 620 performs the add-drop function (i.e., IN to DROP and ADD to OUT) and mirror sections 616 and 617 perform the in-out function (i.e., IN to OUT) for the undropped channels.

Mirror section 620 is positioned in the focal plane at the point 615d where the channel to be added or dropped is incident. All channels except the add/drop channel at point 615d are incident on the in-out mirror sections 616 and 617 and are reflected to taps 623a-g associated with output 625. The drop channel strikes mirror section 620 and the light is sent to taps 626a-g associated with drop output 627. A channel can be added at the same wavelength as the drop channel by providing the input signal to the ADD input 630, sending the wavelengths to mirror section 620. The wavelengths of the add channel strike mirror 620 and are sent to taps 624a-g associated with output 625 where they are multiplexed with the other out-going channels.

Figure 39:
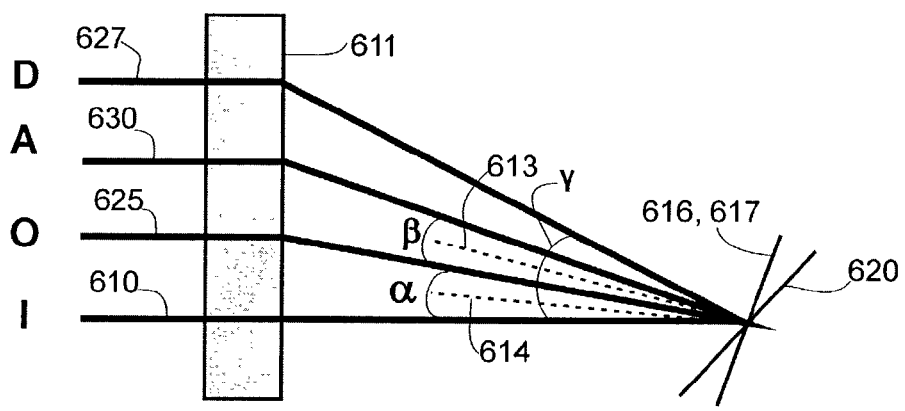
FIG. 39 is a top view perspective of the beam reflections described in FIG. 38 that more clearly illustrates the beam reflections.

FIG. 39 is a top view perspective of the beam paths described above that more clearly illustrates the beam reflections. The beam at input 610 contains all channels, including both those to be retained and the one to be dropped. The channels to be retained are reflected off mirror sections 616, 617 through angle $\alpha$ to output 625, where the bisector 612 of angle $\alpha$ is the normal to mirror sections 616, 617. The channel on input 610 to be dropped is reflected through a greater angle $\gamma$ off mirror 620 to output 627, where the bisector 614 of angles $\beta$ and $\gamma$ is the normal to mirror 620. A channel to be added is provided to input 630 and is reflected through an angle $\beta$, off mirror 620 to output 625. It is important that the bisectors of angles $\beta$ and $\gamma$ be coincident, so input/outputs 610, 625, 627 and 630 (IN, OUT, ADD, DROP) should be arranged in a way that permits this. As an alternative to this arrangement, the arrangement of (IN, ADD, OUT, DROP) would also permit proper mirror angles.

Figure 40:
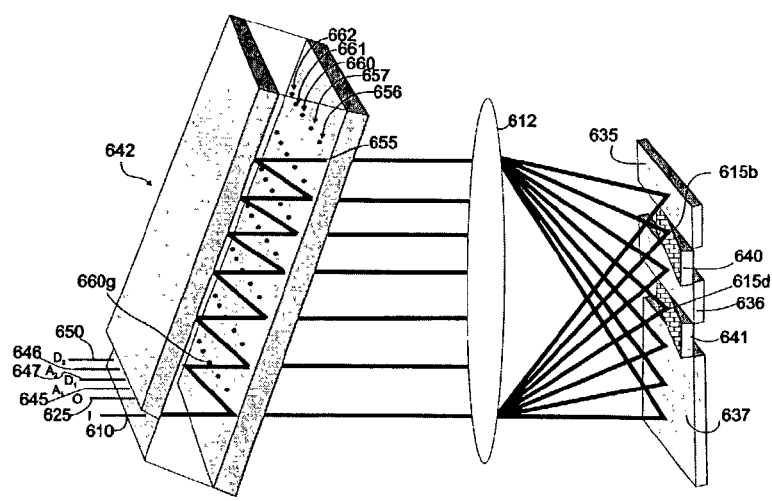
FIG. 40 illustrates an example of an alternative embodiment of the invention that permits add-drop multiplexing of two channels simultaneously.

FIG. 40 illustrates an example of an alternative embodiment of the invention that permits add-drop multiplexing of two channels simultaneously. Coplanar mirror segments 635, 636, 637 reflect all channels on input 610 that are to be retained to output 625. A first rotated (relative to mirror sections 635, 636 and 637) mirror segment 640 is positioned at point 615b to intercept a first channel to be dropped. A second rotated mirror segment 641 is positioned at point 615d to intercept a second channel to be dropped. As is further described below, mirror segments 640 and 641 are rotated at different angles. OTDL 642 has additional outputs and inputs identified as add input (A1) 645, add input (A2) 646, drop output (D1) 647 and drop output (D2) 650. In addition, OTDL 642 has a matrix of optical taps arranged in six columns 655, 656, 657, 660, 661 and 662 associated with multi-channel input 610, multi-channel output 625, Add input (A1) 645, Drop output (D1) 647, Add input (A2) 646 and Drop output (D2) 650, respectively. Column 655 is associated with multi-channel input 610 and includes taps 655a-g. Column 656 is associated with multi-channel output 625 and includes taps 656a-g. Column 657 is associated with Add input (A1) 645 and includes taps 657a-g. Column 660 is associated with Drop output (D1) 647 and includes taps 660a-g. Column 661 is associated with Add input (A2) 646 and includes taps 661a-g. Column 662 is associated with Drop output (D2) 650 and includes taps 662a-g.

Mirror section 640 is positioned in the focal plane of lens system 612 at a point 615b where the first channel (D1) to be dropped is incident. Mirror section 641 is positioned in the focal plane at the point 615d where the second channel (D2) to be dropped is incident. All channels except the drop channels at points 615b and 615d are reflected by coplanar in-out mirror sections 635, 636 and 637 to taps 656a-g associated with output 625. The first drop channel wavelengths strike mirror section 640 and the light is reflected to taps 660a-g associated with drop output 647. A first add channel can be added to the same wavelengths as the first drop channel by providing the first input add signal to add input 645, sending the wavelengths to mirror section 640. The wavelengths of the add channel strike mirror section 640 and are sent to taps 656a-g associated with output 625 where they are multiplexed with the other out-going channel wavelengths.

The second drop channel (D2) beam strikes mirror section 641 and the light is reflected to taps 662a-g associated with drop output 650. A second add channel can be added to the same frequency as the second drop channel by providing the second input add signal to add input 646, sending the wavelengths to mirror section 641. The wavelengths of the second add channel strike mirror 641 and are sent to taps 656a-g associated with output 625 where they are multiplexed with the other out-going channels.

Figure 41:
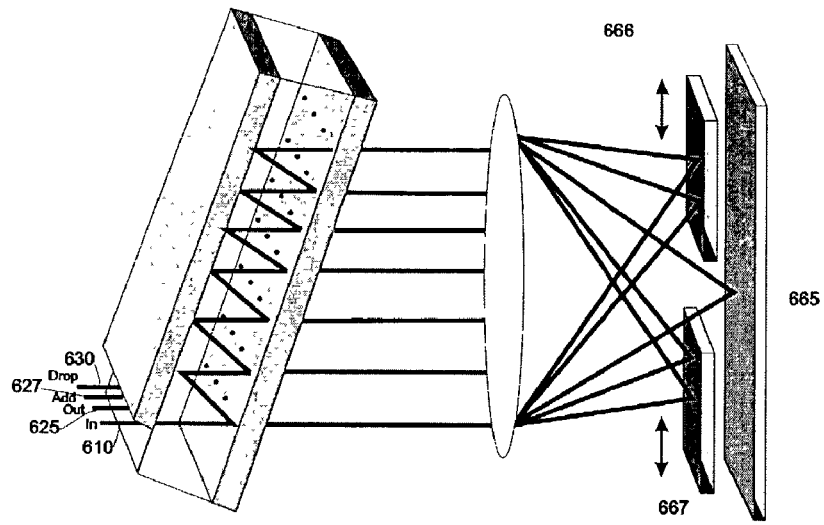
FIG. 41 illustrates an example of an alternative embodiment of the single channel add/drop multiplexer of FIG. 38 with channel tuning capability.

FIG. 41 illustrates an example of an alternative embodiment of the single channel add/drop multiplexer of FIG. 38 with channel tuning capability. Mirror 665 acts as the add/drop mirror 620 of FIG. 38. Two coplanar mirrors 666 and 667 are configured to move together with the gap between them selecting the band that will be dropped. By controlling the size of the aperture between mirrors 666 and 667, the size of the band to be dropped may be adjusted and by controlling the location of the aperture, the centering of the band to be dropped may be adjusted. Mirrors 666 and 667 function as the in/out mirror sections 616 and 617 of FIG. 38 to send all channels not being added or dropped to the taps associated with output 625. Mirror 665 will be rotated slightly relative to mirrors 666 and 667 as previously described to permit the incident light beams to reflect back to the proper taps within OTDL 611.

Figure 42:
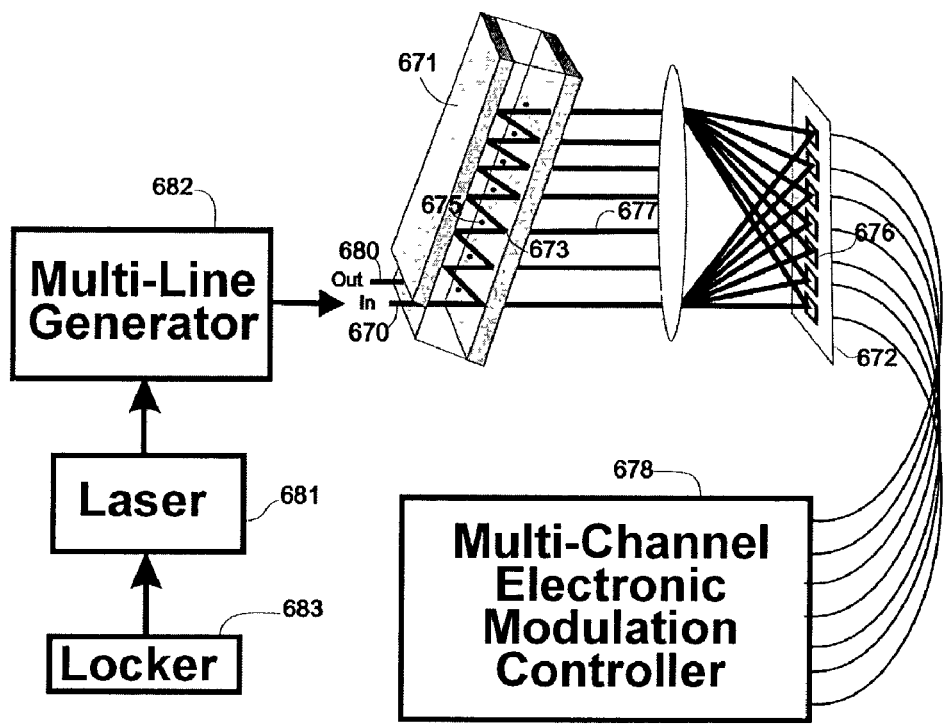
FIG. 42 illustrates an example of an embodiment of the present invention configured as a Gaussian transmitter.

FIG. 42 illustrates an example of an embodiment of the present invention configured as a Gaussian channel transmitter. An unmodulated, multi-wavelength input beam is provided to input 670 of OTDL 671. A mirror 672 reflects each incident spatially separated wavelength from the input optical taps 673a-g to output taps 675a-g. A bi-directional area modulator array 676, which is well-known in the prior art, is positioned on mirror 672 to receive unmodulated wavelengths 677, with one modulator element for each channel. In the inbound direction, an unmodulated wavelength passes through modulator 676, acquires its modulation, and strikes mirror 672. As the wavelength is reflected off the mirror, modulator 676 again modulates the wavelength with information provided by controller 677, thereby obtaining double the effective modulation. The modulated channel, together with other channels similarly modulated with information, is provided through taps 675a-g to output 680 where all of the individual beams are combined in a single multiplexed optical signal at output 680. The signal provided to input 670 can be generated by a laser 681 that drives a multi-line generator 682. A wavelength locker 683 as previously described with respect to FIG. 28, will ensure that the laser, and hence the entire multi-line combination, is at the precise wavelength required.

Figure 43:
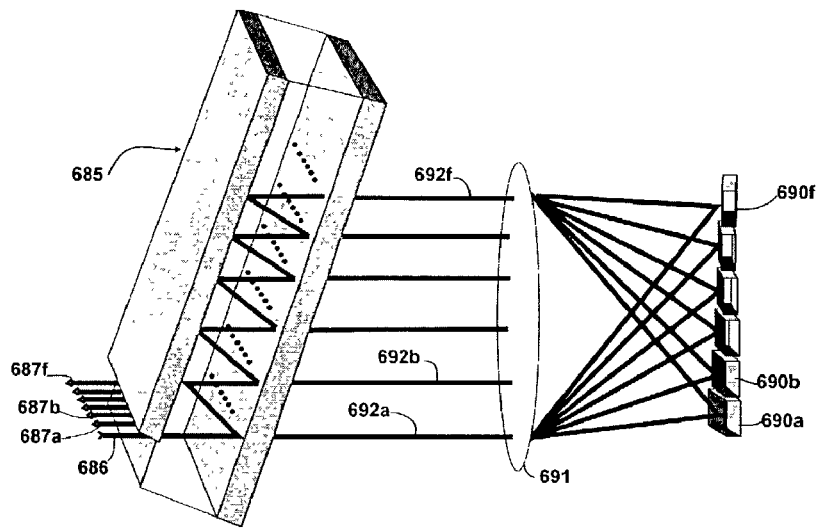
FIG. 43 illustrates an example of an embodiment of the present invention configured as a wavelength router.
Figure 44:
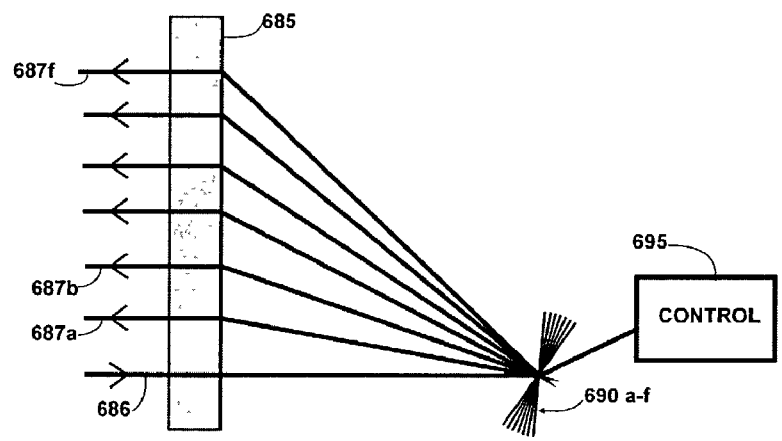
FIG. 44 illustrates a top view of the apparatus of FIG. 43 with a control for rotating mirror segments relative to each other.

FIG. 43 illustrates an example of an embodiment of the invention configured as a de-multiplexer or wavelength router. An OTDL 685 has a single input 686 and multiple outputs 687a-f. A plurality of mirror segments 690a-f are positioned at the focal plane of lens system 691 and rotated relative to each other such that each mirror segment receives a selected one of the resolved wavelength channels and reflects it to a selected one of the outputs 687a-f. The resulting router provides fixed channel routing (i.e., simple de-multiplexing) if the mirror segments are immovable. By constructing the mirror segments to be movable relative to each other, however, or by substituting MEMS devices for the mirror segments, the router may be dynamically programmed to send channels to selected outputs. FIG. 44 illustrates a top view of the apparatus of FIG. 43 with a control 695 for rotating mirror segments 690a-f relative to each other.

Figure 45:
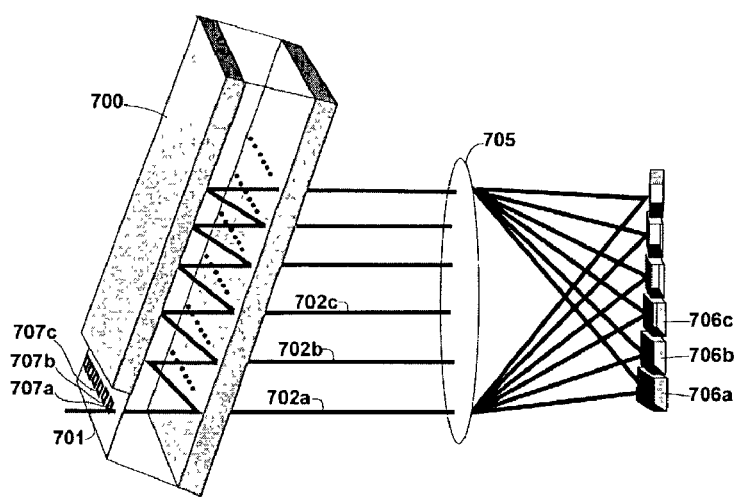
FIG. 45 illustrates an example of a 4-pass flattop transmitter in accordance with the present invention.

FIG. 45 illustrates an example of a 4-pass flat-top transmitter in accordance with the present invention. To understand the operation and utility of this device, it is beneficial to recall that an OTDL receiving a single discrete unmodulated wavelength generates a single, finely defined, spot at the focal plane. If the input wavelength contains any modulation, the generated spot is larger in relation to the frequency variation within the input signal. Referring to FIG. 45, a multi-wavelength beam comprised of unmodulated (single frequency) carrier beams enters OTDL 700 on in/out fiber 701. In accordance with prior descriptions, the multi-wavelength beam is spatially separated into time-delayed beamlets 702a, 702b, 702c, . . . which, after passing through lens system 705, interfere on a plurality of mirrors 706a, 706b, 706c, . . . , and are reflected back into OTDL 700.

It was previously described that the optical taps on an OTDL are arranged in an array of rows and columns. Each column of taps is associated with a separate optical input beam 230 (FIG. 11), or, as will be described immediately below, with a modulator. Each row of taps is associated with a particular time delay of the input beams. A plurality of bidirectional modulators 707a, 707b, 707c, . . . of the type that was previously described with respect to FIG. 42 are positioned on OTDL 700 to receive light that is reflected back into OTDL 700 by mirrors 706a, 706b, 706c, . . .

Mirrors 706a, 706b, . . . are each rotated relative to each other at an angle to cause each wavelength incident on a mirror to be reflected back to a specific column of optical taps in OTDL 700. For example, the beam reflected by mirror 706a would be reflected to modulator 707a, the wavelength reflected by mirror 706b would be reflected to modulator 707b, etc. Modulator 707a modulates the carrier wavelength with an information signal, which necessarily alters the frequency content of the resulting beam from a pure single frequency to a frequency band. The modulators are backed by mirrors so that, after passing through the modulator, the light is reflected back through the modulator again (thereby doubling the modulation) and passing back into the OTDL where it is passed to the mirrors located in the focal plane of lens system 705. The fixed angle of rotation of the mirrors, which caused wavelengths from the multi-channel input beam to be directed to the modulators, now ensures that each of the modulated beamlets is reflected by its corresponding mirror back through OTDL 700 to in/out fiber 701. As a result, the modulated beamlets are multiplexed for entry into a communications system connected to in/out fiber 701.

A particular advantage of the embodiment illustrated in FIG. 45 over the embodiment illustrated in FIG. 42 is that the embodiment of FIG. 45 imparts a flat-top filter on the modulated signal while the embodiment of FIG. 42 imparts a Gaussian filter. The embodiment of FIG. 45 does not require an anamorphic optical system such as a cylindrical lenses to focus light onto an optical modulator array. In addition, the embodiment of FIG. 45 is superior for complex modulation schemes such as root-raised cosine or complex amplitude weighting methods.

Figure 46:
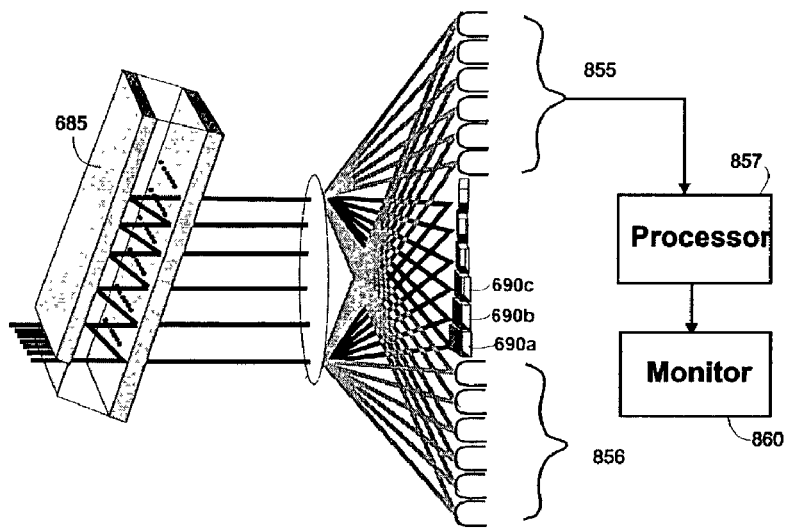
FIG. 46 illustrates an example of an alternative embodiment of the router described with respect to FIG. 43 that monitors the performance of the routed channels.

FIG. 46 illustrates an example of an alternative embodiment of the wavelength router described with respect to FIG. 43. FIG. 16 above described the optical distribution along the frequency axis of an OTDL output, and particularly the N+1 and N−1 order signals that are generated. If additional detectors 855, 856 are positioned in the focal plane to receive the N+1 and N−1 order signals, they may be processed by a processor 857 and the results displayed on a monitor 860 or used to control system components. The $N^{th}$ order light signals are reflected by mirrors 690a, 690b, 690c, ... as previously described for routing to the desired output ports.

Figure 47:
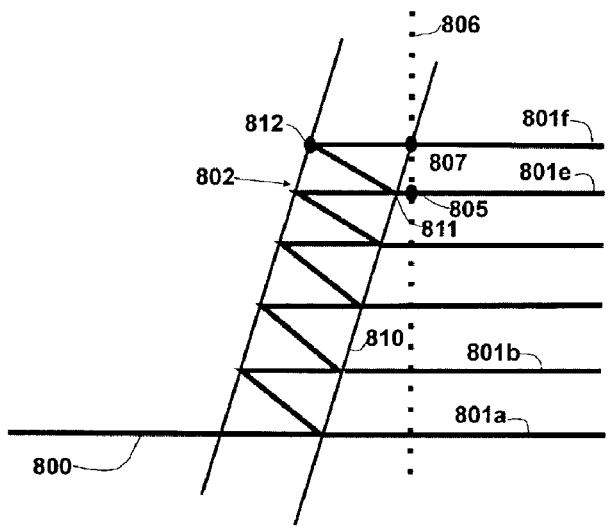
FIG. 47 illustrates an example of the time-delayed output beamlets resulting from passage of a multi-channel DWDM signal an OTDL.

Interleaver and De-interleaver. In addition to those functions previously described, the OTDL subsystem 247 illustrated in FIG. 12 can be used as a multi-port interleaver. This is a result of the finite free spectral range of the device and the multiple channels it produces within a free spectral range interval. With reference to FIG. 47, a multi-channel DWDM signal 800 is spatially separated into time-delayed beamlets 801a, 801b, ... by OTLD 802. The free spectral range of OTDL 802 is determined by the time-of-arrival difference between wavefronts arriving at a point 805 on phase plane 806 and optical tap 807 of OTDL 802. Phase plane 806 represents the plane defined by all in-phase wavefronts emerging from the optical taps of OTDL 802, which will be orthogonal to the optical axis of the device when the system is properly aligned. Upon striking the partially reflective coating at tap 811, a quantity of light is transmitted through the coating 810 to point 805. Another quantity of the light is reflected by coating 810 and arrives, via reflection off the back OTDL surface at point 812, at tap 807. The difference in time that it takes the light to get to point 805 versus point 807 is called the tap-to-tap delay time ($\tau$). The free spectral range of the device is the inverse of the tap-to-tap delay time, or:

$$FSR = 1/\tau$$

If the delay, $\tau$, is such that there are exactly N wavelengths of light difference between the path defined by points 811, 812, 807 and the path defined by points 811, 805, then the wavefront of the combined beamlets 801a, 801b, ... will lie exactly on the plane 806 normal to the direction of propagation of the beamlets. If the wavelength of the light is reduced (i.e., frequency increased) to the point where there are then N+1 wavelengths of light difference between the paths, then the wavefront of the combined beamlets will again lie exactly on the plane 806. Thus, the output of the device is completely ambiguous on this change and the wavefronts will focus on exactly the same spot in the center of the focal plane. The change in optical frequency which accompanies this change from N to N+1 wavelengths in an optical path length, L, of delay $\tau$ is:

$$\Delta F = f_1 - f_0 = ((N+1)/L - N/L)^*c = (1/L)^*c = c/L;$$

where c is the speed of light. Noting that $\tau = L/c$, then:

$$\Delta F = c/L = 1/\tau = FSR.$$

Thus, a given output channel of the OTDL will pass light centered at frequencies of:

$$f_0 \pm K^* FSR,$$

Where $f_0$ is any optical frequency which is centered on that channel and K is any integer.

Meanwhile, the adjacent channel of the device will pass frequencies which are also spaced by the FSR, but which are offset by one channel spacing, i.e., for a device with channel spacings of $\Delta f$, the frequencies passed by one channel will be shifted by $\Delta f$ from those passed by the adjacent channel. Note that the FSR of each channel is slightly different because each channel in the output plane (246 in FIG. 11) is at a slightly different angle with respect to the face of the OTDL; therefore, the channel spacings will change slightly as one moves more and more FSR's from the starting frequency (i.e., as the magnitude of K gets larger.) This effect is small enough to be insignificant in most applications.

Figure 48:
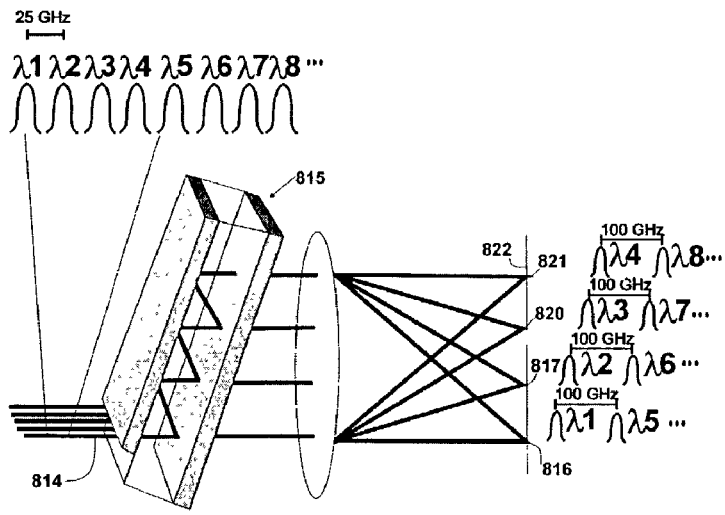
FIG. 48 illustrates an example of the interleaver/deinterleaver capability of a four channel OTDL.

FIG. 48 illustrates an example of an OTDL 815 configured as a four-channel de-interleaver. OTDL 815 separates the wavelengths $\lambda 1, \lambda 2, \lambda 3, \ldots$ in sequence to the output points 816, 817, 820 and 821 on focal plane 822. As illustrated, wavelengths $\lambda 1$ through $\lambda 4$ are received at output points 816, 817, 820 and 821 respectively. It will be readily apparent from previous descriptions of the operation of the OTDL, however, that additional inputs may be provided to OTDL 815 to permit simultaneously de-interleaving of multiple input signals. The free spectral range interval causes the next wavelengths, $\lambda 5$ through $\lambda 8$ to also exit at output points 816, 817, 820 and 821 respectively, with the free spectral range of the device controlling the spacing intervals for the exiting wavelengths. The FSR spacing for this embodiment is shown in FIG. 48 as 100 GHz. This example has illustrated a small device having only four-output port device with a spacing of the channels on each output 816, 817, 820, and 821 of 100 GHz. The principal described herein, however, may be expanded for construction of a more practical 40-port de-interleaver.

Because OTDL 815 is bidirectional, the same device can also function as an interleaver in accordance with the principles of the device illustrated in FIG. 58. When OTDL 815 functions as a de-interleaver, all the wavelengths are on the incoming fiber 814 and the outputs will be connected at points 816, 817, 820 and 821. As an interleaver, points 816, 817, 820 and 821 become the input ports and fiber 814 is the output. With reference to FIG. 58, the wavelength $\lambda 1$ will be replaced by a multi-channel signal comprising wavelengths $\lambda 1, \lambda 5, \ldots$ In like manner, wavelength $\lambda 2$ will be replaced by a multi-channel signal comprising wavelengths $\lambda 2, \lambda 6, \ldots$ and $\lambda 3$ will be replaced by a multi-channel signal comprising wavelengths $\lambda 3, \lambda 7, \ldots$ For a four-port interleaver corresponding to the device illustrated in FIG. 48, a fourth input (not shown in FIG. 58) $\lambda 4$ will provide a multi-channel signal comprising wavelengths $\lambda 4, \lambda 8, \ldots$ An interleaver configured in accordance with FIG. 58 and receiving on its inputs the de-interleaved signals having 100 GHz spacings as illustrated in FIG. 48 will produce a single output signal with 25 Ghz channel spacings as illustrated in FIG. 48.

Figure 49:
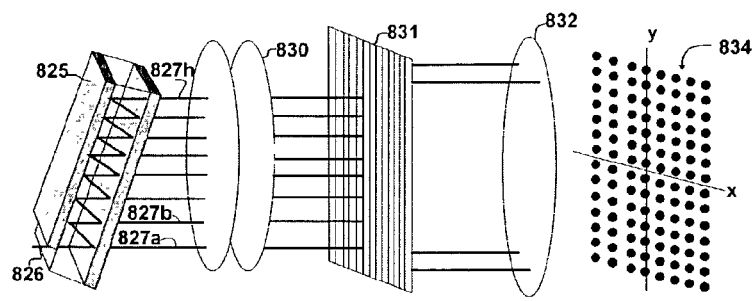
FIG. 49 illustrates an example of an optical spectrometer analyzer and optical channel monitor in accordance with the present invention.

Optical Spectrum Analyzer. An improved optical spectrometer analyzer and optical channel monitor in accordance with the present invention is illustrated in FIG. 49. An OTDL 825 has an input on which a fiber 826 provides an optical signal. OTDL 825 generates beamlets 827a-h. After passing through a lens system 830, the beamlets are imaged onto a diffraction grating 831 located at the focal plane of lens system 830. As each beam reflects from diffraction grating 831 it is spatially separated into a frequency distribution along the x-axis. In this embodiment, OTDL 825 performs a fine spectral separation and diffraction grating 831 performs a coarse separation. The output of this subsystem, after passing through an integrating lens 832, is a two-dimensional matrix illuminating a detector array 834 or any other type of optical pickup, e.g., a fiber array or lens system, where coarse separation is in the x dimension and fine separation is in the y dimension. Any of the other devices previously discussed above, including an OTDL, that disperses light according to its wavelengths could be used with the OTDL as a replacement for diffraction grating 831.

Figure 50:
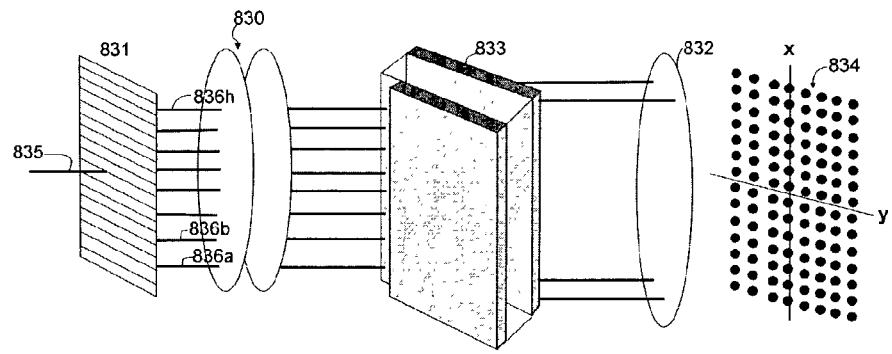
FIG. 50 illustrates an example of an alternative embodiment of the OSA shown in FIG. 49.

An alternative embodiment of the OSA of FIG. 49 is illustrated in FIG. 50, where diffraction grating 831 precedes OTDL 833. An optical signal 835 is diffracted by diffraction grating 831, resulting in the separation of the light beam into spatially separated beamlets 836a-h. OTDL 833 has a plurality of inputs, as previously described, for receiving beamlets 836a-h. The output of OTDL 833 is a spectral frequency distribution of each frequency band in the x dimension, which is passed through lens system 832 and focused on detector 834, or any other type of optical pickup, e.g., a fiber array or lens system,. In this embodiment, as in the embodiment of FIG. 49, the OTDL performs the fine separation in the x-dimension and the grating device performs the coarse separation in the y-dimension.

Figure 51:
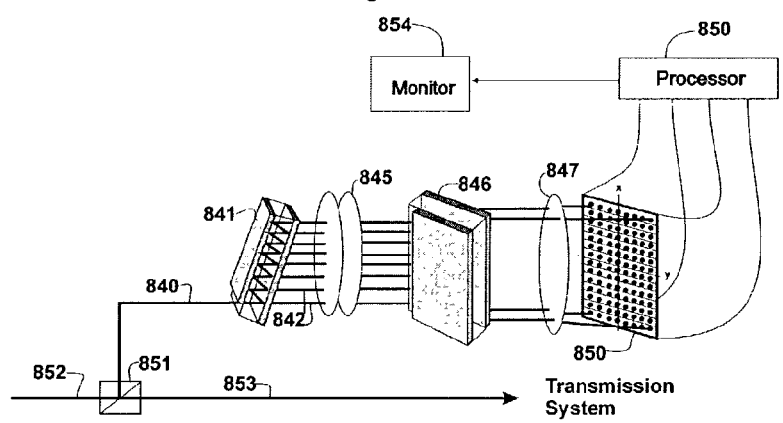
FIG. 51 illustrates an example of an alternative embodiment of the OSA that uses two OTDLs to produce the fine and coarse separations.

Two OTDL devices configured as illustrated in FIG. 51 produce the fine and coarse separations. An optical beam 840 enters OTDL 841 and the frequencies 842 are coarsely separated along the y-axis. Beamlets 842 are passed through Fourier transform and recollimation lenses 845 to the second OTDL 846. Note that the axes of OTDL 841 and 846 are orthogonal. OTDL 846 performs the fine spectral separation. Light emerging from OTDL 846 passes through an integrating lens 847, which focuses the light onto a detector array 850, or any other type of optical pickup, e.g., a fiber array or lens system,. The result is a two-dimensional matrix of fine (y-dimension) and coarse (x-dimension) output spots. Detector array 850 may be any of a number of well known devices that convert incident light energy into an electrical signal including photocells and charge-coupled devices. A processor 850 connected to a monitor 851 enables an operator to monitor the characteristics of a beam 852 as it passes through beam splitter 851 and on to the transmission system as beam 853. The two-dimensional detector array 850 enables the OSA to continuously monitor the wavelengths or act as an optical spectrum analyzer for testing.

Figure 52:
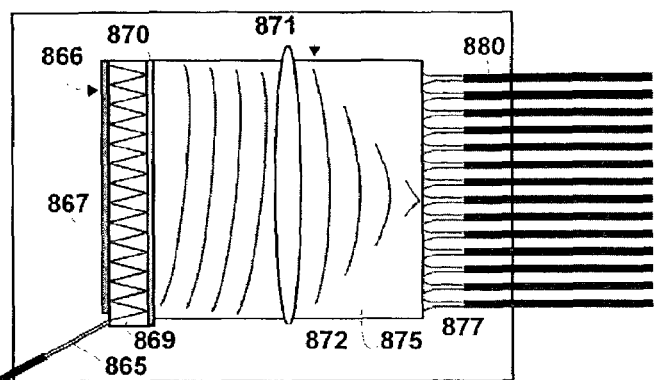
FIG. 52 is a block diagram of an exemplary embodiment of a monolithic integrated optic OTDL demultiplexer device in accordance with the present invention.
Figure 53:
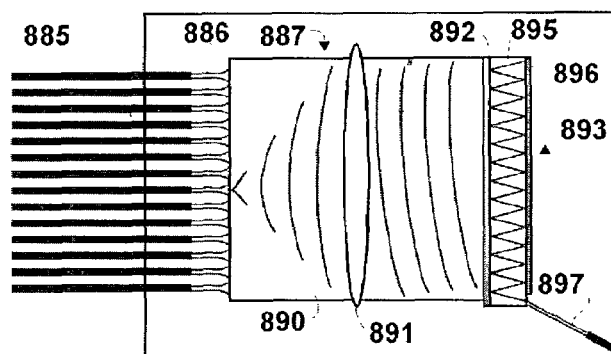
FIG. 53 is a block diagram of an exemplary embodiment of a monolithic integrated optic OTDL multiplexer device in accordance with the present invention.

Integrated Optic OTDL Devices. FIG. 52 and FIG. 53 are block diagrams of exemplary embodiments of a monolithic integrated optic OTDL demultiplexer and multiplexer, respectively, in accordance with the present invention. These planar embodiments utilize the fundamental operation of an OTDL cavity, as described in detail elsewhere in this application, and as illustrated in FIG. 11. In the integrated optic OTDL demultiplexer, as shown in FIG. 52, a collimated input beam enters the OTDL device 866 from an optical fiber via an input coupler 865. The first surface 867 of the OTDL device is provided with an interface that is substantially 100% reflective. The second surface 870 of the OTDL device is spaced from and opposed to the first surface, and is provided with an interface that is partially reflective. The collimated beam enters the cavity 869, after which a portion of the input beam exits the cavity at a first location or "optical tap" (e.g., tap 240a of FIG. 12). The remaining portion of the collimated input beam is partially reflected by the second surface and then totally reflected by the first surface. The input beam continues to propagate between surfaces 867 and 870, producing a series of "optical taps". The result of this process is that multiple output beams exit the cavity 869 at multiple tap locations with a progressive time delay from beam to beam. The various output beams are then directed to an anamorphic optical system 871, consisting of a lens 872 and a waveguide 875. The anamorphic optical system 871 performs the functions of: 1) Fourier transformation of the output of the cavity in the x direction, and 2) guiding of the output of the cavity in the y direction toward an output surface, configured with an array 877 of output couplers. An array 880 of output fibers is coupled to the coupler array 877. Each output optical fiber carries a unique wavelength channel, channelized from the frequency spectrum of the input beam.

FIG. 53 is a block diagram of an exemplary embodiment of a monolithic integrated optic OTDL multiplexer device in accordance with the present invention. The integrated optic OTDL multiplexing operation is accomplished by effectively reversing the operation of the demultiplexer shown in FIG. 52. In this embodiment, an array 885 of input optical fibers, each fiber carrying a unique wavelength channel, is coupled to the coupler array 886. Within the anamorphic optical system 887, each of the input beams is coupled directly into a waveguide 890 and through a lens 891 to be incident on the OTDL device 893. Because the second surface 892 of the OTDL device 893 is partially transmissive, the incident light passes through the second surface 892 and propagates within the cavity 895, reflecting back and forth between surfaces 896 and 892. Through this process the multiple input beams are integrated into a single multi-channel output beam at output coupler 897.

Figure 54:
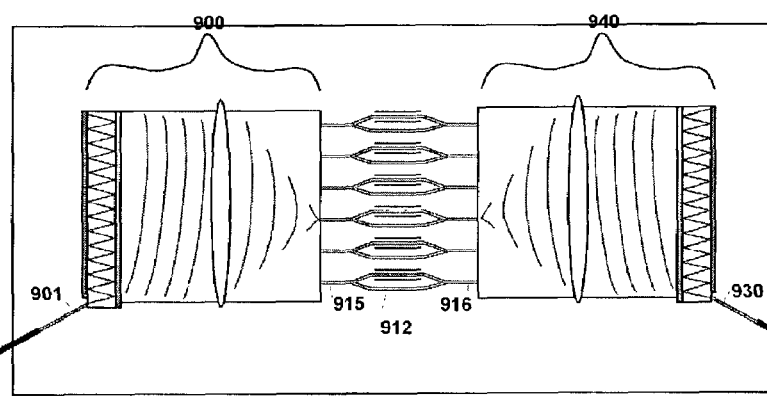
FIG. 54 is a block diagram of an exemplary embodiment of a monolithic integrated optic OTDL multi-channel modulator device in accordance with the present invention.

An embodiment of the present invention configured as a multi-channel modulator is shown in FIG. 54. In this embodiment, a plurality of modulators 912 is inserted between a monolithic integrated optic OTDL de-multiplexer 900 and an OTDL multiplexer 940. An input light beam composed of a comb of multiple unmodulated wavelength carriers on waveguide 901 is de-multiplexed into its individual wavelength components as previously described. The unmodulated wavelength carriers enter an array of discrete waveguides 915. Each of the discrete waveguides is positioned on the array to receive the wavelength carrier of one channel, which it couples into a data modulator 912. Modulators 912 can be, for example, a series of commercially available single-wavelength planar modulators, which modulate the wavelength carriers with appropriate signal information. Each modulator is connected to another one of a plurality of discrete waveguides 916, which conveys the modulated carrier signal to multiplexer 940 as previously described with respect to FIG. 53. The modulated channels emerge from multiplexer 940 on waveguide 930 as a single multiplexed signal. The result is a planar integrated optic OTDL device that acts as a multi-channel modulator.

Figure 55:
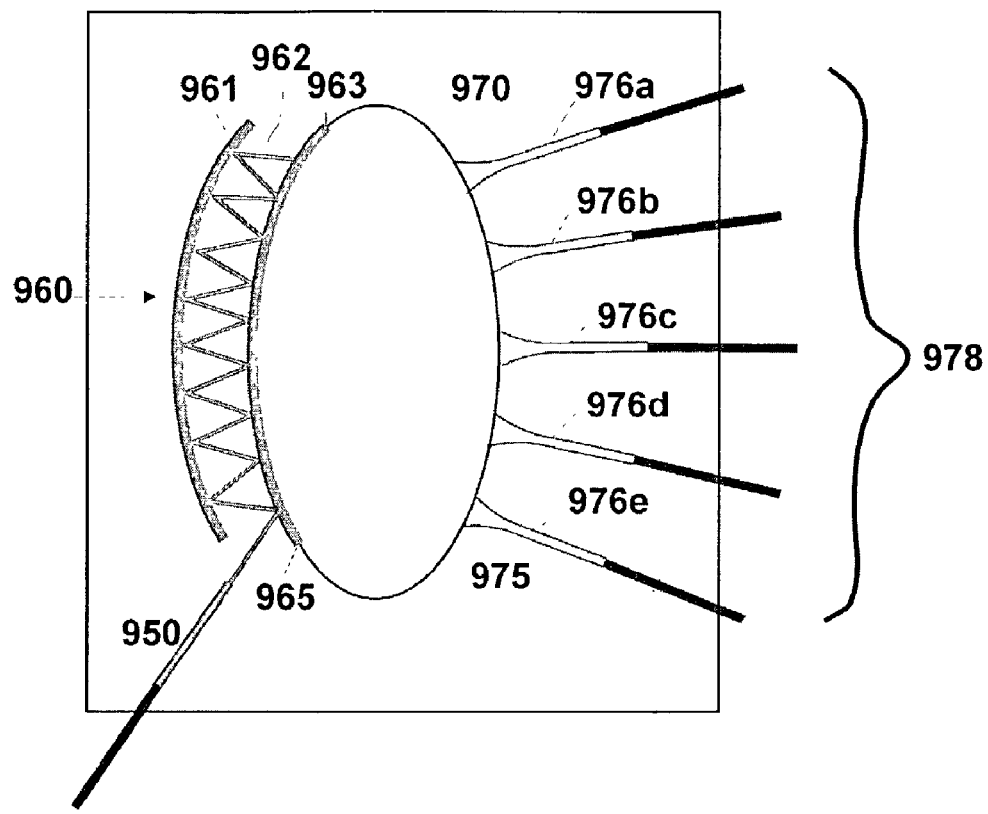
FIG. 55 is a block diagram of an exemplary embodiment of a monolithic integrated optic self-focusing, curved OTDL multiplexer/demultiplexer device in accordance with the present invention.

FIG. 55 is a block diagram of another embodiment of a monolithic integrated optic OTDL multiplexer/demultiplexer device in accordance with the present invention. In this embodiment, the surfaces of the OTDL are curved, which eliminates the need for a separate lens element as was used in the anamorphic optical systems of the embodiments of FIGS. 52-54. An OTDL 960 includes a first surface 961 and a second surface 963 enclosing a cavity 962. Surface 961 has a fully reflective coating adjacent to and facing cavity 962, while surface 963 has a partially reflective coating facing cavity 962. A beam of multiplexed light on waveguide 950 provides an input to OTDL 960, and the beam is reflected back and forth within cavity 962 as previously described (FIG. 11). At each point where the input beam strikes the second surface 963, an optical tap is created by the partially reflective coating, and a plurality of beamlets enters the planar slab waveguide region 970. The curved contours of surfaces 961 and 963 cause the beamlets to converge or "self-focus" on a curved surface 975. Specifically, the design of the contours of surfaces 961 and 963, the angle of input waveguide 950, and the refractive indices of cavity region 962 and waveguide region 970 are such that the axes of the beamlets are all directed toward, and intersect at, a common point at the center of surface 975. An array of waveguide couplers 976a-e is positioned on surface 975. The multiplexed input light is spatially separated by wavelength along surface 975, and by selectively positioning the waveguide couplers on curved surface 975, selected wavelengths corresponding to signal carrier wavelengths will be coupled into the couplers 976a-e. The convergence of the beamlets resulting from the curvature of OTDL 960 implements the Fourier Transform operation of prior embodiments and eliminates the need for the anamorphic optical system described with respect to FIGS. 11 and 52-54. Output couplers 976a-e couple the demultiplexed wavelength channels directly into an output optical fiber array 978.

As with the monolithic OTDL demultiplexer described above (FIG. 52), a curved self-focusing monolithic multiplexer can be constructed by reversing the operation of the integrated optic self-focusing OTDL demultiplexer in FIG. 55. A curved self-focusing monolithic demultiplexer/multiplexer may offer features or production advantages in certain applications.

Figure 56:
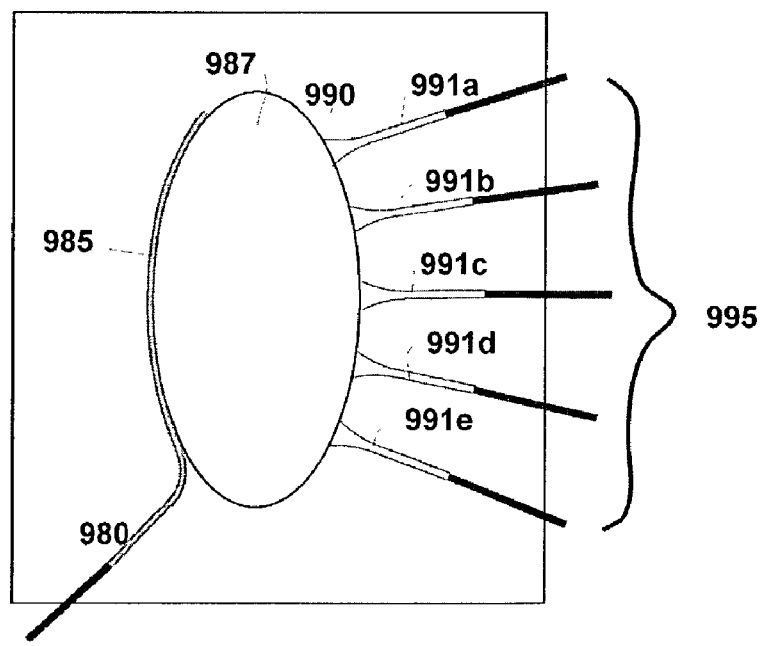
FIG. 56 is a block diagram of an exemplary embodiment of a monolithic integrated optic evanescent OTDL multiplexer/demultiplexer device in accordance with the present invention.
Figure 57:
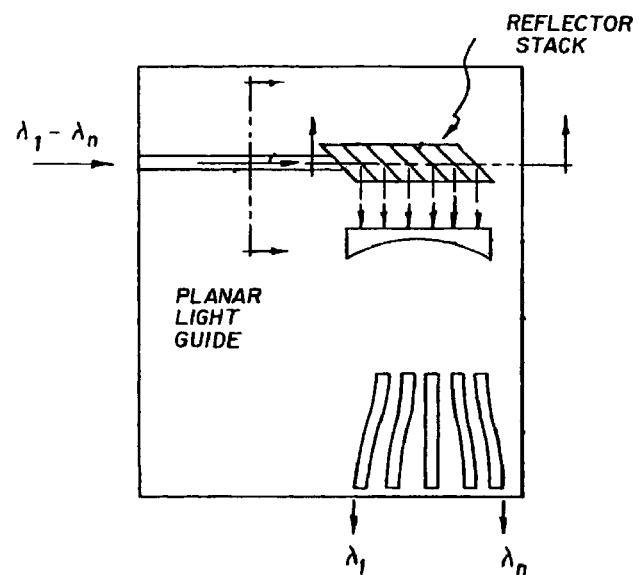
FIG. 57 shows a prior art planar waveguide integrated optical multiplexer/demultiplexer device.

An additional embodiment of an integrated optic OTDL device can be constructed with an evanescently coupled monolithic waveguide structure, as shown in FIG. 56. In this embodiment, an input coupler 980 is coupled to a discrete waveguide 985 that functions as an evanescent coupler. The continuous coupling of the evanescent coupler with the planar slab waveguide region 987 effectively creates a continuous optical tap. As with a curved, self-focusing OTDL device, as described above, the function of the lens is implemented by the shaping of the waveguide region 987 relative to the shape of the evanescent coupler 985. The features of the OTDL cavity are performed within a discrete waveguide 985 that functions as the evanescent coupler. The continuous output optical wavefront that is evanescently coupled from the discrete waveguide 985 to the waveguide region 987 converges on the output surface 990. Output couplers 991a-e are arranged along surface 990 to couple the individual wavelength channels into an array of output fibers 995.

As with the monolithic OTDL demultiplexer (FIG. 52) and the curved self-focusing OTDL demultiplexer (FIG. 55) described above, an evanescently coupled monolithic OTDL multiplexer can be constructed by reversing the operation of the evanescently coupled demultiplexer shown in FIG. 56. These monolithic evanescently-coupled devices could be used to construct an OTDL device for applications requiring the use of large free spectral range (FSR) bandwidths. In addition, these embodiments of evanescently coupled integrated optic demultiplexers/multiplexers may offer manufacturing advantages in certain applications of WDM devices.

The implementation of an integrated optic OTDL device can take the form of a hybrid or monolithic device. In a hybrid device, certain elements of the OTDL device, such as the input coupler, the OTDL cavity structure and the lens within the anamorphic optical system, can be fabricated separately using different technologies and/or materials to optimize each element. The various elements are then physically assembled on an integrated optic substrate (e.g. a silicon wafer or optical polymer) containing the waveguide and coupling array to form one overall device. A hybrid structure in which an OTDL cavity is coupled to a planar waveguide structure would have the advantages of separating the fabrication of the important device components to optimize their performance, allowing for reconfigurability and improved manufacturing yields. In EP 0 947 861 A1, Duck et al. disclose a hybrid optical multiplexing device in which two monolithic waveguide blocks are coupled to GRIN lenses and a wavelength-dependent filter element disposed between the two blocks. A similar method of integrated optic fabrication could be applied to hybrid OTDL demultiplexer/multiplexer devices to maximize functionality and minimize size.

In a monolithic device implementation, all elements of an OTDL device are formed directly on an integrated optic substrate using existing photolithographic and microfabrication methods, such as silicon wafer etching and thin film deposition techniques. Monolithic construction of planar OTDL lightwave circuits can be used to overcome inherent issues associated with bulk and hybrid optical structures, including insertion and coupling losses resulting from non-optimal alignment of input/output fiber arrays and OTDL/waveguide interfaces, and the use of epoxies to fix individual components in place, as well as the associated labor expense of assembly. All of the important OTDL elements can be constructed using current integrated optical and planar lightwave technologies. Applicable methods of fabricating the integrated optical OTDL elements are disclosed in U.S. Pat. No. 6,385,362 B1, in which Norwood describes an integrated OADM comprising a multi-layer stack formed on a substrate. In this process, the OADM devices can be constructed using combinations of silicon or silica substrates, glass core layers, and polymer under/overcladding layers, which are formed with standard commercially implemented etching, deposition, and photolithographic techniques.

Input couplers and V-groove output fiber arrays are routinely fabricated for AWG devices, as are the waveguides important for the anamorphic optical systems of the multiplexer/demultiplexer, multi-channel modulator, and curved self-focusing integrated optic OTDL devices. The function of the lenses within the described embodiments of integrated optic OTDL devices can be accomplished using various monolithic lens types, including: a two-dimensional high refractive index lens, a Fresnel lens (may be a blazed grating structure), a Luneburg lens, or an etched geodesic lens. Planar monolithic star couplers of the type described by Dragone in U.S. Pat. No. 5,136,671 may also be used to perform the lens function, particularly in the slab waveguide region of the curved self-focusing integrated optic OTDL demultiplexer/multiplexer of FIG. 55. Such star couplers are routinely used in AWG devices. Alternatively, thin film lenses can also be integrated into an integrated optic OTDL device using standard deposition processes, as described in U.S. Pat. No. 4,279,464.

What is claimed is:

1. A device comprising:
    a processor configured to convert a collimated input beam into a plurality of discrete time-delayed collimated output beams, the processor having an input and an output, the processor configured to maintain the collimation of the input beam so that the plurality of discrete time-delayed output beams maintain the collimation of the input beam,
    a focal plane at which the time-delayed beams interfere,
    a first reflective surface, the first reflective surface and the focal plane mutually defining an angle, the first reflective surface defining a size and a location relative to the focal plane, the first reflective surface positioned to direct interfered beams incident on the focal plane to the output,
    wherein the processor comprises a second reflective surface and a third reflective surface, the second reflective surface and the third reflective surface being in spaced relationship, whereby at least a portion of the collimated beam directed toward the third reflective surface is reflected multiple times between the second and third reflective surfaces, thereby producing multiple time-delayed signals.

2. The device of claim 1 wherein at least one of the size and the location of the first reflective surface relative to the focal plane is modifiable to thereby selectively direct interfered beams incident on the focal plane to the output.

3. The device of claim 1 comprising an output surface comprising a detector array.

4. A device comprising:
    a processor configured to convert a multi-channel collimated signal beam into a plurality of discrete time-delayed collimated beams, the processor configured to maintain the collimation of the signal beam so that the plurality of discrete time-delayed collimated beams maintain the collimation of the signal beam, the processor comprising:
- a first input and an associated plurality of first input taps,
- a first output and an associated plurality of first output taps,
- an add input and an associated plurality of add input taps,
- a drop output and an associated plurality of drop output taps,
- a focal plane at which the time-delayed beams interfere,
- a first reflective surface substantially co-planer with the focal plane,
- a second reflective surface, the first and second reflective surfaces mutually defining an angle, the first and second reflective surfaces being positioned such that at least a portion of light introduced via the first input is reflected at a first angle by the first reflective surface toward the first output taps, at least a portion of light introduced via the first input is reflected at a second angle by the second reflective surface toward the drop output taps, and at least a portion of light introduced via the add input is reflected at a third angle by the second reflective surface toward the first output taps.

5. The device of claim 4, wherein the second angle defines a bisector, the third angle defines a bisector, and the bisector of the second angle and the bisector of the third angle are equal.

6. A device comprising:
- a processor configured to convert a multi-channel collimated signal beam into a plurality of discrete time-delayed collimated beams, the processor configured to maintain the collimation of the signal beam so that the plurality of discrete time-delayed collimated beams maintain the collimation of the signal beam, the processor comprising:
- a first input and an associated plurality of first input taps,
- a first output and an associated plurality of first output taps,
- a first add input and an associated plurality of first add input taps,
- a first drop output and an associated plurality of first drop output taps,
- a second add input and an associated plurality of second add input taps,
- a second drop output and an associated plurality of second drop output taps,
- a focal plane at which the time-delayed beams interfere,
- a first reflective surface substantially co-planer with the focal plane,
- a second reflective surface, the first and second reflective surfaces mutually defining a first angle,
- a third reflective surface, the first and third reflective surfaces mutually defining a second angle,
- the first, second and third reflective surfaces being positioned such that at least a portion of light introduced via the first input is reflected by the first reflective surface toward the first output taps, at least a portion of light introduced via the first input is reflected by the second reflective surface toward the first drop output taps, at least a portion of light introduced via the first add input is reflected by the second reflective surface toward the first output taps, at least a portion of light introduced via the first input is reflected by the third reflective surface toward the second drop output taps, and at least a portion of light introduced via the second add input is reflected by the third reflective surface toward the first output taps.

7. A device comprising:
- a processor configured to convert a multi-channel collimated signal beam into a plurality of discrete time-delayed collimated beams, the processor configured to maintain the collimation of the signal beam so that the plurality of discrete time-delayed collimated beams maintain the collimation of the signal beam, the processor comprising:
- a first input and an associated plurality of first input taps,
- a first output and an associated plurality of first output taps,
- an add input and an associated plurality of add input taps,
- a drop output and an associated plurality of drop output taps,
- a focal plane at which the time-delayed beams interfere,
- a first reflective surface substantially co-planer with the focal plane,
- a second reflective surface, the first and second reflective surfaces mutually defining an angle, the first reflective surface having an aperture therein, the first and second reflective surfaces being positioned such that at least a portion of light introduced via the first input is reflected by the first reflective surface toward the first output taps, at least a portion of light introduced via the first input is reflected by the second reflective surface toward the drop output taps, and at least a portion of light introduced via the add input is reflected by the second reflective surface toward the first output taps.

8. The device of claim 7, wherein the aperture in the first reflective surface defines a size and a location relative to the focal planes, and wherein selection of light to be reflected toward the drop output taps is made by controlling at least one of the size of the aperture and the location of the aperture relative to the focal plane.

9. A device comprising:
- a processor configured to convert a multi-wavelength collimated signal beam into a plurality of discrete time-delayed collimated beams, the processor configured to maintain the collimation of the signal beam so that the plurality of discrete time-delayed collimated beams maintain the collimation of the signal beam, the processor comprising:
- an input and an associated plurality of input taps,
- an output and an associated plurality of output taps,
- a focal plane at which the time-delayed beams interfere,
- a first reflective surface substantially coplanar with the focal plane, the first reflective surface positioned to direct time-delayed beams incident on the focal plane to the output,
- a bidirectional area modulator for modulating time-delayed beams incident on the focal plane, whereby at least a portion of light introduced via the input is modulated and reflected by the first reflective surface toward the output taps,
- wherein the processor comprises a second reflective surface and a third reflective surface, the second reflective surface and the third reflective surface being in spaced relationship, whereby at least a portion of the multi-wavelength signal beam directed toward the third reflective surface is reflected multiple times between the second and third reflective surfaces, thereby producing the multiple time-delayed beams.

10. The device of claim 9 comprising a laser and a multi-line generator for providing the multi-wavelength signal beam to the processor.

11. The device of claim 9 wherein the multi-wavelength signal beam has a wavelength and comprising a wavelength locker for controlling at least one of the wavelengths of the multi-wavelength signal beam.

12. A device comprising:
a processor configured to convert a multi-channel collimated signal beam into a plurality of discrete time-delayed collimated beams, the processor configured to maintain the collimation of the signal beam so that the plurality of discrete time-delayed collimated beams maintain the collimation of the signal beam, the processor comprising
an input and a plurality of outputs,
a focal plane at which the time-delayed beams interfere,
a plurality of first reflective surfaces located substantially in the focal plane, each of the plurality of first reflective surfaces being positioned at a different angle relative to the focal plane, each of the plurality of first reflective surfaces being positioned so that at least a portion of light introduced via the input is reflected by each of the plurality of first reflective surfaces toward one of the plurality of outputs,
wherein the processor comprises a second reflective surface and a third reflective surface, the second reflective surface and the third reflective surface being in spaced relationship, whereby at least a portion of the multi-wavelength signal beam directed toward the third reflective surface is reflected multiple times between the second and third reflective surfaces, thereby producing the multiple time-delayed beams.

13. The device of claim 12, comprising means for changing the angle of at least one of the plurality of first reflective surfaces relative to the focal plane.

14. The device of claim 12, wherein the plurality of first reflective surfaces located substantially in the focal plane comprises a plurality of micro-electro-mechanical systems located substantially in the focal plane.

15. A device comprising:
an input for receiving a multi-channel optical signal comprising a plurality of collimated input channels, one input channel having a center frequency $f_A$ and adjacent input channels having a center frequency spacing $\Delta f$,
a processor configured to process the signal to produce multiple time-delayed collimated signals, the multiple time-delayed collimated signals being mutually phase-shifted as a function of the frequencies of the input signal and being spatially distributed and modifiable in at least one of amplitude and phase, and
a plurality of outputs wherein M defines the number of outputs and m identifies a particular output, wherein the $m^{th}$ output comprises a plurality of channels with center frequencies defined by the relationship $$f_m = (f_A + \Delta m \Delta f) \pm (K \times FSR)$$

where K represents an integer and FSR represents the free spectral range of the device and where the plurality of outputs comprises a frequency spectrum controllable at least in part by weightings in at least one of amplitude and phase of the multiple time-delayed signals,
wherein the processor is configured to maintain the collimation of the signals so that the plurality of discrete time-delayed collimated signals maintain the collimation of the signal beam, the processor comprises a first reflective surface and a second reflective surface, the first reflective surface and the second reflective surface being in spaced relationship, whereby at least a portion of a beam directed toward the second surface is reflected multiple times between the first and second surfaces, thereby producing the multiple time-delayed signals.

16. A method of optical processing, comprising:
receiving a multi-channel optical signal comprising a plurality of input channels, one input channel having a center frequency $f_A$ and adjacent input channels having a center frequency spacing $\Delta f$,
processing the signal to produce multiple time-delayed collimated signals, the multiple time-delayed collimated signals being mutually phase-shifted as a function of the frequencies of the input signal and being spatially distributed and modifiable in at least one of amplitude and phase, and providing channels to a plurality of outputs wherein M defines the number of outputs and m identifies a particular output, wherein the $m^{th}$ output comprises a plurality of channels with center frequencies defined by the relationship $$f_m = (f_A + \Delta m \Delta f) \pm (K \times FSR)$$

where K represents an integer and FSR represents a free spectral range and where the plurality of outputs comprises a frequency spectrum controllable at least in part by weightings in at least one of amplitude and phase of the multiple time-delayed signals,
wherein processing the signal comprises maintaining the collimation of the signals so that the plurality of discrete time-delayed collimated signals maintain the collimation of the signals, providing a first reflective surface and a second reflective surface, the first reflective surface and the second reflective surface being in spaced relationship, whereby at least a portion of a beam directed toward the second surface is reflected multiple times between the first and second surfaces, thereby producing the multiple time-delayed signals.

17. A device comprising:
an input for receiving a multi-channel optical signal comprising a plurality of collimated input channels, one input channel having a center frequency $f_A$, a spectral width $df_A$, and adjacent input channels having a center frequency spacing $\Delta f$,
a processor configured to process the signal to produce multiple time-delayed collimated signals, the multiple time-delayed collimated signals being mutually phase-shifted as a function of the frequencies of the input signal and being spatially distributed, and
a plurality of outputs wherein M defines the number of outputs and m identifies a particular output, wherein the $m^{th}$ output comprises a plurality of channels comprising an output spectral width $df_A'$ not less than $df_A$ and comprising center frequencies defined by the relationship $$f_m = (f_A + \Delta m \Delta f) \pm (K \times FSR)$$

where K represents an integer and FSR represents the free spectral range of the device,
wherein the processor is configured to maintain the collimation of the signals so that the plurality of discrete time-delayed collimated signals maintain the collimation of the signal beam, the processor comprises a first reflective surface and a second reflective surface, the first reflective surface and the second reflective surface being in spaced relationship, whereby at least a portion of a beam directed toward the second surface is reflected multiple times between the first and second surfaces, thereby producing the multiple time-delayed signals.

18. A method of optical processing, comprising:

receiving a multi-channel optical signal comprising a plurality of collimated input channels, one input channel having a center frequency $f_A$, a spectral width $df_A$, and adjacent input channels having a center frequency spacing $\Delta f$, processing the signal to produce multiple time-delayed collimated signals, the multiple time-delayed collimated signals being mutually phase-shifted as a function of the frequencies of the input signal and being spatially distributed, and providing channels to a plurality of outputs wherein M defines the number of outputs and m identifies a particular output, wherein the $m^{th}$ output comprises a plurality of channels comprising an output spectral width $df_A'$ not less than $df_A$ and comprising center frequencies with center frequencies defined by the relationship $$f_m = (f_A + \Delta m \Delta f) \pm (K \times FSR)$$

where K represents an integer and FSR represents a free spectral range and wherein processing the signal comprises maintaining the collimation of the signals so that the plurality of discrete time-delayed collimated signals maintain the collimation of the signals, providing a first reflective surface and a second reflective surface, the first reflective surface and the second reflective surface being in spaced relationship, whereby at least a portion of a beam directed toward the second surface is reflected multiple times between the first and second surfaces, thereby producing the multiple time-delayed signals.

* * * * *

UNITED STATES PATENT AND TRADEMARK OFFICE
CERTIFICATE OF CORRECTION

PATENT NO. : 7,509,048 B2
APPLICATION NO. : 10/199495
DATED : March 24, 2009
INVENTOR(S) : Terry M. Turpin et al.

It is certified that error appears in the above-identified patent and that said Letters Patent is hereby corrected as shown below:

<u>On the cover page, Under Section (75):</u>

Please replace "Fred F. Froelich, Baltimore, MD (US)" with --Fred F. Froehlich, Baltimore, MD (US)--. And, Please replace "Bruce D. Nichols, Columbia, MD (US)" with --D. Bruce Nichols, Columbia, MD (USA)--.

Signed and Sealed this

Fourth Day of August, 2009

JOHN DOLL
*Acting Director of the United States Patent and Trademark Office*